US011328551B2

(12) United States Patent
Beskitt et al.

(10) Patent No.: US 11,328,551 B2

(45) Date of Patent: *May 10, 2022

(54) MODULAR AUTOMATED TRANSACTION MACHINE

(71) Applicant: Diebold Nixdorf Incorporated, North Canton, OH (US)

(72) Inventors: William Daniel Beskitt, Canton, OH (US); Michael J. Harty, Canton, OH (US)

(73) Assignee: Diebold Nixdorf Incorporated, Hudson, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/261,337

(22) PCT Filed: Jun. 19, 2019

(86) PCT No.: PCT/US2019/037854

§ 371 (c)(1), (2) Date: Jan. 19, 2021

(87) PCT Pub. No.: WO2020/018225

PCT Pub. Date: Jan. 23, 2020

(65) Prior Publication Data

US 2021/0264745 A1 Aug. 26, 2021

Related U.S. Application Data

(60) Provisional application No. 62/701,178, filed on Jul. 20, 2018.

(51) Int. Cl.

*G06Q 40/00* (2012.01)
*G07F 19/00* (2006.01)

(Continued)

(52) U.S. Cl.

CPC ............ *G07D 11/40* (2019.01); *G07D 11/13* (2019.01); *G07D 11/14* (2019.01); *G07D 11/18* (2019.01);

(Continued)

(58) Field of Classification Search

CPC .... G07F 19/202; G07F 19/205; G07F 19/203; G07F 19/20; G07F 19/209;

(Continued)

(56) References Cited

U.S. PATENT DOCUMENTS 6,241,150 B1 * 6/2001 Patterson ............... G07D 11/40 235/379
7,240,829 B2 7/2007 Graef et al.

(Continued)

FOREIGN PATENT DOCUMENTS

EP 1686545 A2 8/2006
EP 3007142 A1 4/2016

(Continued)

OTHER PUBLICATIONS

International Preliminary Report on Patentability and Written Opinion of the International Searching Authority dated Jan. 26, 2021 filed in the corresponding PCT application; 9 pages.

(Continued)

*Primary Examiner* — Tuyen K Vo

(74) *Attorney, Agent, or Firm* — Black, McCuskey, Souers & Arbaugh LPA

(57) ABSTRACT

A modular ATM is disclosed herein and can include a safe with a first port, at least one currency cassette and dispenser both positioned in the safe, a recycler, and a plurality of linking transport assemblies. The dispenser can move banknotes between the cassette and the first port. The recycler can be positioned on the safe, have second and third ports, and move banknotes between the second and third ports. The (Continued)

recycler can be positionable in a plurality of different orientations and offsets relative to the safe. The plurality of linking transport assemblies can each be individually engageable with the recycler. Each of the linking transport assembly moves banknotes between the first port of the safe and the second port of the recycler. Each linking transport assembly is individually positionable between the safe and the recycler.

21 Claims, 39 Drawing Sheets

(51) Int. Cl.

| | |
|---|---|
| ***G07D 11/00*** | (2019.01) |
| ***G07D 11/40*** | (2019.01) |
| ***G07D 11/13*** | (2019.01) |
| ***G07D 11/14*** | (2019.01) |
| ***G07D 11/18*** | (2019.01) |
| ***G07D 11/237*** | (2019.01) |
| ***G07D 11/32*** | (2019.01) |
| *G07D 11/60* | (2019.01) |

(52) U.S. Cl.
CPC ........... *G07D 11/237* (2019.01); *G07D 11/32* (2019.01); *G07F 19/202* (2013.01); *G07F 19/203* (2013.01); *G07F 19/205* (2013.01); *G07D 11/60* (2019.01); *G07D 2211/00* (2013.01)

(58) Field of Classification Search
CPC .... G06Q 20/1085; G07D 11/40; G07D 11/14; G07D 11/13; G07D 11/12; G07D 11/50; G07D 11/60; G07D 2211/00; G07D 11/18; G07D 11/32; G07D 11/30; G07D 11/237
USPC .......................................................... 235/379
See application file for complete search history.

(56) References Cited

U.S. PATENT DOCUMENTS

| | | | | |
|---|---|---|---|---|
| 7,870,996 | B1 * | 1/2011 | Graef | G07F 19/20 235/379 |
| 8,251,281 | B1 | 8/2012 | Eastman et al. | |
| 8,844,807 | B1 * | 9/2014 | Lawver | G08B 3/10 235/379 |
| 8,857,707 | B1 | 10/2014 | Kovacs et al. | |
| 9,589,410 | B2 | 3/2017 | Nishino et al. | |
| 2002/0003163 | A1 * | 1/2002 | Peebles | G07D 11/14 235/379 |
| 2004/0182677 | A1 | 9/2004 | Katou et al. | |
| 2008/0136657 | A1 * | 6/2008 | Clark | G07F 19/20 340/686.6 |
| 2013/0153654 | A1 * | 6/2013 | Graef | G06Q 20/409 235/379 |
| 2013/0161385 | A1 | 6/2013 | Graef et al. | |
| 2014/0263619 | A1 * | 9/2014 | Turocy | G07D 11/28 235/379 |
| 2017/0081901 | A1 * | 3/2017 | Possato | E05G 1/026 |
| 2017/0116811 | A1 | 4/2017 | Yokote | |

FOREIGN PATENT DOCUMENTS

| | | | |
|---|---|---|---|
| JP | 2004110289 | A | 4/2004 |
| JP | 2004258972 | A | 9/2004 |
| WO | 2008111152 | A1 | 9/2008 |

OTHER PUBLICATIONS

Office Action; U.S. Appl. No. 16/445,263; dated Jun. 24, 2021; twenty-seven (27) pages.
Office Action; U.S. Appl. No. 16/445,263; dated Oct. 1, 2021; fifty (50) pages.
Office Action; U.S. Appl. No. 16/517,466; dated Jun. 24, 2021; twenty-seven (27) pages.
Office Action; U.S. Appl. No. 16/517,466; dated Oct. 1, 2021; twenty-three (23) pages.
Author: International Searching Authority, Patent Cooperation Treaty; Title: International Search Report & Written Opinion; dated Oct. 30, 2019; eleven (11) pages; International application No. PCT/US2019/042691.

* cited by examiner

MODULAR AUTOMATED TRANSACTION MACHINE

CROSS-REFERENCE TO RELATED APPLICATIONS

This application claims the benefit of U.S. Provisional Patent Application Ser. No. 62/701,178, filed on Jul. 20, 2018, which is hereby incorporated by reference in its entirety.

BACKGROUND

1. Field

The present disclosure relates to Automated Transaction Machines (ATMs), alternatively referred to as an Automated Banking Machines or Automated Teller Machines.

2. Description of Related Prior Art

ATMs are commonly used to carry out a variety of financial or commercial transactions. Most commonly, these transactions include dispensing cash, checking account balances, paying bills and/or receiving deposits from users. ATMs may also perform a variety of other transactions, including the sale and purchase of tickets, issuance of coupons, check or voucher presentation, the printing of script and a variety of other functions. In carrying out these transactions or performing these functions, a variety of documents may be moved through the ATM.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A modular ATM can include a safe, at least one currency cassette, a dispenser, a recycler, and a plurality of linking transport assemblies. The safe can have a door and a first port spaced from the door. The at least one currency cassette can be positioned in the safe. The dispenser can be positioned in the safe and operably engaged with the at least one currency cassette wherein the dispenser can be configured to extract banknotes from the at least one currency cassette and direct the extracted banknotes to the first port. The dispenser can also be configured to receive banknotes through the first port and direct the banknotes received through the first port to the at least one currency cassette. The recycler can be positionable on a top of the safe and can have a second port and a third port. The recycler can be configured to receive banknotes through the second port and direct received banknotes to the third port. The recycler can be positionable in a plurality of different orientations on the top of the safe and also in a plurality different offsets relative to the top of the safe. The plurality of linking transport assemblies can each individually be engageable with the recycler. Each one of the plurality of linking transport assemblies can have a respective fourth port configured to engage the first port of the safe and a respective fifth port configured to engage the second port of the recycler. Each one of the plurality of linking transport assemblies can define a transport path along which banknotes are moved between the respective fourth port the respective fifth port. Each one of the plurality of linking transport assemblies can be individually positionable between the top of the safe and a bottom of the recycler.

According to other features, the recycler can extend downwardly to a first horizontal plane and the top can be at least partially disposed in a second horizontal plane. The first horizontal plane can be parallel to and spaced from the second horizontal plane. At least portions of the first port and the fourth port can engage and overlap one another in a third horizontal plane for each one of the linking transport assemblies. The third horizontal plane can be parallel to and spaced from both of the first horizontal plane and the second horizontal plane. The first horizontal plane can be disposed between the second horizontal plane and the third horizontal plane.

In other features, the recycler can extend downwardly to a first horizontal plane that confronts the top of the safe. The first horizontal plane can be above the top of the safe. Each one of the plurality of linking transport assemblies can be fully disposed above the first horizontal plane when individually engaged with the recycler.

According to additional features, a first linking transport assembly of the plurality of linking transport assemblies can define a first transport path along which banknotes travel. The first transport path can extend vertically from the top of the safe to a first maximum height above the first port. The first transport path may only extend downwardly after reaching the first maximum height, in a direction of movement of the banknotes along the first transport path before reaching the second port. A second linking transport assembly of the plurality of linking transport assemblies can define a second transport path along which banknotes travel. The second transport path can extend to a second maximum height above the first port. The second transport path can extend both downwardly and upwardly after reaching the second maximum height, in a direction of movement of the banknotes along the second transport path before reaching the second port. The recycler can extend downwardly to a first horizontal plane that confronts the top of the safe. The first horizontal plane can be above the top of the safe. Each one of the plurality of linking transport assemblies can be at least mostly disposed above the first horizontal plane when individually engaged with the recycler.

According to other features, the modular ATM can also include first and second telescopic tracks interconnecting the recycler and the safe. The recycler can be moveable relative to the first port. The recycler can be horizontally slidable through the first and second telescopic tracks between an extended position and a retracted position. The respective fourth port of each one of the plurality of linking transport assemblies can be positioned directly above the first port when the respective linking transport assembly is individually engaged with the recycler and when the recycler is in the retracted position. At least portions of the first port and the respective fourth port, for each one of the linking transport assemblies, can releasably engage and disengage with respect to one another when the recycler is moved between the retracted position and the extended position.

In other features, each one of the linking transport assemblies can also include an input member configured to rotate. The recycler can also include a plurality of output members. Each output member can be positioned to engage at least one of the input members of the linking transport assemblies. Each output member can be configured to transmit rotation to at least one of the input members of the linking transport assemblies. At least one of the input members of the linking transport assemblies can be a first gear. At least one of the output members of the recycler can be a second gear that meshes with the first gear. The recycler can extend along a horizontal longitudinal axis between a forward end and an aft end and the plurality of output members can be spaced form one another along the horizontal longitudinal axis. The recycler can extend along a horizontal longitudinal axis between a forward end and an aft end and also extend along a horizontal lateral axis between a right side and a left side. All of the plurality of output members can be positioned on one of the right side and the left side of the horizontal longitudinal axis. Each one of the linking transport assemblies can also include an output member operably engaged with the respective input member such that rotation of the input member of the linking transport assembly and the output member of the linking transport assembly rotate concurrently. The dispenser can also include at least one input member positioned at the first port. The at least one input member of the dispenser can be operably engageable with the output members of each one of the linking transport assemblies. Each output member of the linking transport assemblies can engage with the input member of the dispenser when the linking transport assembly of that output member is engaged with the recycler and thereby transmit rotation to the at least one input member of the dispenser. The top of the safe can extend along a horizontal longitudinal axis between a forward end and an aft end and can also extend along a horizontal lateral axis between a right side and a left side. The at least one input member of the dispenser can be further defined as first and second input members. The first and second input members of the dispenser can be positioned on opposite sides of the horizontal longitudinal axis.

According to additional features, the top of the safe can extend along a horizontal longitudinal axis between a forward end and an aft end. The top of the safe can also extend along a horizontal lateral axis between a right side and a left side. The first port can be substantially centered on the top along both of the horizontal longitudinal axis and the horizontal lateral axis.

According to other features, each one of the linking transport assemblies can include a body, at least one pivot shaft, and a lock. The body can define the respective transport path along which banknotes move between the fourth port and the fifth port. The at least one pivot shaft can be engaged with the body and about which at least part of the body is pivotally moveable. The lock can be mounted on the body closer to the fifth port than the fourth port. The lock can be configured to releasably interconnect at least a portion of the body and the recycler and prevent pivoting movement of the at least a portion of the body.

In other features, each one of the linking transport assemblies can also include a plurality of beams, such as at least first and second beams. The beams can be supported for rotation on the body. Each beam can support a friction roller. Each of the friction rollers can extend into the transport path and can engage banknotes moving along the transport path to move the banknotes along the transport path. At least one of the linking transport assemblies can also include at least one belt interconnecting the at least first and second beams for concurrent rotation. At least one of the linking transport assemblies can also include a plurality of gears interconnecting the at least first and second beams for concurrent rotation. At least one of the linking transport assemblies can also include at least one belt interconnecting at least the first and second beams of the plurality of beams for concurrent rotation and a plurality of gears interconnecting the first beam and a third beam of the plurality of beams for concurrent rotation.

According to additional features, the body can include first and second plate members interconnected together. The respective transport path can extend between the first and second plate members. Each one of the linking transport assemblies can also include a plurality of beams supported for rotation on the body outside of the transport path. Each of the plurality of beams can support a friction roller that extends through one of a plurality of apertures defined in one of the first and second plate members to thereby extend into the transport path. At least one of the linking transport assemblies can also include at least one belt overlapping the friction rollers and thereby interconnecting the plurality of beams for concurrent rotation. The safe can also include a boot mounted at the top over the first port. The first and second plate members can extend into the boot.

BRIEF DESCRIPTION OF THE DRAWINGS

The detailed description set forth below references the following drawings.

DETAILED DESCRIPTION

Figure 1:
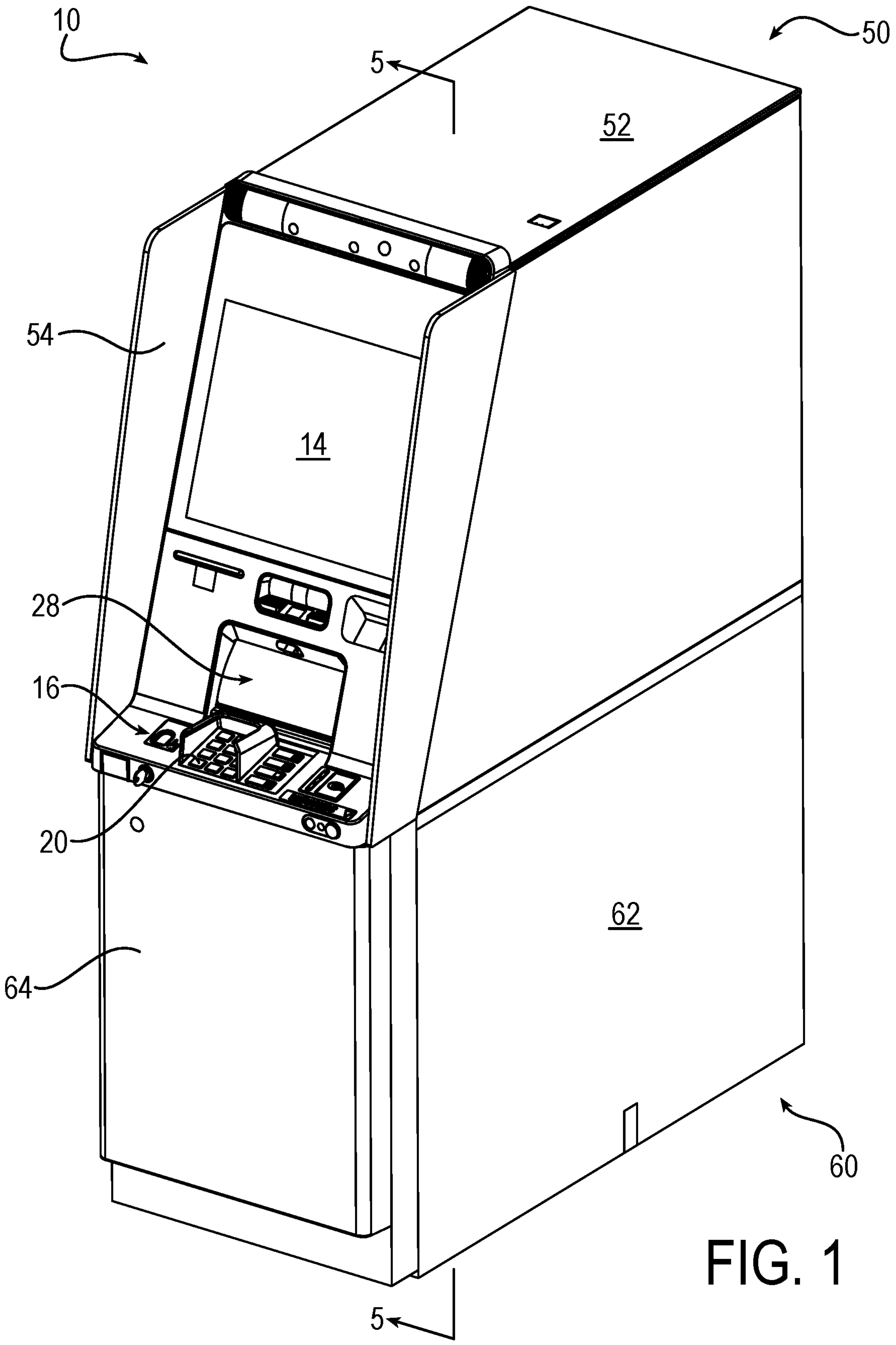
FIG. 1 is a first perspective view of an ATM in a first modular arrangement according to the present disclosure.

A plurality of different modular arrangements of the present disclosure is shown in the Figures of the application. A "modular arrangement" is a particular way that various components are arranged together. Components of the present disclosure can be arranged in a plurality of different ways. Similar features are shown in the various modular arrangements of the present disclosure. Similar features across different modular arrangements have been numbered with a common reference numeral and have been differentiated by an alphabetic suffix. Similar features are structured similarly, operate similarly, and/or have the same function unless otherwise indicated by the drawings or this specification. Furthermore, particular features of one modular arrangement can replace corresponding features in another modular arrangement or can supplement other modular arrangements unless otherwise indicated by the drawings or this specification.

The present disclosure can provide a modular ATM. An upper portion of the ATM can include subcomponents and/or subsystems that include user interfaces facing forward, such as a display, a card reader, a keypad; a primary computer ("PC") that manages operations of the ATM; and a recycler that moves documents such as banknotes. Recyclers are alternatively known as "advanced function devices" or "dispensers/receivers."

A lower portion of the ATM cam include subcomponents and/or subsystems that include a safe that houses banknote cassettes, sensors configured to detect tampering of the ATM, and electromechanical devices/systems that are configured to extract banknotes from the banknote cassettes and deliver banknotes to an outlet of the bottom portion. These electromechanical devices/systems are also configured to deliver banknotes to the banknote cassettes from the outlet to the cassettes. The safe of the lower portion of the ATM can be "front-loading," wherein a door of the safe faces forward, in the same direction as the user interfaces of the upper portion of the ATM. Alternatively, the sake of the lower portion of the ATM can be "rear-loading," wherein the door of the safe faces aft, the opposite direction that the user interfaces of the upper portion of the ATM face.

Figure 4:
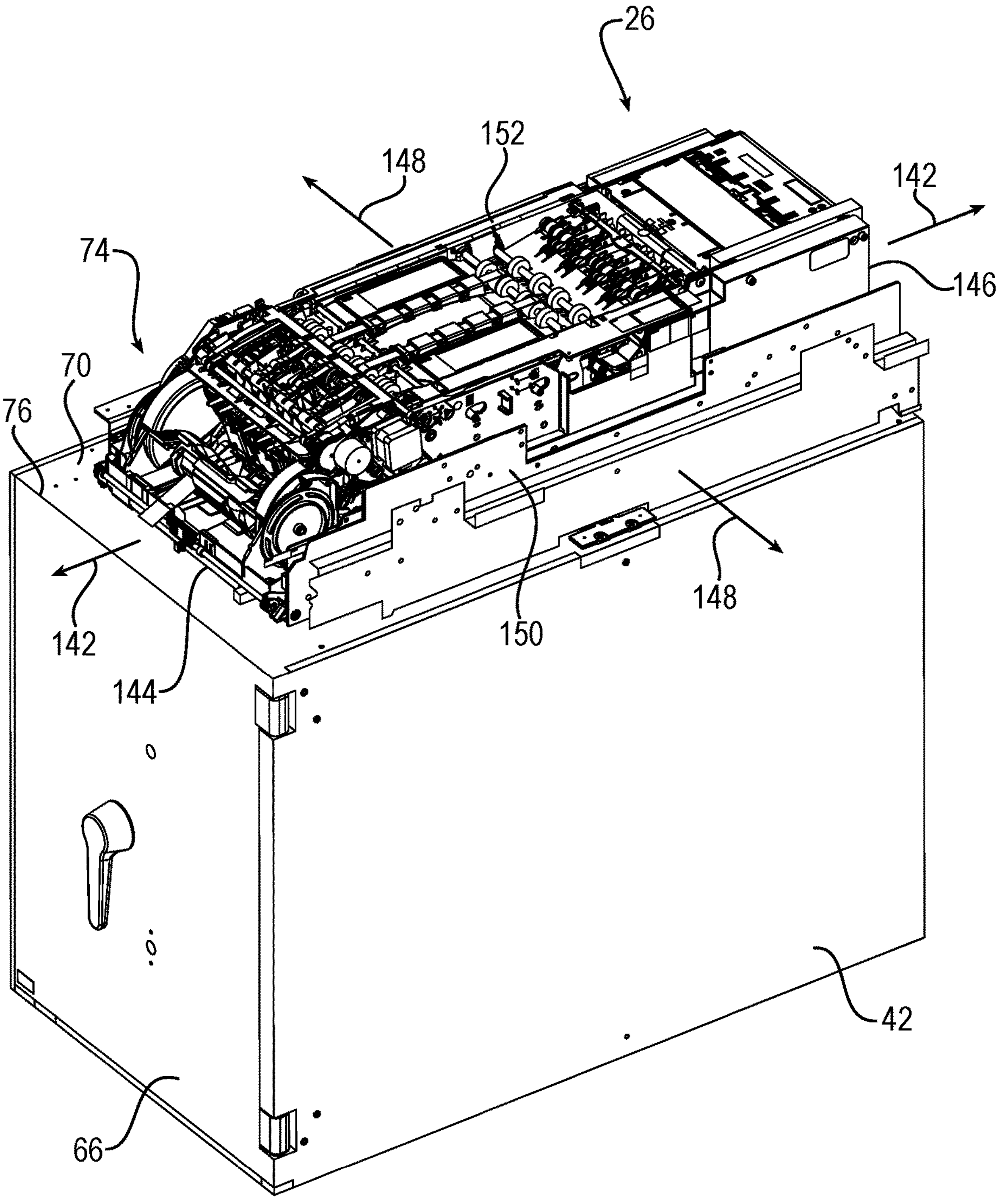
FIG. 4 is a perspective view of internal subcomponents of the ATM shown in FIG. 1, wherein the shell of the ATM has been removed.
Figure 14:
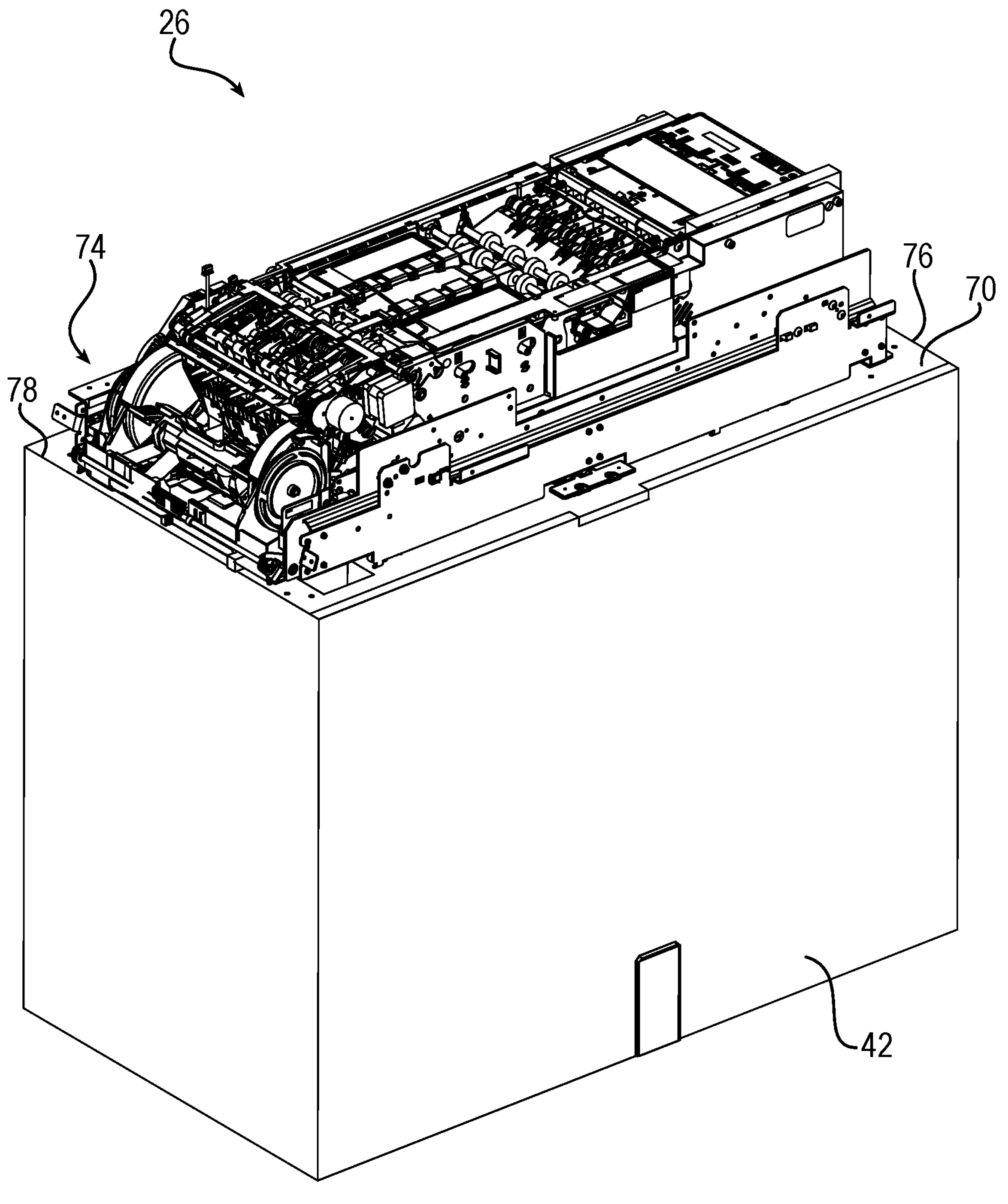
FIG. 14 is a perspective view of internal subcomponents of the ATM arranged in a second modular arrangement and with the shell of the ATM removed.
Figure 15:
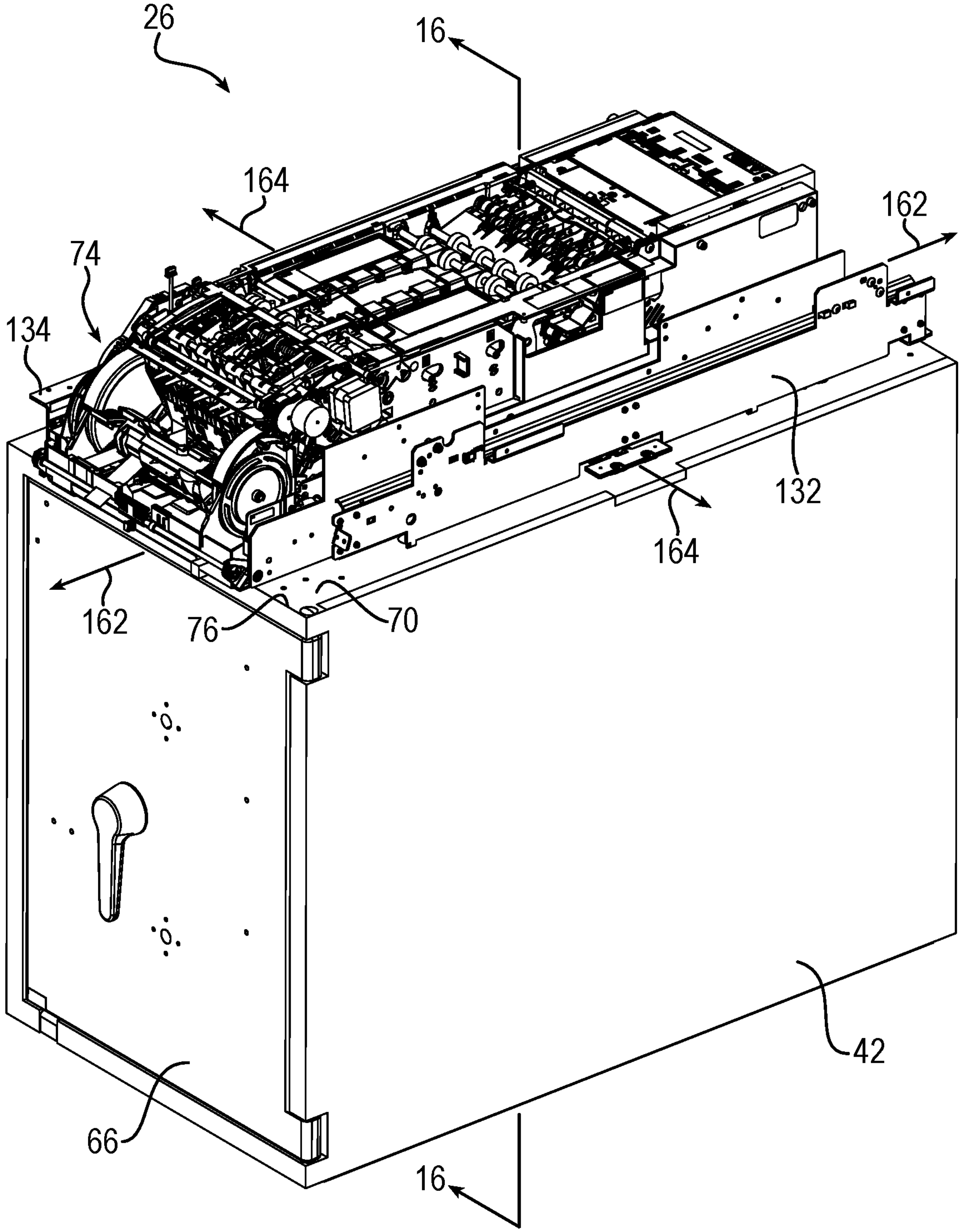
FIG. 15 is a perspective view of internal subcomponents of the ATM arranged in a third modular arrangement and with the shell of the ATM removed.
Figure 16:
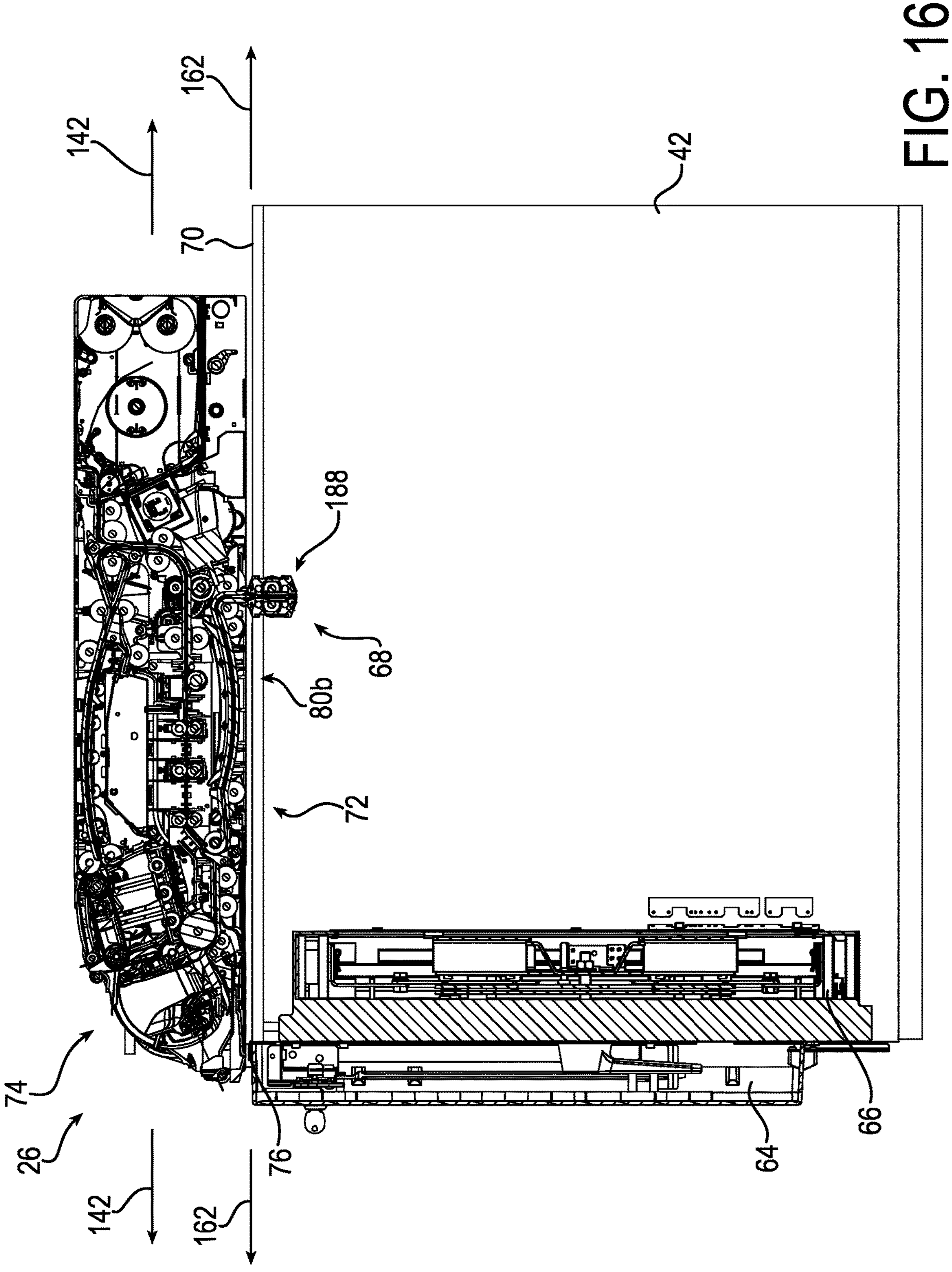
FIG. 16 is a cross-section taken through section lines 16-16 in FIG. 15 (taken through the longitudinal center plane)
Figure 25:
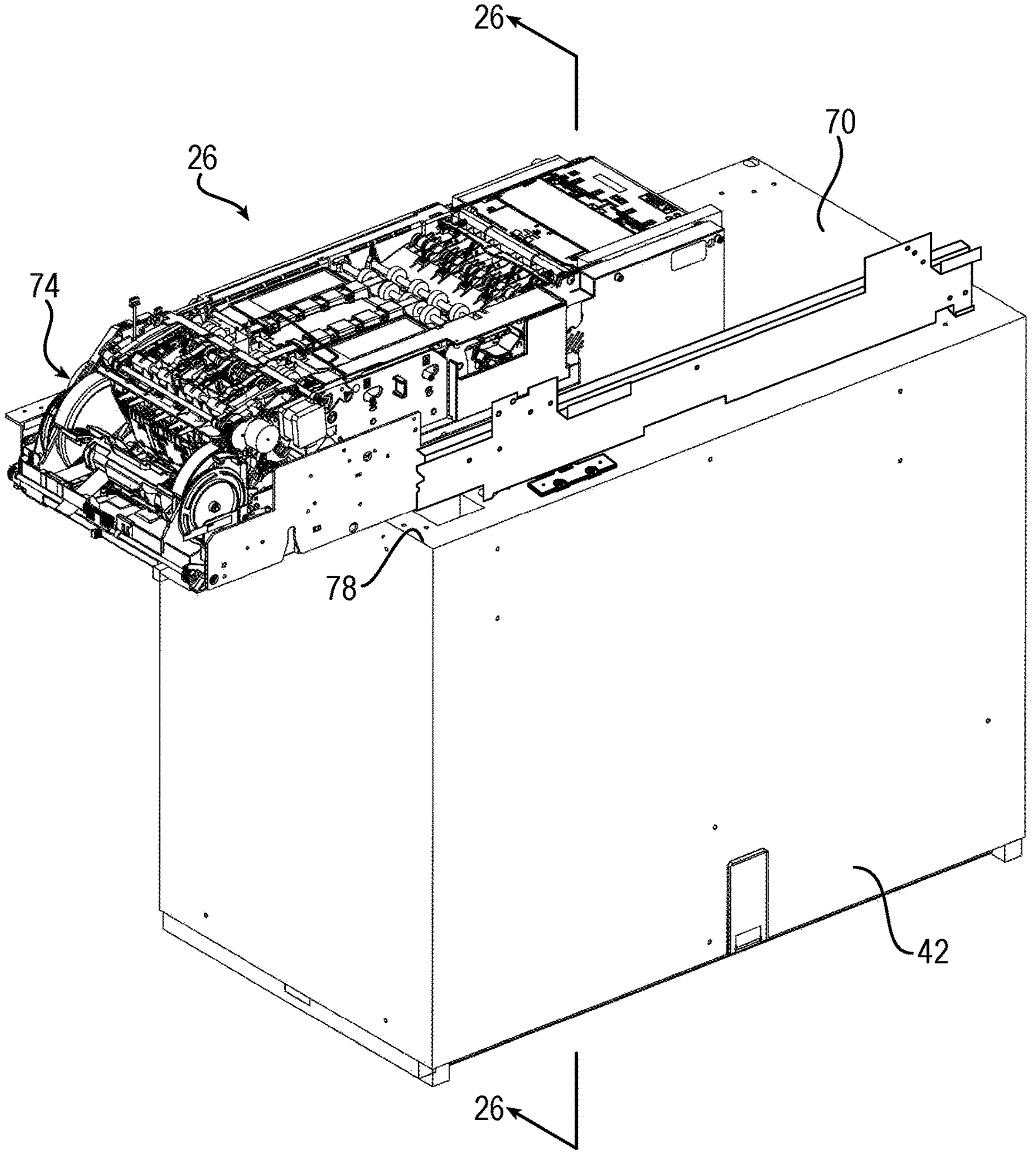
FIG. 25 is a perspective view of internal subcomponents of the ATM arranged in a fourth modular arrangement and with the shell of the ATM removed.
Figure 26:
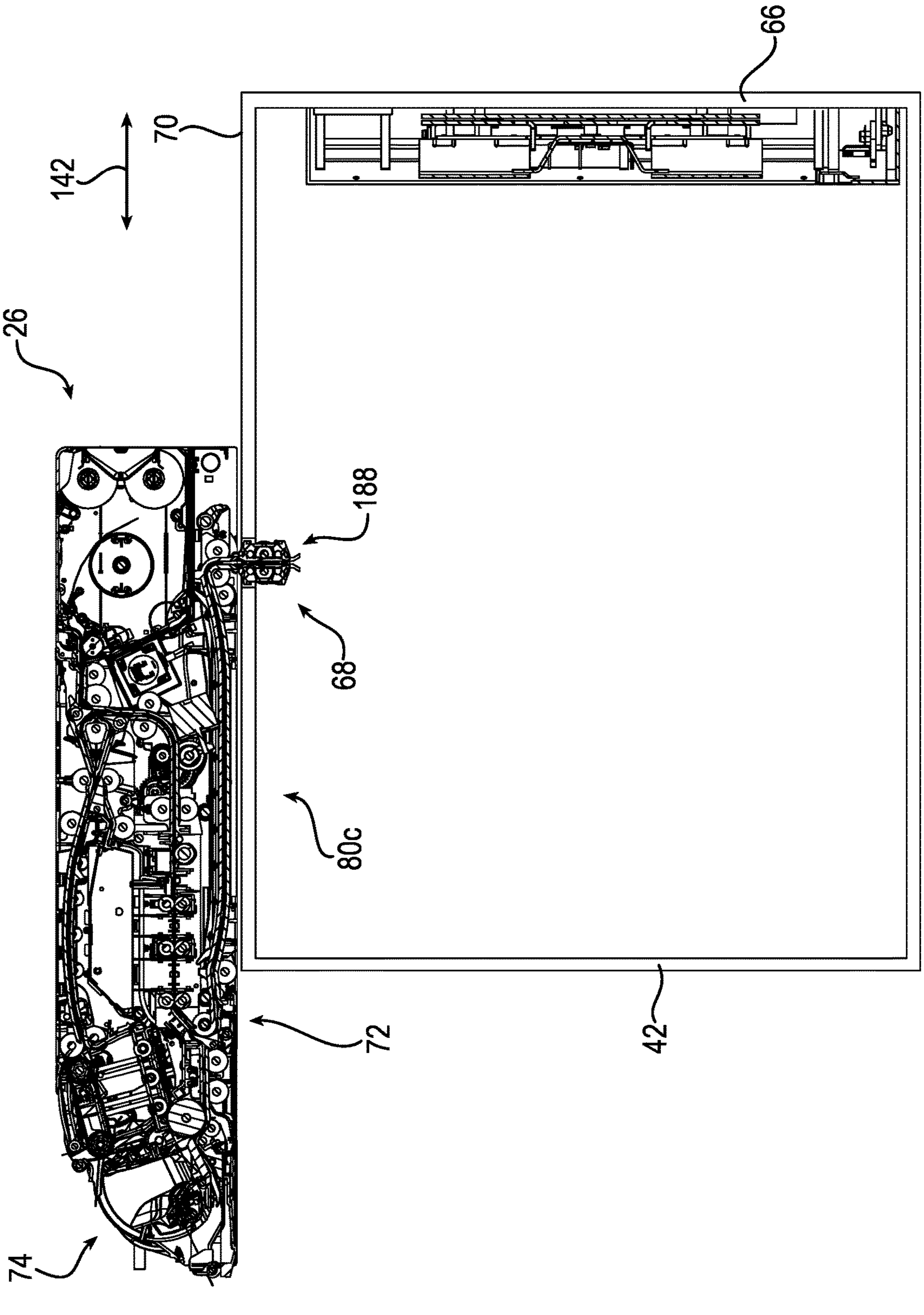
FIG. 26 is a cross-section taken through section lines 26-26 in FIG. 25 (taken through the longitudinal center plane)
Figure 27:
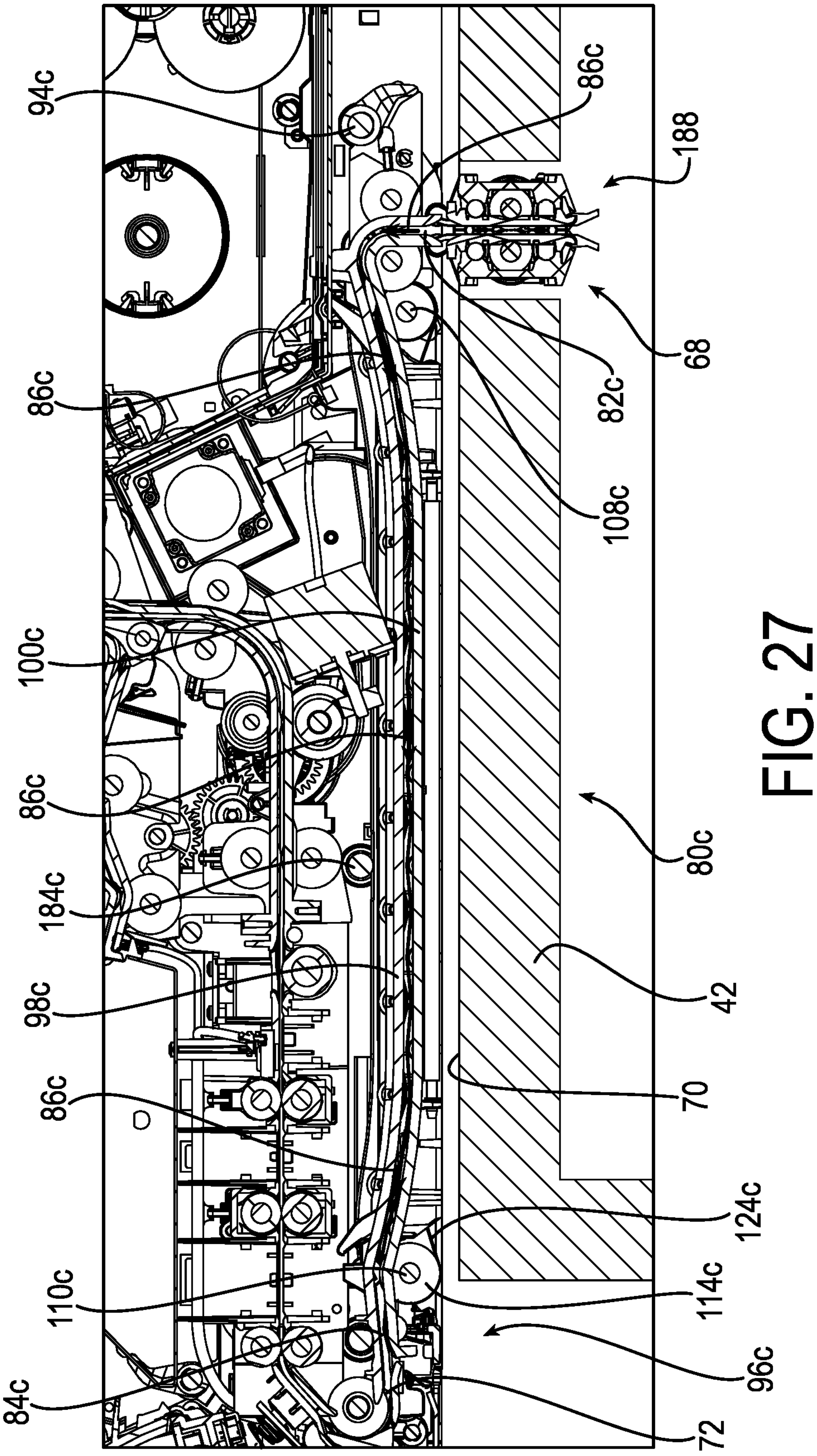
FIG. 27 is magnified portion of the cross-section shown in FIG. 26.
Figure 35:
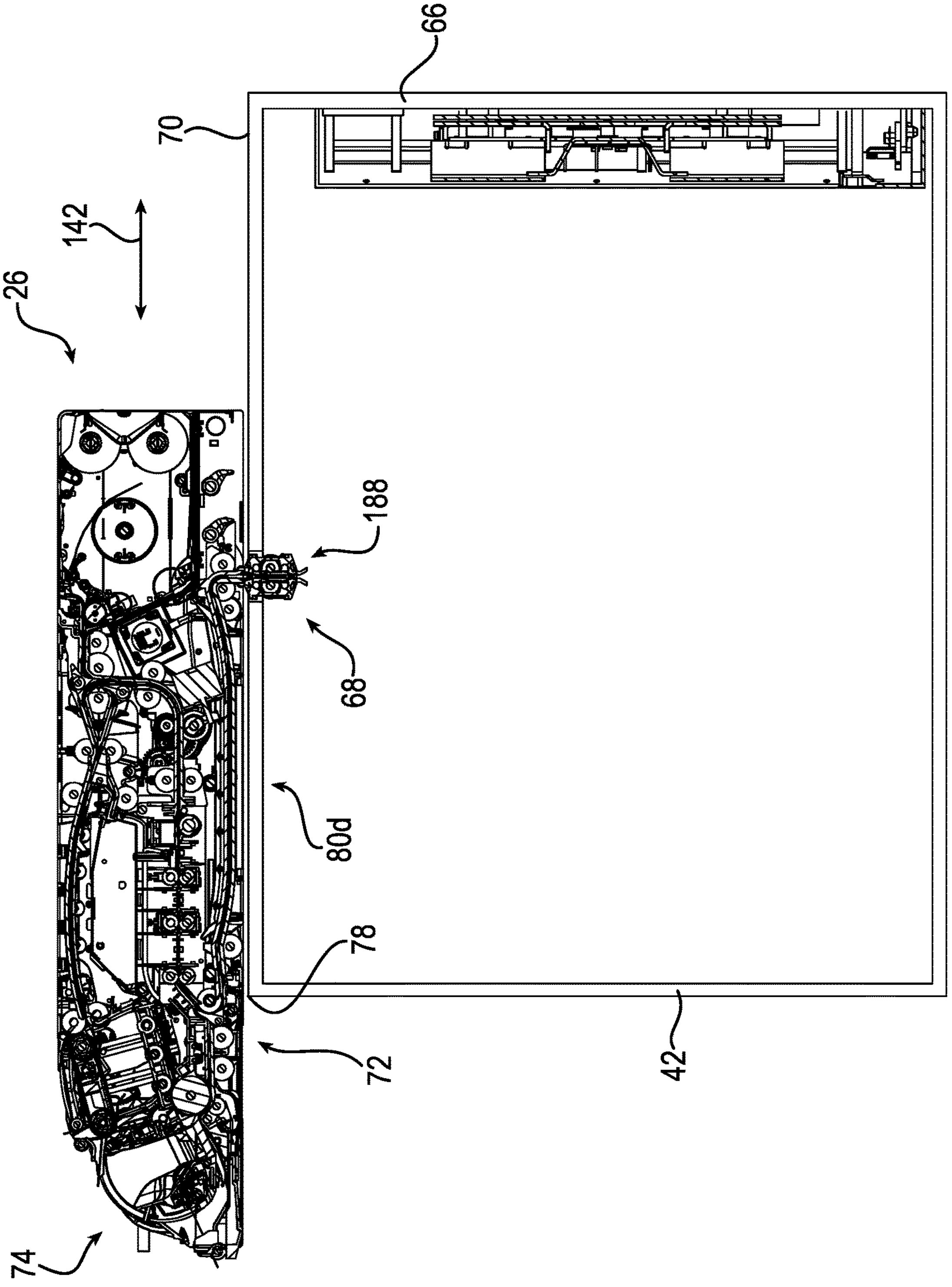
FIG. 35 is a cross-section analogous to the cross-sections of FIGS. 5, 16 and 26 (taken through the longitudinal center plane), but of the ATM in a fifth modular arrangement.
Figure 36:
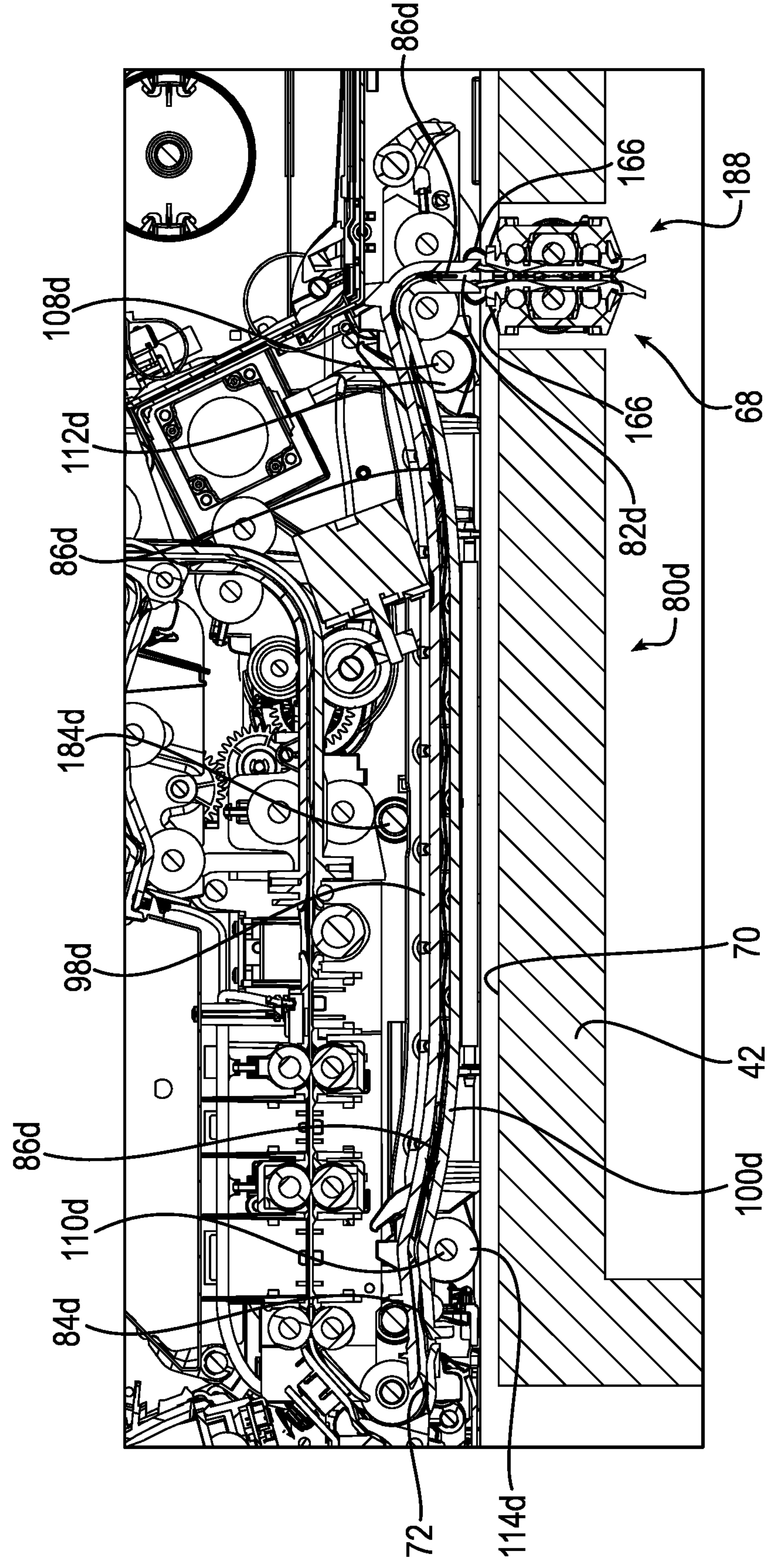
FIG. 36 is magnified portion of the cross-section shown in FIG. 35.

In the present disclosure, the upper portion of the ATM can interconnect with the bottom portion of the ATM in a plurality of different modular arrangements. For example, in a first modular arrangement, the lower portion of the ATM can be front-loading and the upper portion of the ATM can rest on the lower portion without any offset or with insignificant offset between the upper and lower portions. FIG. 4 shows a recycler of an upper portion supported on a safe of a lower portion in a front-loading orientation with no offset. FIG. 14 shows a second modular arrangement without offset, with the recycler of the upper portion supported on the safe of the lower portion as the safe is arranged in a rear-loading orientation. FIG. 15 shows a third modular arrangement with the safe arranged in the front-loading orientation and the recycler disposed on the safe at a first extent of offset. FIG. 25 shows a fourth modular arrangement with the safe arranged in the rear-loading orientation and the recycler disposed on the safe at a second extent of offset. FIG. 35 shows a fifth modular arrangement with the safe arranged in the rear-loading orientation and the recycler disposed on the safe at a third extent of offset. It is noted that the second extent of offset is greater than the third extent of offset.

Figure 2:
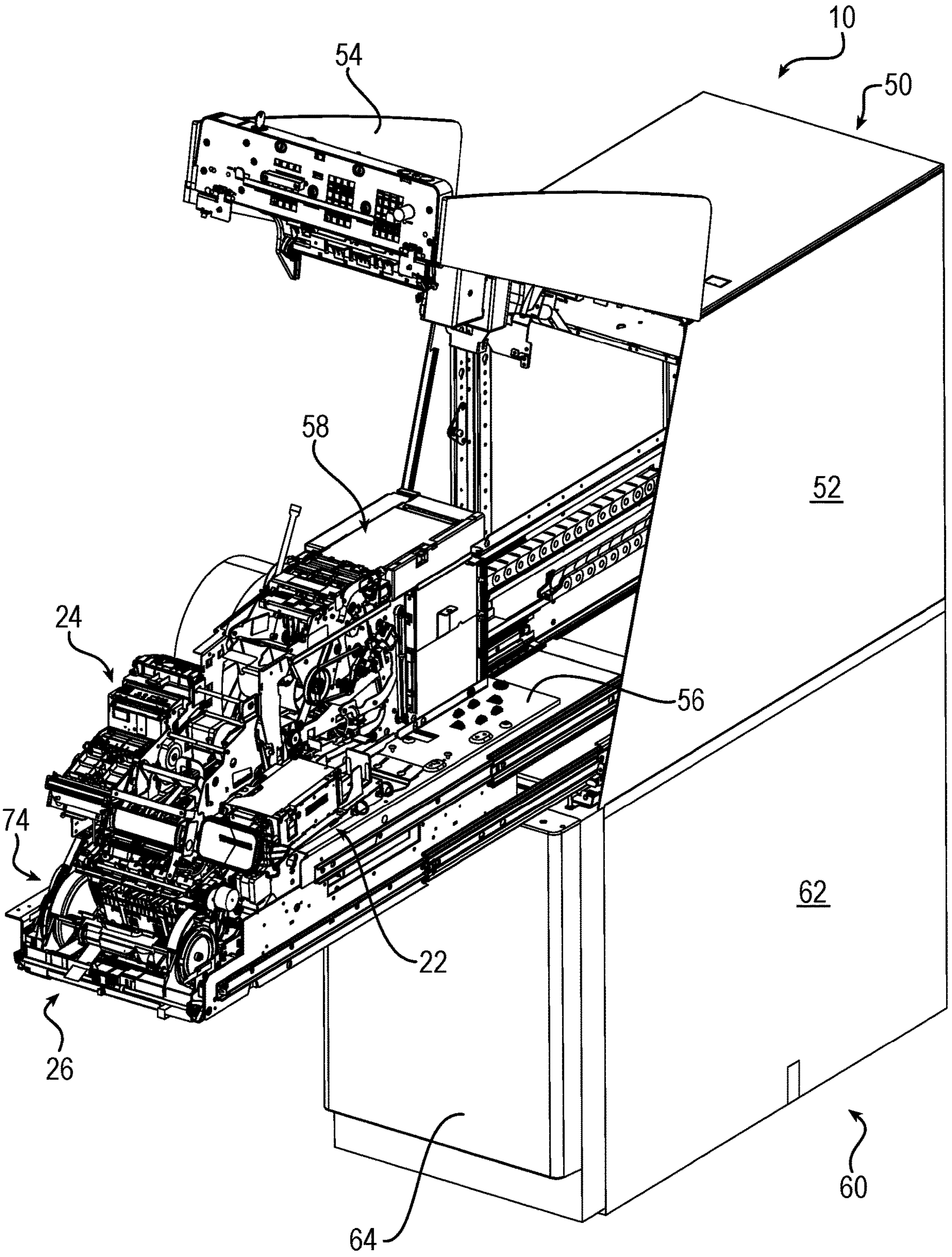
FIG. 2 is a second perspective view of the ATM shown in FIG. 1, with a fascia of the ATM opened and internal subcomponents of an upper portion of the ATM pulled out of a shell of the ATM.
Figure 3:
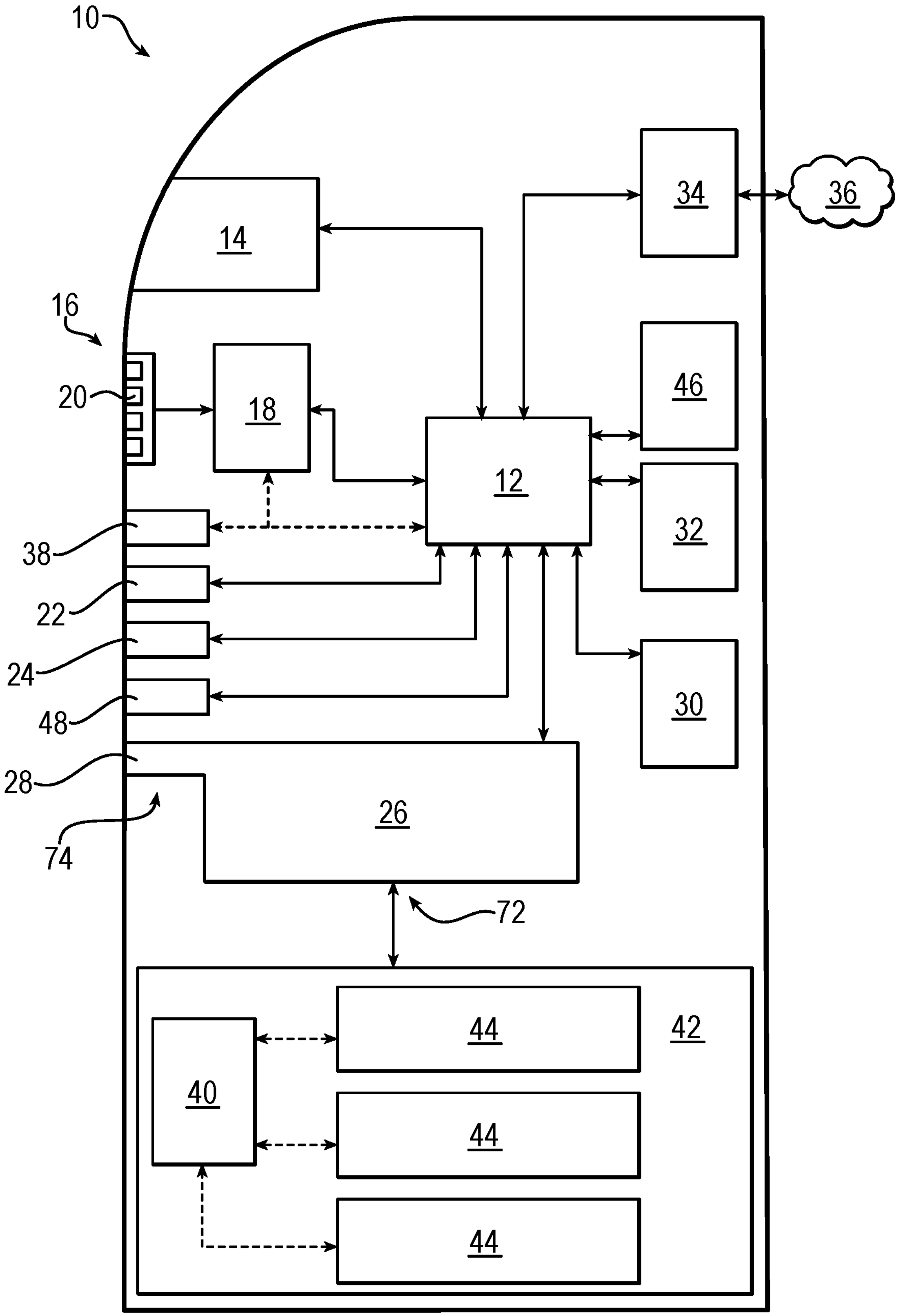
FIG. 3 is a schematic representation of the subsystems of the ATM shown in FIG. 1.

Referring now to the drawings, FIGS. 1-3 disclose an exemplary ATM 10 according to one or more implementations of the present disclosure. The ATM 10 includes different structures and subsystems for receiving input from a user and executing transactions. The ATM 10 includes a computing device 12. The computing device 12 can be viewed a primary or overall controller of the ATM 10. The exemplary computing device 12 has one or more processors and a non-transitory, computer readable medium. The computing device 12 operates under the control of an operating system, kernel, and/or firmware and executes or otherwise relies upon various computer software applications, components, programs, objects, modules, data structures, etc. The exemplary computing device 12 can operate under the control of the Windows® operating system. The computer readable medium (memory) of the computing device 12 can include random access memory (RAM) devices comprising the main storage of computing device 12, as well as any supplemental levels of memory, e.g., cache memories, non-volatile or backup memories (e.g., programmable or flash memories), read-only memories, etc. In addition, the memory may be considered to include memory storage physically located elsewhere from RAM in the computing device 12, such as any cache memory in a processor, as well as any storage capacity used as a virtual memory. The computing device 12 can also include one or more mass storage devices such as, for example, a floppy or other removable disk drive, a hard disk drive, a direct access storage device (DASD), an optical drive (e.g., a CD drive, a DVD drive, etc.), and/or a tape drive, among others, represented by memory 46.

The exemplary computing device 12 can be housed in an upper portion 50 of the ATM 10. The upper portion 50 can also include a shell 52. The exemplary shell 52 extends around three sides of the upper portion 50 of the ATM 10. The upper portion 50 can also include a fascia 54 pivotally mounted to the shell 52. The fascia 54 can selectively close a fourth side of the upper portion 50 of the ATM 10.

The exemplary ATM 10 also includes a display 14. The exemplary display 14 is mounted in the fascia 54. The computing device 12 can control the display 14 to present information to the user for furthering the completion of the transaction. The display 14 can be a touch screen that allows the user to enter information through the display 14. The exemplary display 14 is configured to transmit any user-entered information to the computing device 12.

The exemplary ATM 10 also includes a key pad 16 and an encryption module 18. Generally, the combination of a key pad and an encryption module are referred to in the art as an encrypted pin pad (EPP). The exemplary EPP is mounted in the fascia 54. The exemplary key pad 16 includes a plurality of keys, such as key 20. The exemplary encryption module 18 has one or more processors and a non-transitory, computer readable medium. The user can press the keys of the key pad 16 to enter a Personal Identification Number (PIN). The key pad 16 is placed in communication with the encryption module 18 and therefore the numbers of the PIN are received by the encryption module 18. It is noted that the communication of the PIN is direct and secure; the PIN cannot be intercepted between the key pad 16 and the encryption module 18. The PIN is then encrypted by the encryption module 18 to define a PIN block. The encryption module 18 includes a network encryption key and applies the network encryption key to encrypt the PIN to the PIN block. The exemplary encryption module 18 is configured to transmit the PIN block to the computing device 12, which can direct the PIN block away from the ATM 10 during the completion of a financial transaction.

The exemplary ATM 10 also includes a card reader 22. The exemplary card reader 22 is disposed on a tray 56 that can be selectively drawn out of the shell 52 when the fascia 54 is in an open position (FIG. 2). When the tray 56 is moved back into the shell 52, the fascia 54 can be moved to a closed position (FIG. 1). The card reader 22 can receive a token from the user, such as a card. The card reader 22 can be configured to execute read and write operations with respect to any storage medium fixed to the user's card. The exemplary card reader 22 can be configured to read data from a magnetic strip on the back of a card or a chip embedded in the card. The exemplary card reader 22 can be configured to transmit any data read from the user's card to the computing device 12, which can direct the data read from the card away from the ATM 10 during the completion of a financial transaction. The exemplary card reader 22 can also be configured to receive commands and data from the computing device 12 and change data stored on the user's card.

The exemplary ATM 10 also includes a printer module 24. The printer module 24 is also disposed on the tray 56. The computing device 12 can control the printer module 24 to print a receipt for a user when a transaction has been completed. The printer module 24 can communicate one or more messages to the computing device 12, such as a maintenance message regarding the need to refill printer paper.

The exemplary ATM 10 also includes a check receiver/reader 58. The check receiver/reader 58 is also disposed on the tray 56. The computing device 12 can control the check receiver/reader 58 to receive a check from a user and read indicia printed on the check. The check receiver/reader 58 can communicate one or more messages to the computing device 12, such as the data read from a received check or that the indicia on the check could not be read.

The exemplary ATM 10 also includes a recycler 26. In the exemplary embodiment, the recycler 26 is not mounted on the tray 56 but under the tray 56 and is mounted such that it can be drawn out of the shell 52 like the tray 56. The exemplary recycler 26 is configured to receive and dispense paper currency. The recycler 26 can extend along a horizontal longitudinal axis 142 between a forward end 144 and an aft end 146. As referenced in FIG. 4, the recycler 26 can also extend along a horizontal lateral axis 148 between a right side 150 and a left side 152. The axes 142, 148 are perpendicular to one another.

Figure 5:
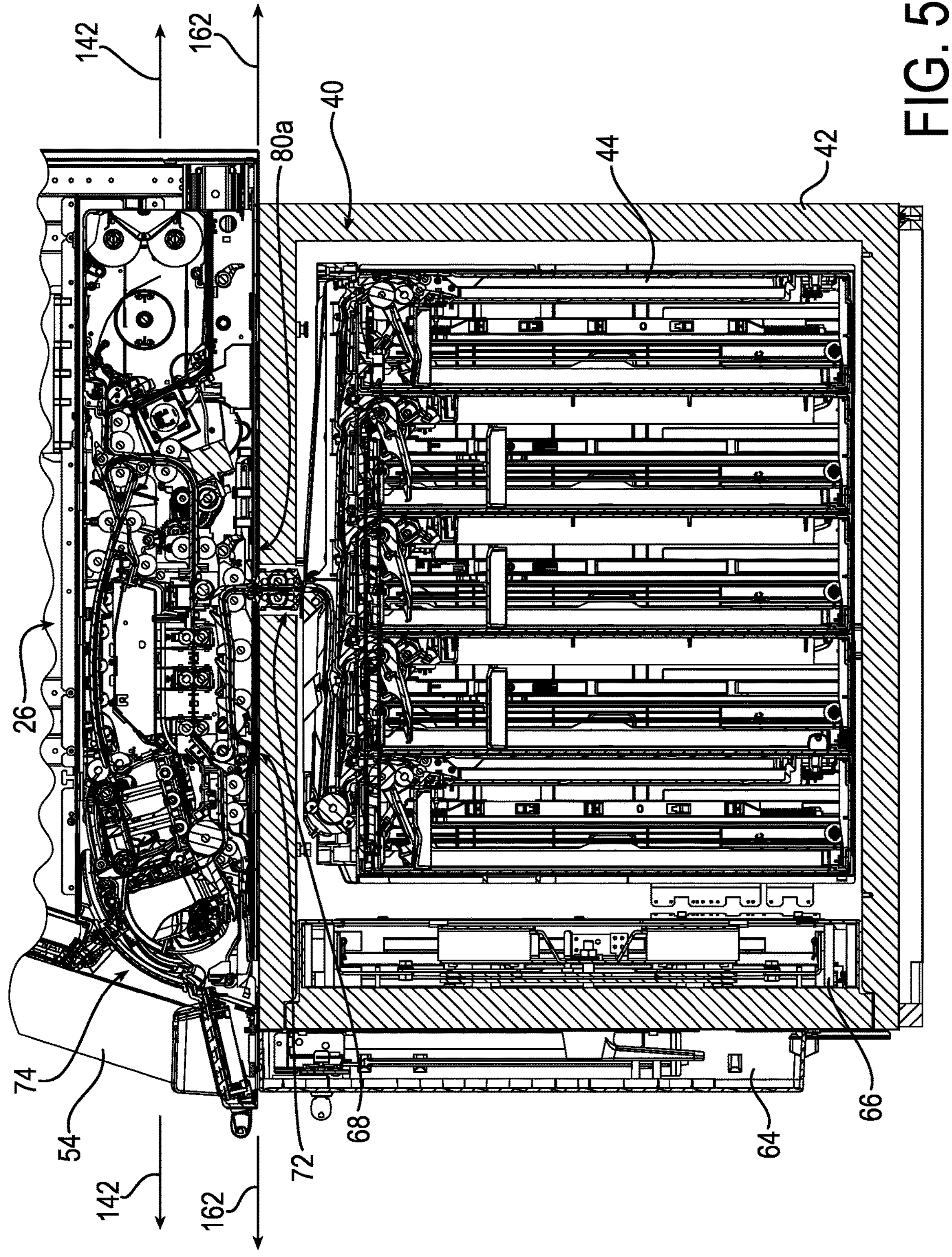
FIG. 5 is a cross-section taken through section lines 5-5 in FIG. 1.

The exemplary recycler 26 communicates with the exterior of the ATM 10 through a slot 28 in the fascia 54. As best shown in FIG. 5, the recycler 26 can define a second port 72 and a third port 74. In the exemplary embodiment, the third port 74 is proximate to the slot 28 in the fascia 54 and the second port 72 is remote from the slot 28 in the fascia 54. The recycler 26 can be configured to receive banknotes through the second port 72 and direct received banknotes to the third port 74. The recycler 26 can also be configured to receive banknotes through the third port 74 and direct received banknotes to the second port 72. Banknotes can move in either direction through the recycler 26 between the second port 72 and the third port 74, based on the operation being performed by the ATM 10. The second port 72 and the third port 74 can thus be viewed as entry/exit slots. The recycler 26 can include one or more sensors and transmit signals from any such sensors to the computing device 12 to execute an operation. The computing device 12 can control the recycler 26 in response to such signals. For example, the recycler 26 can include a sensor that detects if currency received is counterfeit or if currency notes are bundled or "stuck" together rather than moving singularly through the recycler 26. The computing device 12 can respond to such signals by changing the direction of movement of the banknotes, or by directing some other action.

The exemplary ATM 10 also includes a printer module 30. The printer module 30 can generate a continuous record of all transactions executed by the ATM 10. The computing device 12 can control the printer module 30 to supplement the record after each transaction has been completed. The printer module 30 can communicate one or more messages to the computing device 12, such as a maintenance message regarding the need to refill printer paper.

The exemplary ATM 10 also includes an access module 32. The access module 32 can be positioned proximate to a rear side of the ATM 10. The access module 32 can be utilized by service and support technicians. For example, the access module 32 can be utilized by a field engineer to complete software updates to the computing device 12. The access module 32 can also be utilized when non-software updates and maintenance is performed, such as the refilling of printer paper or currency.

The exemplary ATM 10 also includes a transceiver 34. The exemplary transceiver 34 is configured to facilitate communication between the computing device 12 and other computing devices that are distinct from and physically remote from the computing device 12. An example of such a remote computing device is a server computing device, such as a banking or financial institution server communicating with a plurality of ATMs. The exemplary transceiver 34 places the computing device 12 in communication with one or more networks, such as network 36. The network 36 can be a local area network (LAN), a wide area network (WAN) such as the Internet, a Multi-protocol label switching (MPLS) network, a cellular network such as operated by cellular phone companies, or any combination thereof. The network 36 can be a financial/bank network such as NYCE, PULSE, PLUS, Cirrus, AFFN, Intern, Interswitch, STAR, LINK, MegaLink, or BancNet. The transceiver 34 can transmit data and requests for input generated by the computing device 12 and receive responses to these requests, directing these responses to the computing device 12.

The exemplary ATM 10 also includes a transceiver 38. The exemplary transceiver 38 is configured to facilitate communication between at least one of the encryption module 18 and the computing device 12 and other computing devices that are distinct from and physically proximate to the ATM 10. An example of such a proximate computing device is a smartphone possessed by the user. The dashed connection lines in FIG. 1 represent optional interconnections. The exemplary transceiver 38 can place the user's smartphone in communication with the encryption module 18, the computing device 12, or both. The exemplary transceiver 38 can implement various communication protocols. For example, the transceiver 38 can be a Near Field Communication (NFC) device. Alternatively, the transceiver 38 can be a Bluetooth beacon. The transceiver 38 can transmit and receive data and requests for input generated by the encryption module 18 and/or the computing device 12, such transmissions occurring with the user's smart phone for example.

The exemplary ATM 10 also includes a safe 42. The recycler 26 can be positionable proximate to a top 70 of the safe 42. The safe 42 can be housed in a lower portion 60 of the ATM 10. The lower portion 60 can also include a shell 62. The exemplary shell 62 extends around three sides of the lower portion 60 of the ATM 10. The exemplary lower portion 60 also includes a door 64 pivotally mounted to the shell 62. The door 64 can selectively close a fourth side of the lower portion 60 of the ATM 10. The safe 42 can have a door 66 and a first port 68 (first referenced in FIG. 5) spaced from the door 66. The safe 42 can also include a boot 166 (first referenced in FIG. 6) mounted at the top 70 over the first port 68.

The recycler 26 can be positionable in a plurality of different orientations on the top 70 of the safe 42 and also at a plurality different offsets relative to the top 70 of the safe 42. Orientations are relative "facing" directions and offset is the extent of overhang of the forward end 144 of the recycler 26 over the closest lateral edge of the safe 42 when the recycler 26 is in the operating position. An example of a "closest lateral edge" of the safe 42 is referenced at 76 in FIG. 4. Offset in various embodiments can be negative, wherein the forward end 144 of the recycler 26 is recessed from the closest lateral edge of the safe 42. Offset in various embodiments can be zero, wherein the forward end 144 of the recycler 26 and the closest lateral edge of the safe 42 are in the same vertically-extending plane. Offset in various embodiments can be positive, wherein the forward end 144 of the recycler 26 is cantilevered relative to the closest lateral edge of the safe 42. FIG. 4 shows a first modular arrangement with the recycler 26 on the safe 42 having the same orientation (both are forward facing), with negative offset. FIG. 14 shows a second modular arrangement with the recycler 26 on the safe 42 having the opposite orientation (the safe 42 is facing aft, a "rear-loading orientation"), without no offset. The closest lateral edge of the safe 42 is referenced at 78 in FIG. 14. FIG. 15 shows a third modular arrangement with the safe 42 arranged in a front-loading orientation as is the recycler 26 and the recycler 26 is disposed on the safe 42 at a first extent of offset. The closest lateral edge of the safe 42 is referenced at 76 in FIG. 15. FIG. 25 shows a fourth modular arrangement with the safe 42 arranged in the rear-loading orientation and the recycler 26 disposed on the safe 42 at a second extent of offset. The closest lateral edge of the safe 42 is referenced at 78 in FIG. 25. FIG. 35 shows a fifth modular arrangement with the safe 42 arranged in the rear-loading orientation and the recycler 26 disposed on the safe 42 at a third extent of offset. The closest lateral edge of the safe 42 is referenced at 78 in FIG. 35.

Figure 17:
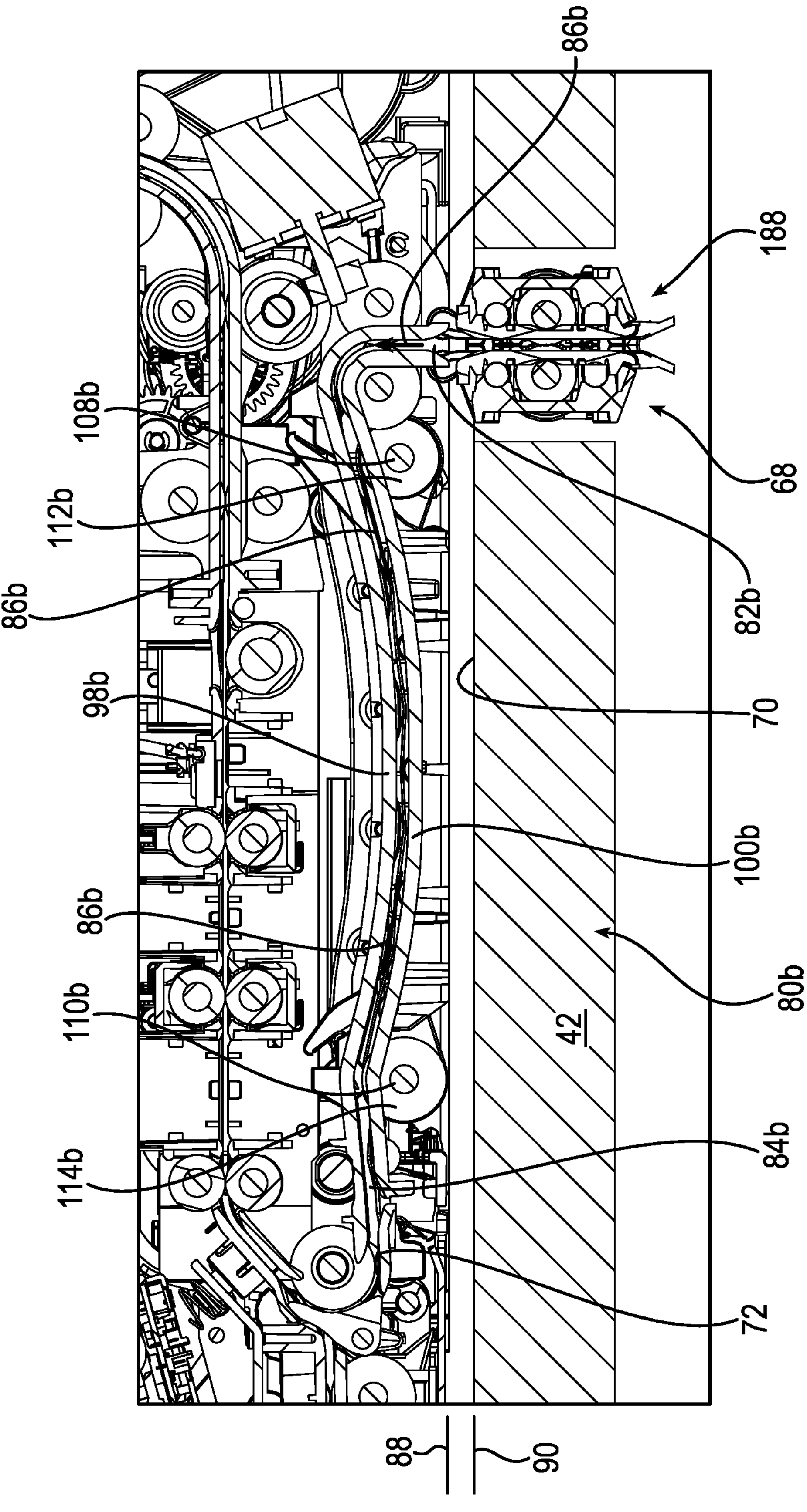
FIG. 17 is magnified portion of the cross-section shown in FIG. 16.

The recycler 26 can extend downwardly to a first horizontal plane and the top 70 can be at least partially disposed in a second horizontal plane. An exemplary first horizontal plane is referenced at 88 in FIG. 17 and the exemplary second horizontal plane is referenced at 99 in FIG. 17. The first horizontal plane 88 can be parallel to and spaced from the second horizontal plane 90. The exemplary first horizontal plane 88 is above and confronts/faces towards the exemplary top 70 of the safe 42. Thus, a gap is formed between the bottom of the recycler 26 and the top 70.

The exemplary ATM 10 can also include first and second telescopic tracks, referenced at 132 and 134 in FIG. 15. The telescopic tracks 132, 134 interconnect the recycler 26 and the safe 42. The recycler 26 can thus be moveable relative to the first port 68 which is fixed in the exemplary embodiment. The recycler 26 can be horizontally slidable through the first and second telescopic tracks 132, 134 between an extended position and a retracted position. The recycler 26 is shown in the extended position in FIG. 2. The recycler 26 is shown in the retracted position in FIGS. 4, 5, 14-16, 25, 26, and 35. Operations of the ATM 10 occur when the recycler 26 is in the retracted position.

The exemplary ATM 10 also includes a secondary dispenser 40. The secondary dispenser 40 can move banknotes, such as currency. The exemplary secondary dispenser 40 is positioned in the safe 42. One or more cassettes or cash boxes 44 are also positioned and protected in the safe 42. Banknotes are stored in the cassettes 44 for disbursement to a user of the ATM 10. The exemplary secondary dispenser 40 can extract the banknotes from one or more of the cassettes 44 and direct them to the recycler 26 through the first port 68 in the safe 42. The exemplary secondary dispenser 40 can also receive banknotes from the recycler 26 through the first port 68 and direct the banknotes to the one or more of the cassettes 44. Banknotes can move in either direction through the first port 68, based on the operation being performed by the ATM 10. The first port 68 can thus be viewed as an entry/exit slot. The exemplary secondary dispenser 40 can communicate with and be controlled by the computing device 12 for at least some operations. Each of the cassettes 44 can and the secondary dispenser 40 can be mounted together on a rack in the safe 42 whereby the positioning of the cassettes is controlled. Further, the each of the cassettes 44 and the secondary dispenser 40 can include mating connectors of any form, whereby a positive interconnection is confirmed electronically. When one or more of the cassettes 44 and the secondary dispenser 40 are not properly interconnected, a signal or lack thereof can be communicated to or sensed by the computing device 12 whereby an error message is generated or the ATM 10 can be disabled.

As referenced in FIG. 15, the top 70 of the safe 42 can extend along a horizontal longitudinal axis 162 between a forward end and an aft end and can also extend along a horizontal lateral axis 164 between a right side and a left side. The axes 162, 164 are perpendicular to each other. The first port 68 can be substantially centered on the top 70 along both of the horizontal longitudinal axis 162 and the horizontal lateral axis 164.

The exemplary ATM 10 also includes a scanner 48. The scanner 48 can scan, for example, at least a portion of a display of a smart phone and communicate the scanned display to the computing device 12. A token can be displayed on the display of the smart phone and thus scanned by the scanner 48. The token can be a bar code, a quick response (QR) code, a number, a string of alphanumeric characters, a weblink, or some other symbolic indicia. The exemplary scanner 48 is configured to transmit any scanned data to the computing device 12, which can direct the scanned away from the ATM 10 during completion of a financial transaction.

The exemplary modular ATM 10 also includes a plurality of linking transport assemblies 80*a*-80*d*. Each of the plurality of linking transport assemblies 80*a*-80*d* can individually be engageable with the recycler 26. "Individually" refers to only one linking transport assembly is engageable with the recycler 26 at a time. Each of the linking transport assemblies 80*a*-80*d* correspond to one of the modular arrangements.

Referring now to FIGS. 6-13, the linking transport assembly 80*a* can be fully disposed above the first horizontal plane 88 when individually engaged with the recycler 26 and not extend below the recycler 26. However, it is noted that this is not a requirement of all embodiments and all modular arrangements. The linking transport assembly 80*a* can have a fourth port 82*a* configured to engage the first port 68 of the safe 42 and a fifth port 84*a* configured to engage the second port 72 of the recycler 26. The fourth and fifth ports 82*a*, 84*a* can be slots for the passage of banknotes. Banknotes can move in either direction through the fourth and fifth ports 82*a*, 84*a*, based on the operation being performed by the ATM 10. The fourth and fifth ports 82*a*, 84*a* can thus be viewed as entry/exit slots. The linking transport assembly 80*a* can define a transport path along which banknotes are moved between the fourth port 82*a* the fifth port 84*a*. The transport path is referenced by arrows 86*a*. The linking transport assembly 80*a* can be individually positionable between the top 70 of the safe 42 and a bottom of the recycler 26.

Figure 7:
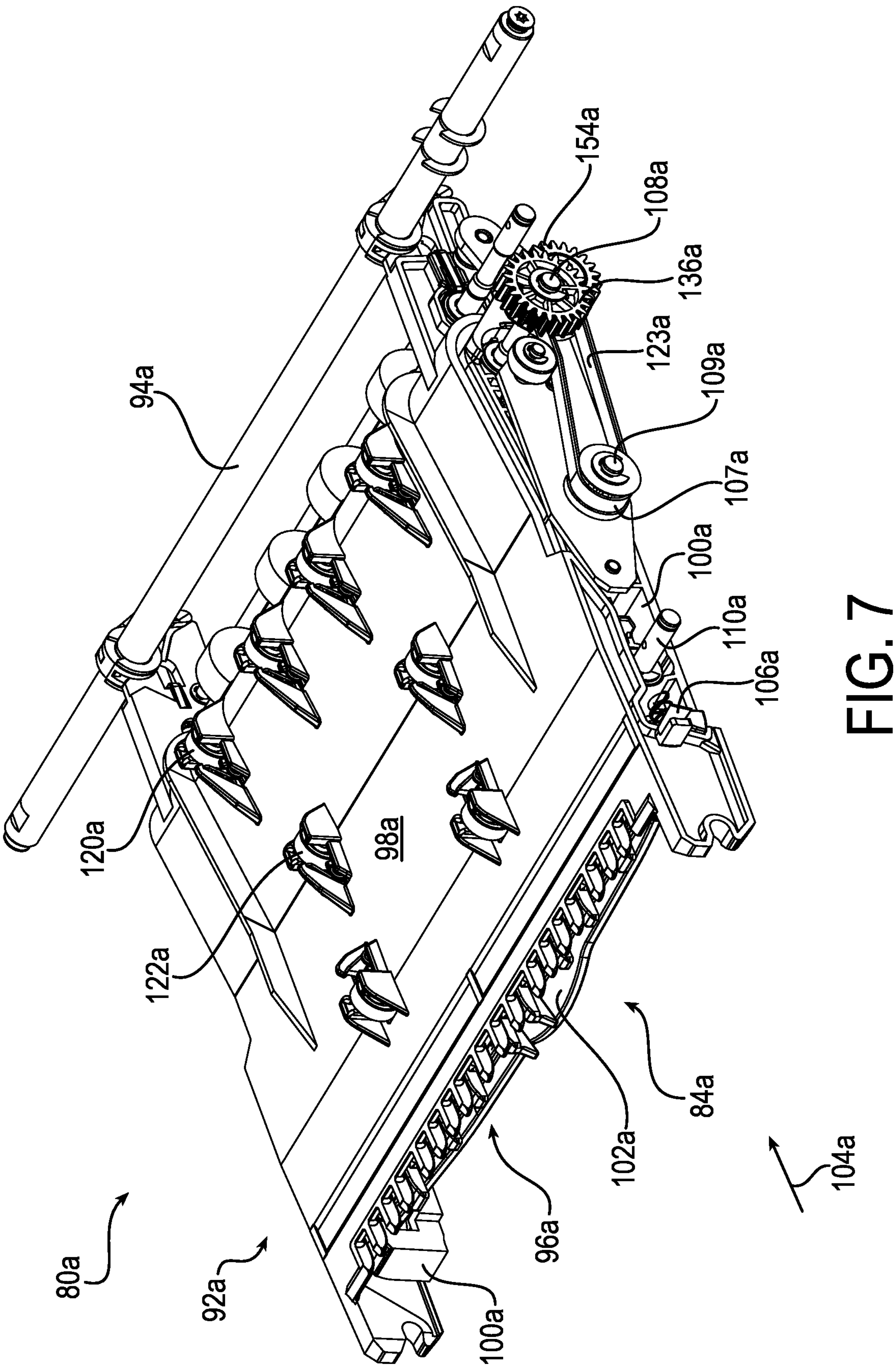
FIG. 7 is a perspective view of a linking transport assembly incorporated by the ATM in the first modular arrangement.
Figure 8:
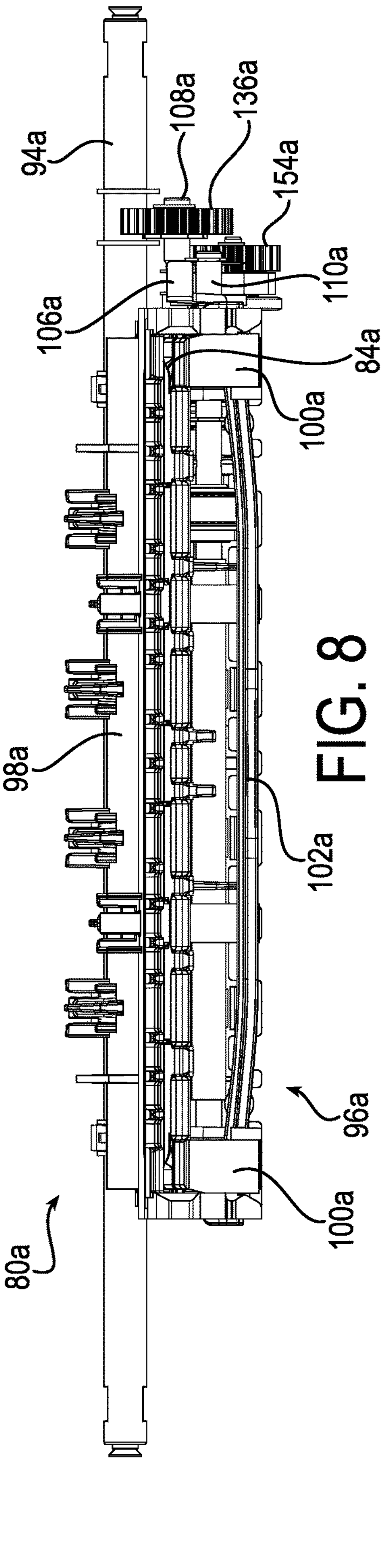
FIG. 8 is a front view of the linking transport assembly shown in FIG. 7.
Figure 9:
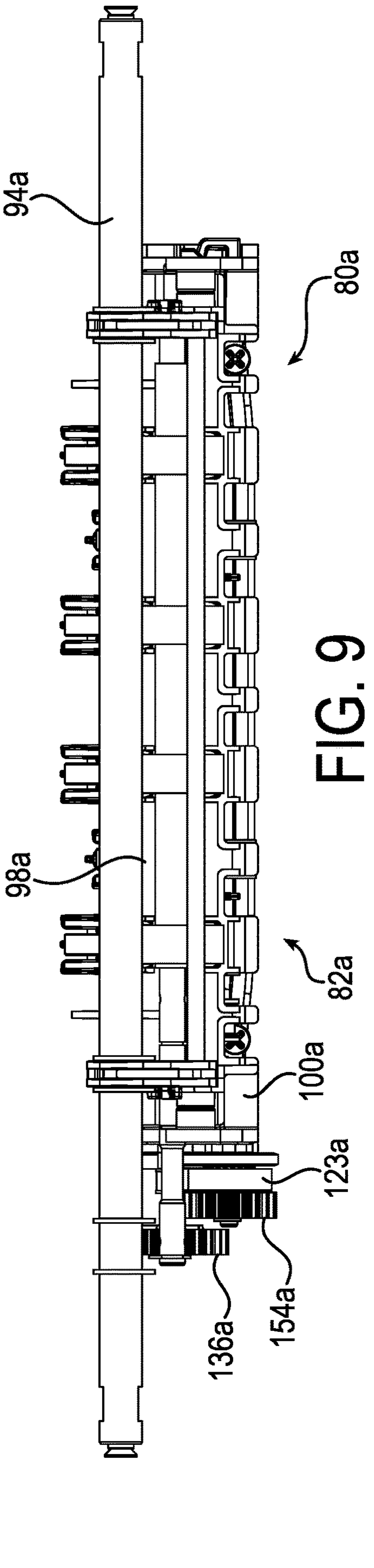
FIG. 9 is a back view of the linking transport assembly shown in FIG. 7.
Figure 10:
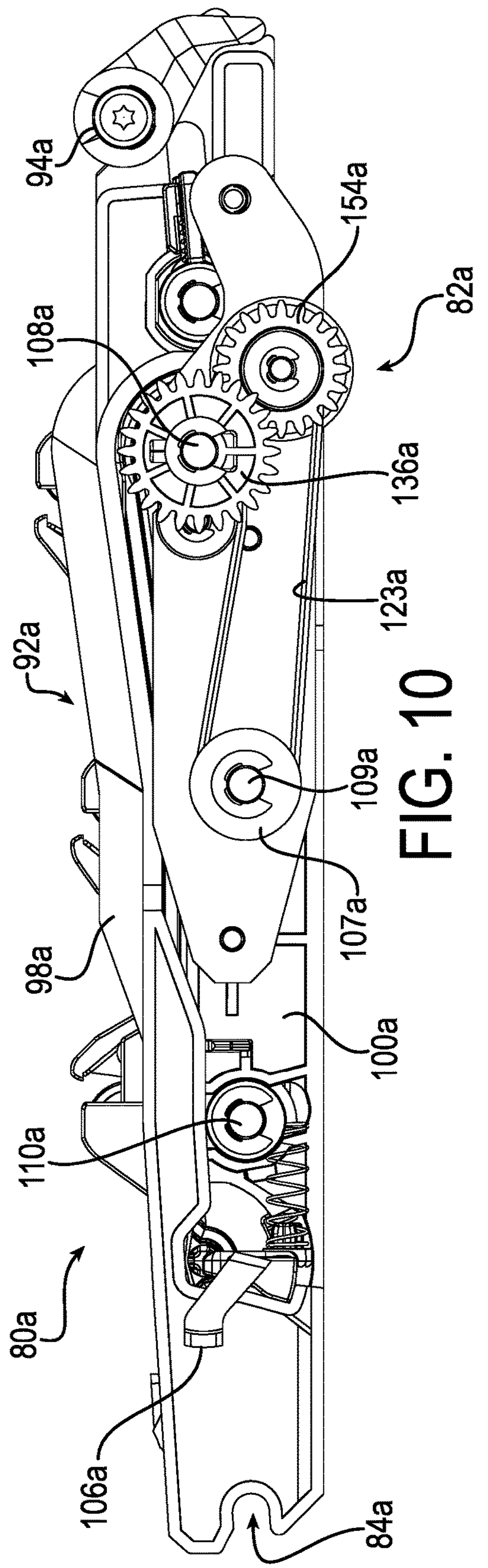
FIG. 10 is a right-side view of the linking transport assembly shown in FIG. 7.
Figure 11:
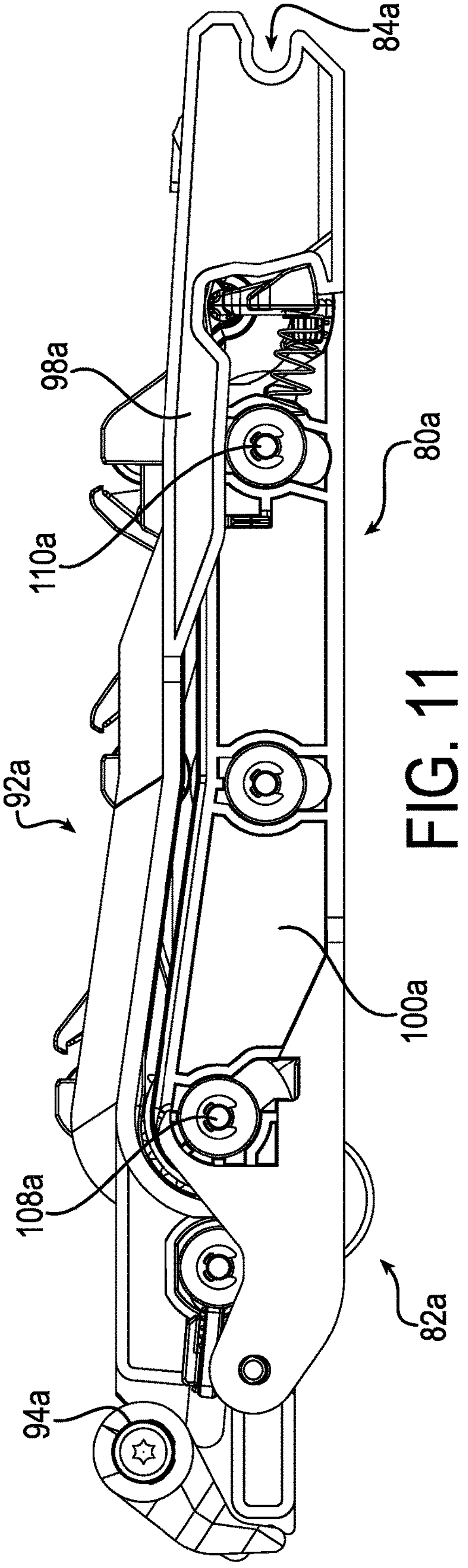
FIG. 11 is a left-side view of the linking transport assembly shown in FIG. 7.

The linking transport assembly 80*a* can include a body 92*a*, at least one pivot shaft 94*a*, and a lock 96*a*. The body 92*a* can define the transport path 86*a* along which banknotes move between the fourth port 82*a* and the fifth port 84*a*. The body 92*a* can include first and second plate members 98*a*, 100*a* interconnected together through the pivot shaft 94*a*. The transport path 86*a* can extend between the first and second plate members 98*a*, 100*a*. The exemplary first plate member 98*a* is interconnected to the recycle 26. The at least one pivot shaft 94*a* can be engaged with the body 92*a* and define the axis about which the plate member 100*a* and structures mounted on the plate member 100*a* are pivotally moveable. The at least one pivot shaft 94*a* can be mounted to the recycler 26. The lock 96*a* can be mounted on the body 92*a* closer to the fifth port 84*a* than the fourth port 82*a*. The lock 96*a* can be configured to releasably interconnect the plate 100*a* and the recycler 26 and thereby prevent pivoting movement of the plate member 100*a* of the body 92*a* about the pivot shaft 94*a*. As best shown in FIG. 7, the exemplary lock 96*a* can include a graspable portion 102*a* that can be pulled/pushed in a direction 104*a* to withdraw a hook portion 106*a* from a notch (not visible) in the recycler 26. The second plate member 100*a* can then be pivoted about the pivot shaft 94*a*. The plate member 98*a* can remain interconnected to the recycler 26 when the plate member 100*a* is pivotally moved.

The linking transport assembly 80*a* can also include a plurality of beams, such as at least first and second beams 108*a*, 110*a*. The beams 108*a*, 110*a* can be supported for rotation on the plate member 100*a* of the body 92*a* outside of the transport path 86*a*. Each beam 108*a*, 110*a* can support a friction roller, such as friction rollers 112*a* and 114*a*. Each of the friction rollers can extend through one of a plurality of apertures, such as apertures 116*a* and 118*a*, defined in one of the first and second plate members 98*a*, 100*a* to thereby extend into the transport path 86*a* to engage banknotes moving along the transport path 86*a* to move the banknotes along the transport path 86*a*. Free or undriven rollers, such as rollers 120*a*, 122*a*, can be positioned against the friction rollers so that banknotes are pinched between the friction rollers and the free rollers during movement along the transport path 86*a*. The linking transport assembly 80*a* can also include at least one belt, such as belt 124*a*, 125*a*, interconnecting the beams 108*a*, 110*a* for concurrent rotation in the same rotational direction.

Figure 44:
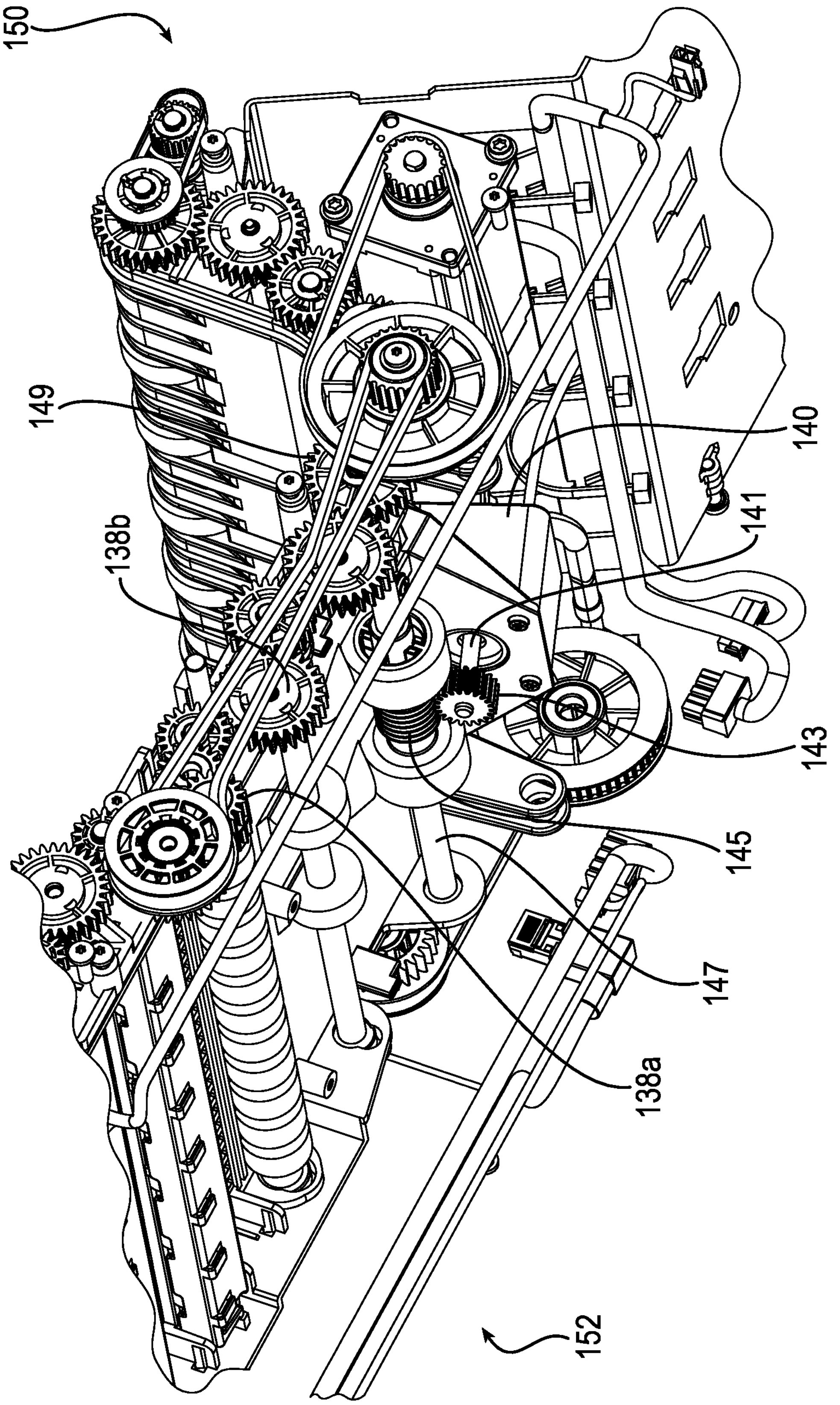
FIG. 44 is a perspective view of a bottom side of some of the internal components of a recycler of the exemplary embodiment of the present disclosure.
Figure 45:
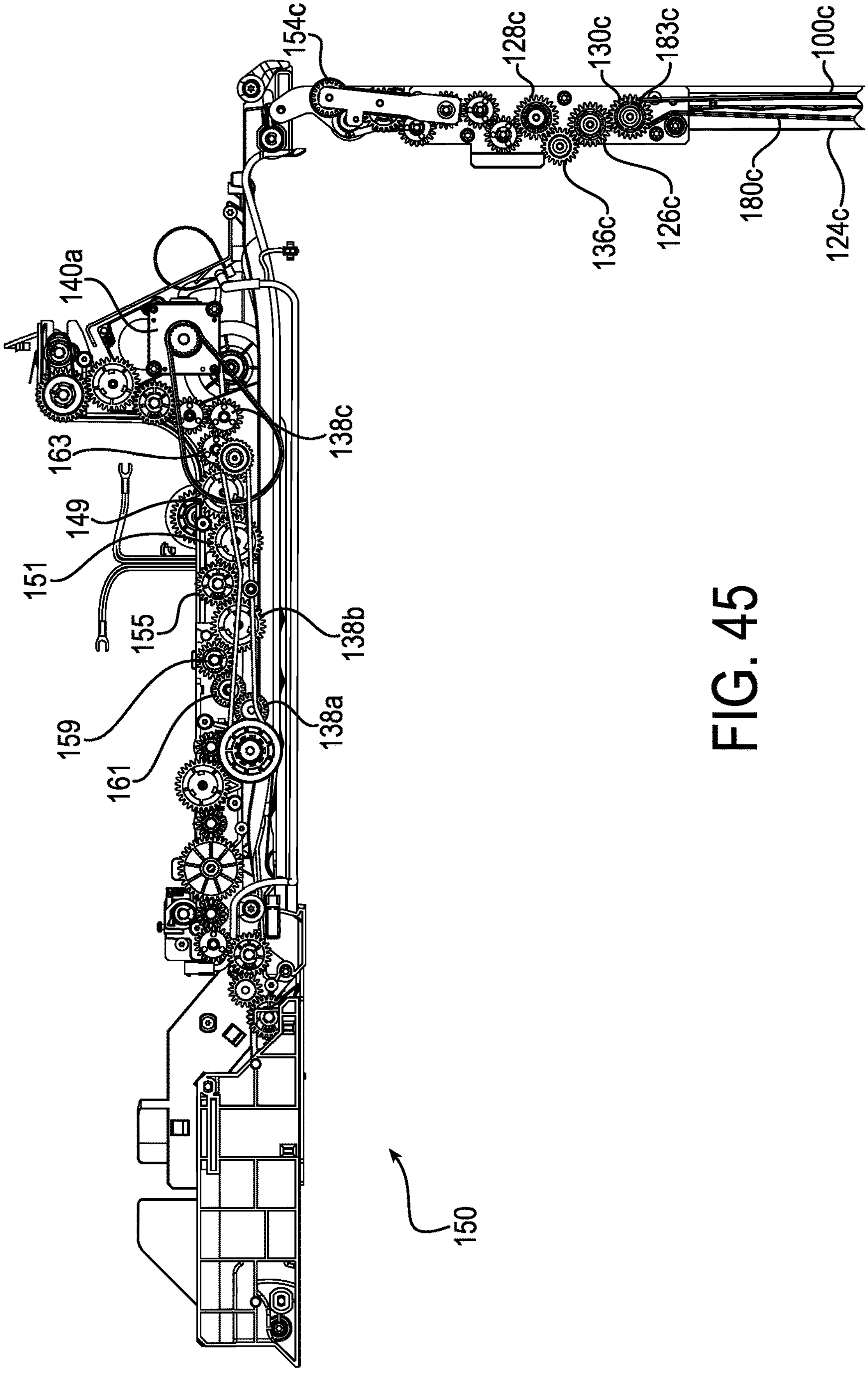
FIG. 45 is a side view of some of the internal components of the recycler and portions of the linking transport assembly shown in FIG. 28, with a second plate member of the linking transport assembly pivoted away from the recycler.
Figure 46:
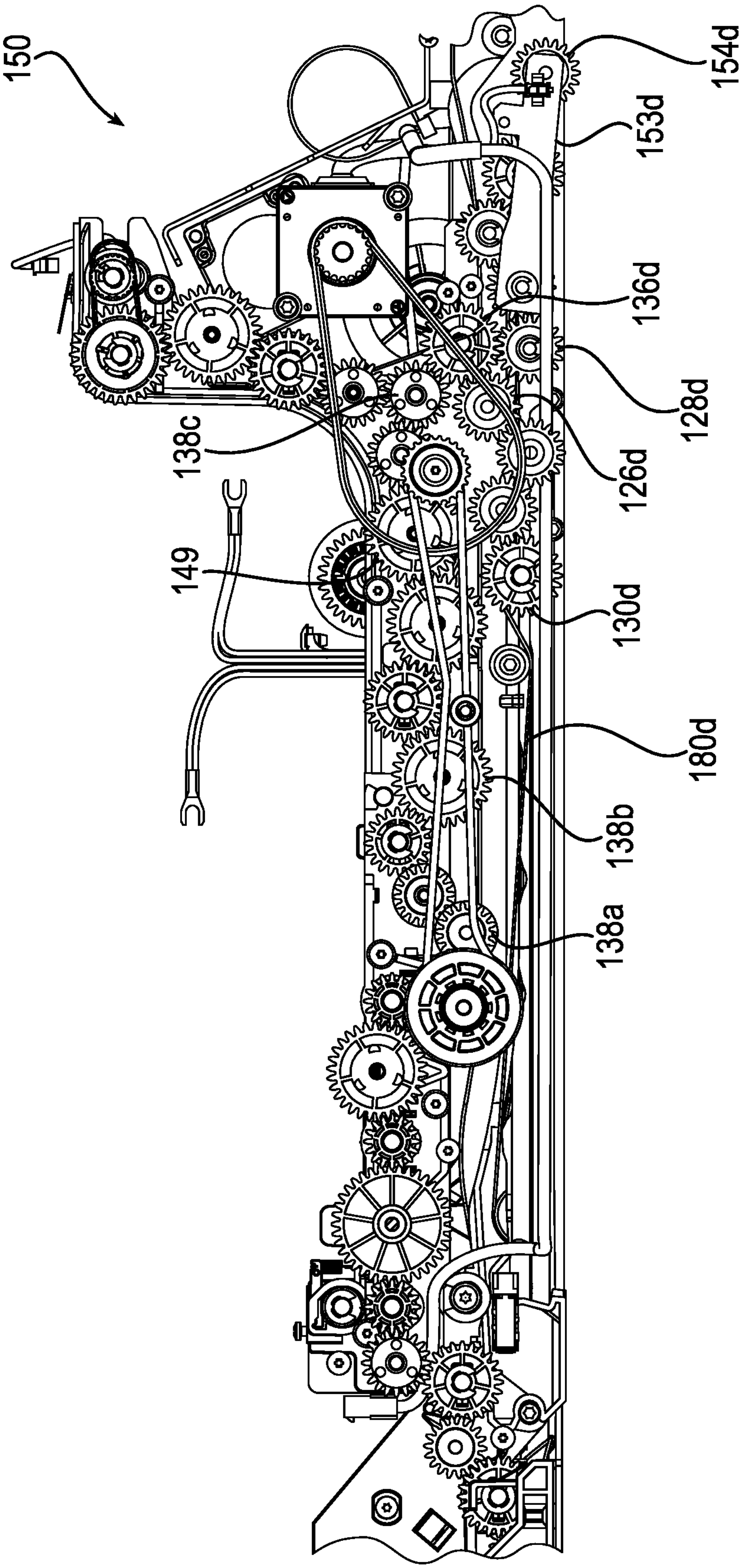
FIG. 46 is a side view of some of the internal components of the recycler and portions of the linking transport assembly shown in FIG. 37 when engaged with one another in operation.

The linking transport assembly 80*a* can also include an input member 136*a* configured to rotate and receive rotational power. The exemplary input member 136*a* is fixed on the beam 108*a* for concurrent rotation in the same rotational direction. As best shown in FIGS. 44-46, the recycler 26 can also include an output member 138*a* and a motor 140 driving the output member 138*a* in rotation. The motor 140 includes a motor shaft 141. A spur gear 143 is mounted on the shaft 141. The spur gear 143 meshes with and drives a worm gear 145 associated with a shaft 147. A spur gear 149 is also mounted on the shaft 147. The spur gear 149 drives the output member 138*a* through a plurality of intermediary spur gears 151, 155, 138*b*, 159, and 161.

The output member 138*a* can be positioned to engage the input member 136*a* of the linking transport assembly 80*a*. The output member 138*a* can be configured to transmit rotation to the input member 136*a* of the linking transport assembly 80*a*, such as for rotating the beams 108*a*, 110*a*. The exemplary input member 136*a* of the linking transport assembly 80*a* can be a first gear. The exemplary output member 138*a* of the recycler 26 can be a second gear that meshes with the first gear.

Figure 12:
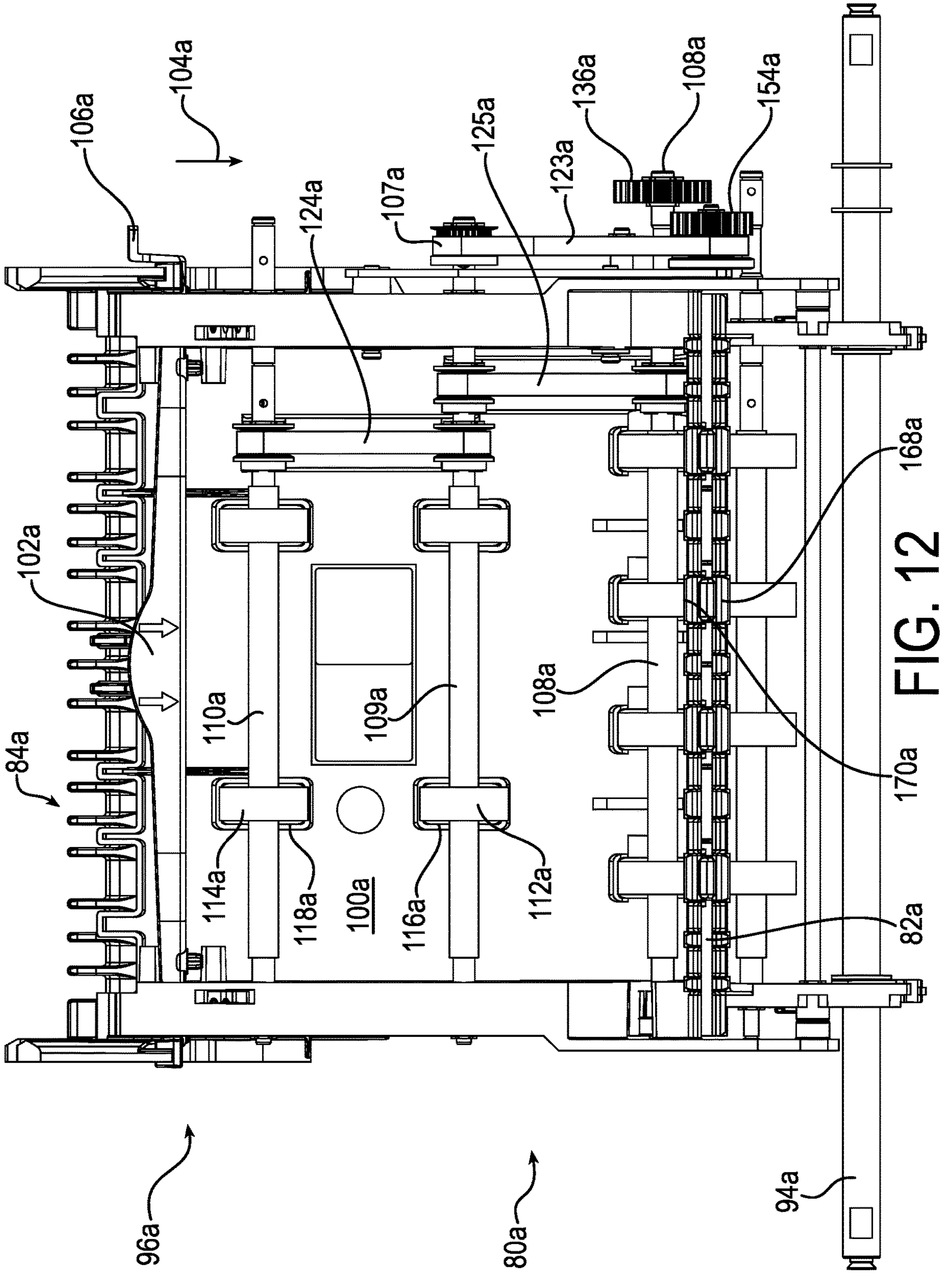
FIG. 12 is a bottom view of the linking transport assembly shown in FIG. 7.
Figure 13:
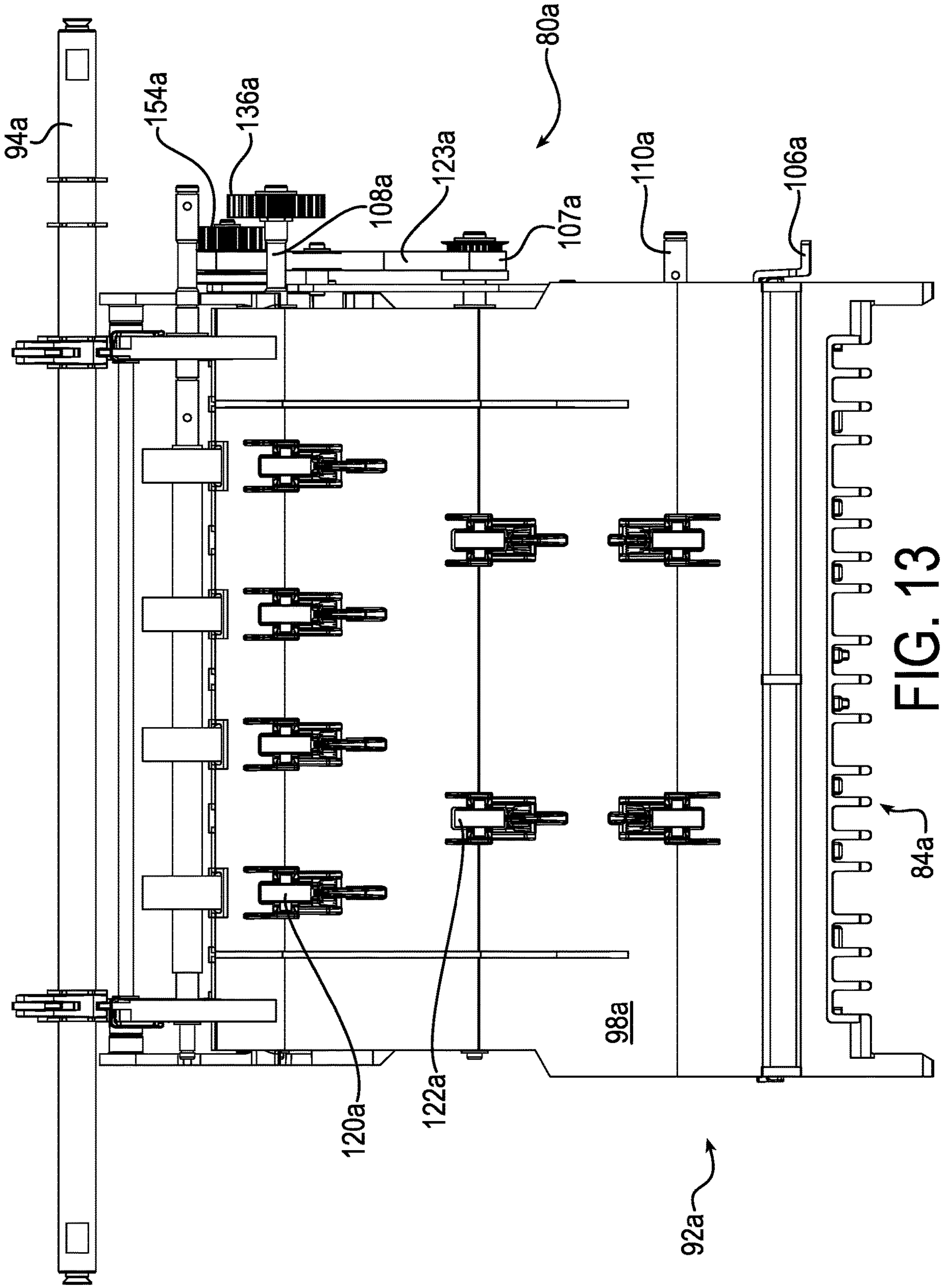
FIG. 13 is a top view of the linking transport assembly shown in FIG. 7.
Figure 47:
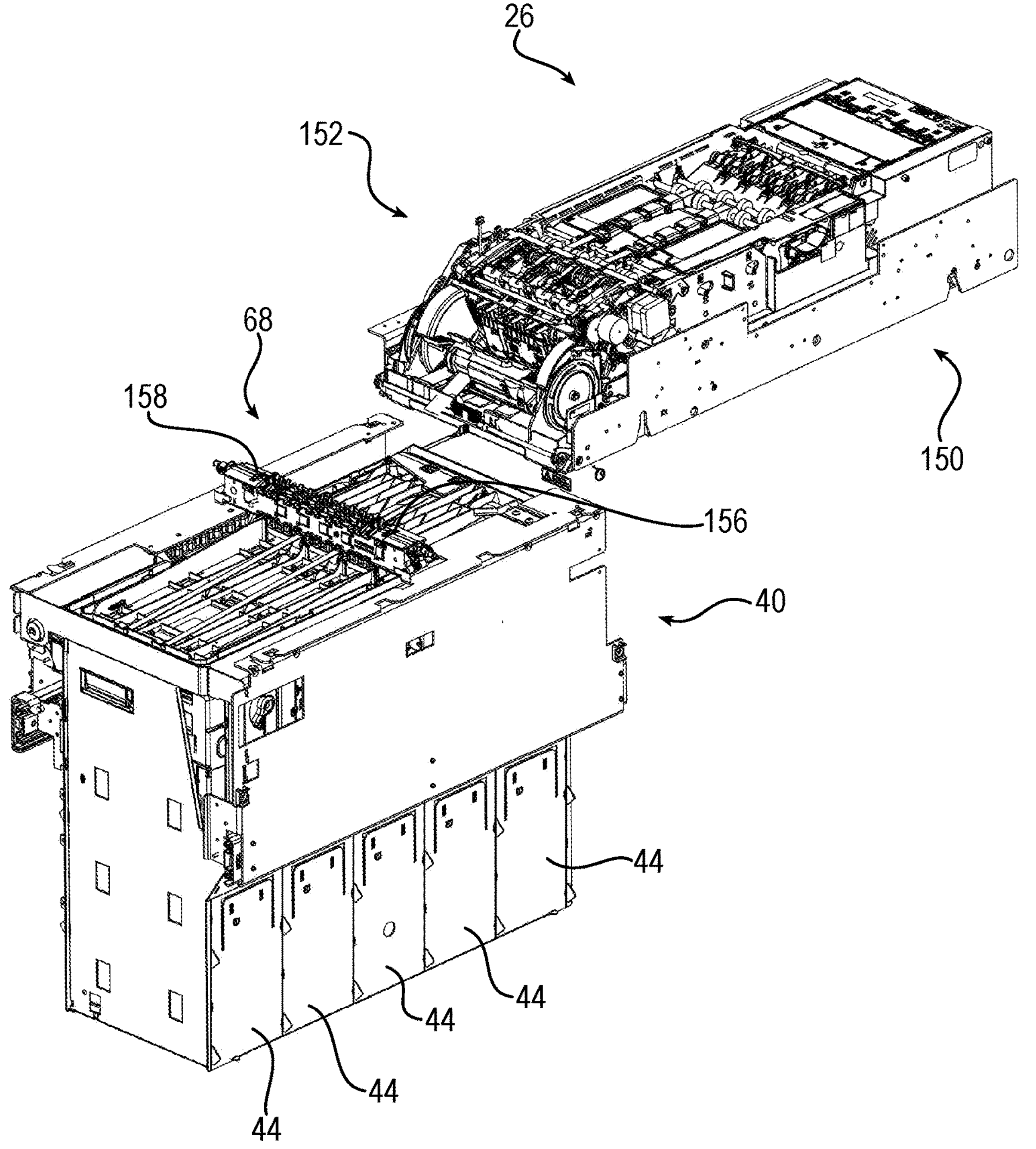
FIG. 47 is an exploded view of the recycler and a dispenser of a lower portion of the ATM.

The linking transport assembly 80*a* can also include an output member 154*a* operably engaged with the input member 136*a*. Rotation of the input member 136*a* results in rotation of the output member 154*a* and the members 136*a* and 154*a* rotate concurrently. FIG. 12 shows input member 136*a* driving a beam 109*a* through the beam 108*a* and the belt 125*a*. The exemplary beam 109*a*, is connected to the shaft supporting output member 154*a*, through a belt 123*a*. It is noted that the belt 123*a* is shown in FIGS. 7-13 extending through a pulley 107*a* mounted on the beam 109*a*, but the belt 123*a* actually extends around the pulley 107*a*. Referring now to FIG. 47, the dispenser 40 can input members 156, 158 positioned at the first port 68. The input members 156, 158 of the dispenser 40 can be positioned on opposite sides of the horizontal longitudinal axis 162 of the top 70 of the safe 42. The input members 156, 158 can be gears operably engageable with the output member 154*a* of the linking transport assembly 80*a* when the recycler 26 is in the retracted position. The output member 154*a* can engage the input member 156 of the dispenser 40 when the linking transport assembly 80*a* is engaged with the recycler 26, the recycler 26 and safe 42 are both forward-facing, and the recycler 26 is in the retracted position. The output member 154*a* can then transmit rotation to the input member 156 of the dispenser 40. The input member 156 can drive a friction roller 160 positioned at the first port 68. The output member 154*a* can engage the input member 158 of the dispenser 40 when the linking transport assembly 80*a* is engaged with the recycler 26, the recycler 26 and safe 42 are facing opposite directions, and the recycler 26 is in the retracted position. The output member 154*a* can then transmit rotation to the input member 158 of the dispenser 40. The input member 158 can drive the friction roller 160 positioned at the first port 68.

Figure 6:
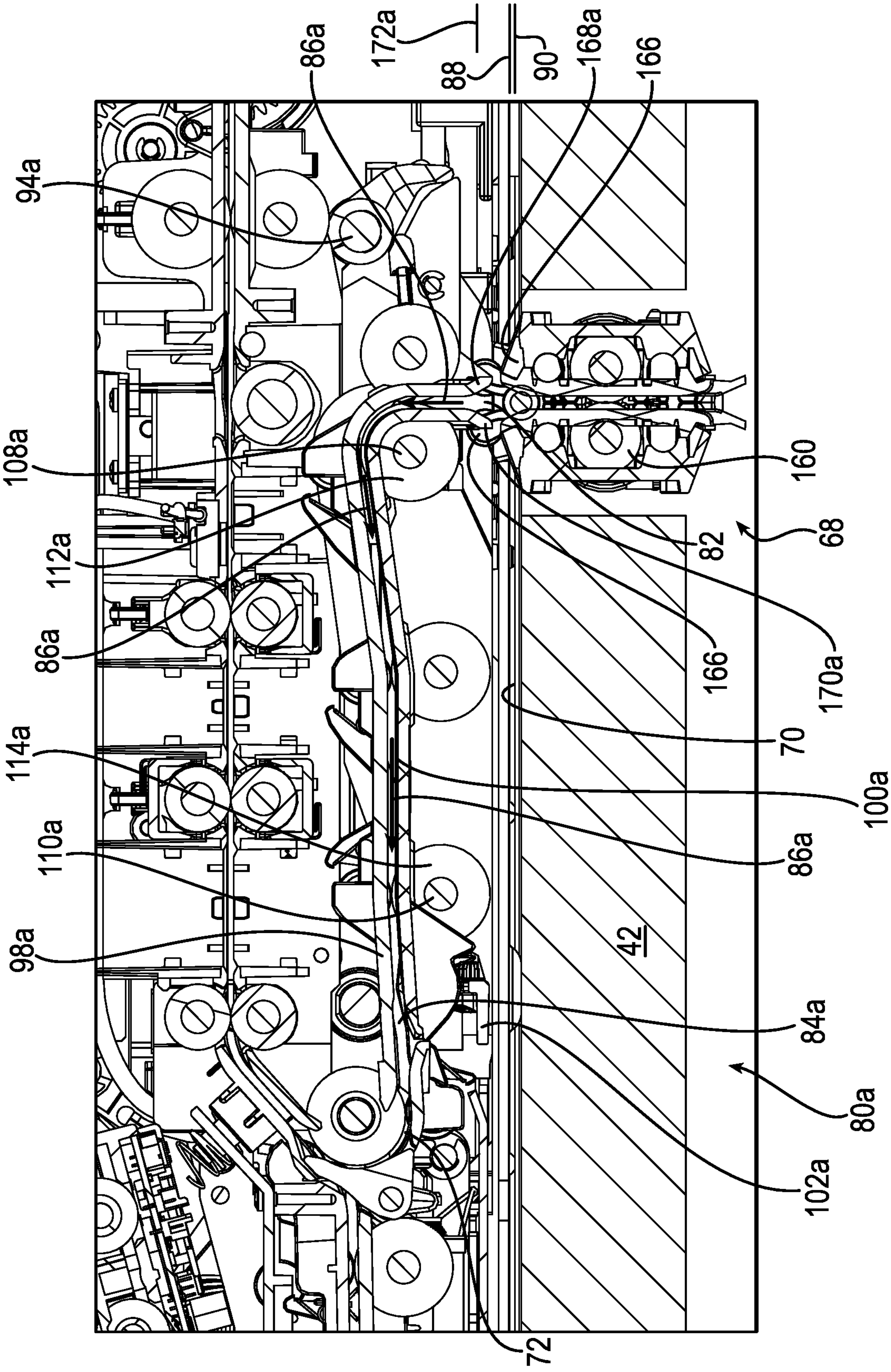
FIG. 6 is magnified portion of the cross-section shown in FIG. 5.

At least portions of the first port 68 and the fourth port 82*a* can releasably engage and disengage one another when the recycler 26 is moved between the retracted position and the extended position. As referenced in FIG. 6, aft ends 168*a*, 170*a* of the first and second plate members 98*a*, 100*a* can extend into the boot 166. When the recycler 26 is moved to the retracted position, the aft end 168*a* of the first plate member 98*a* can urge a first side of the boot 166 downwardly and move past the first side of the boot 166. Similarly, the first side can be urged downwardly by the aft end 170*a* of the second plate member 100*a* during movement of the recycler 26 to the retracted position. When the recycler 26 has reached the retracted position, the aft ends 168*a*, 170*a* of both plate members 98*a*, 100*a* will have passed the first side of the boot 166 and the first side can return to the form shown in FIG. 6. The aft ends 168*a*, 170*a* of both plate members 98*a*, 100*a* are then enclosed by the first side of the boot 166 and a second side of the boot 166. This is best shown in FIG. 6. Thus, portions of the first port 68 (the sides of the boot 166) and of the fourth port 82*a* (the aft ends of the plate members 98*a*, 100*a*) can engage and overlap one another in a third horizontal plane when the recycler 26 is in the retracted position. The third horizontal plane is referenced at 172*a* in FIG. 6. The third horizontal plane 172*a* can be parallel to and spaced from both of the first horizontal plane 88 and the second horizontal plane 90. The first horizontal plane 88 can be disposed between the second horizontal plane 90 and the third horizontal plane 172*a*. The fourth port 82*a* can thus be positioned directly above the first port 68 when the linking transport assembly 80*a* is individually engaged with the recycler 26 and when the recycler 26 is in the retracted position.

Referring now to FIGS. 16-24, the linking transport assembly 80*b* can be at least partially disposed above the first horizontal plane 88 when individually engaged with the recycler 26 and not extend below the recycler 26. However, it is noted that this is not a requirement of all embodiments and all modular arrangements. The linking transport assembly 80*b* can have a fourth port 82*b* configured to engage the first port 68 of the safe 42 and a fifth port 84*b* configured to engage the second port 72 of the recycler 26. The fourth and fifth ports 82*b*, 84*b* can be slots for the passage of banknotes. Banknotes can move in either direction through the fourth and fifth ports 82*b*, 84*b*, based on the operation being performed by the ATM 10. The fourth and fifth ports 82*b*, 84*b* can thus be viewed as entry/exit slots. The linking transport assembly 80*b* can define a transport path along which banknotes are moved between the fourth port 82*b* the fifth port 84*b*. The transport path is referenced by arrows 86*b*. The linking transport assembly 80*b* can be individually positionable between the top 70 of the safe 42 and the bottom of the recycler 26.

Figure 18:
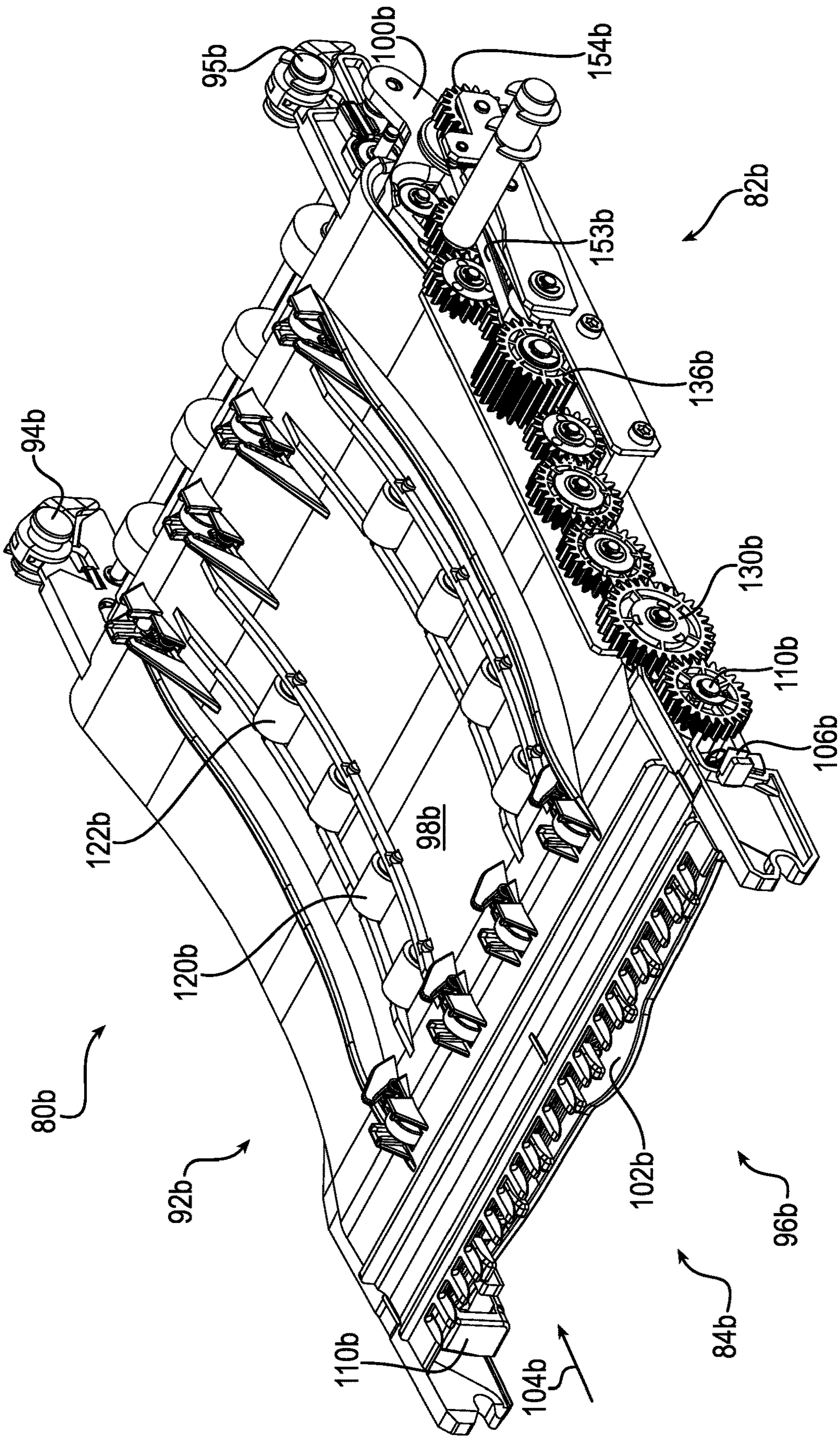
FIG. 18 is a perspective view of a linking transport assembly incorporated by the ATM in the third modular arrangement.
Figure 19:
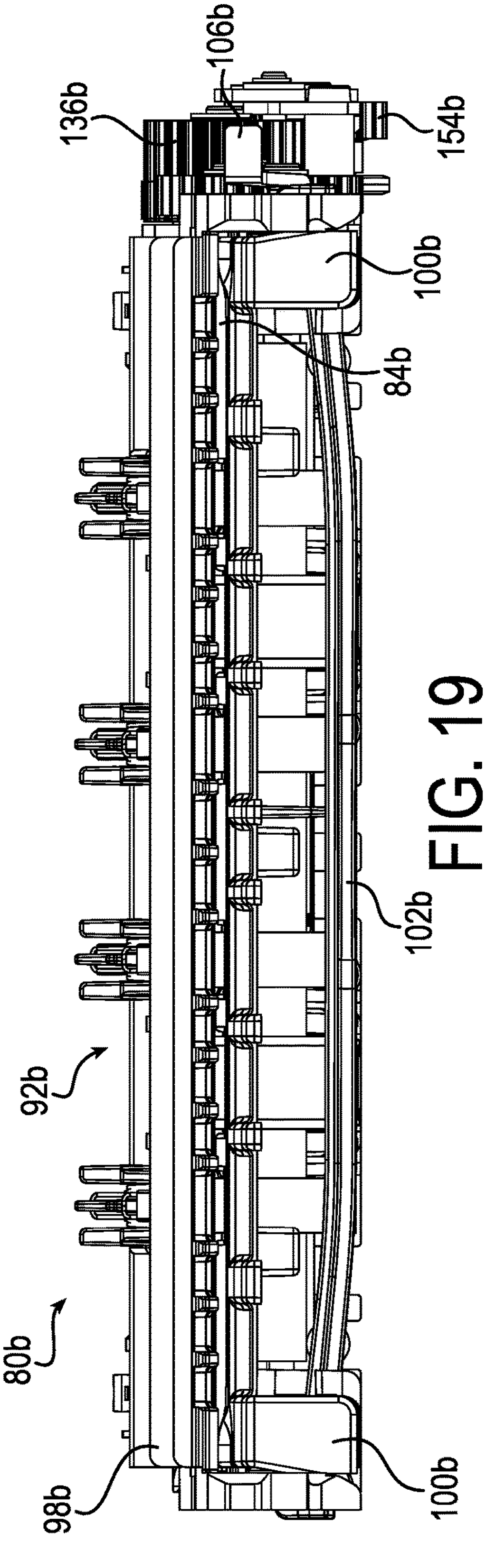
FIG. 19 is a front view of the linking transport assembly shown in FIG. 18.
Figure 20:
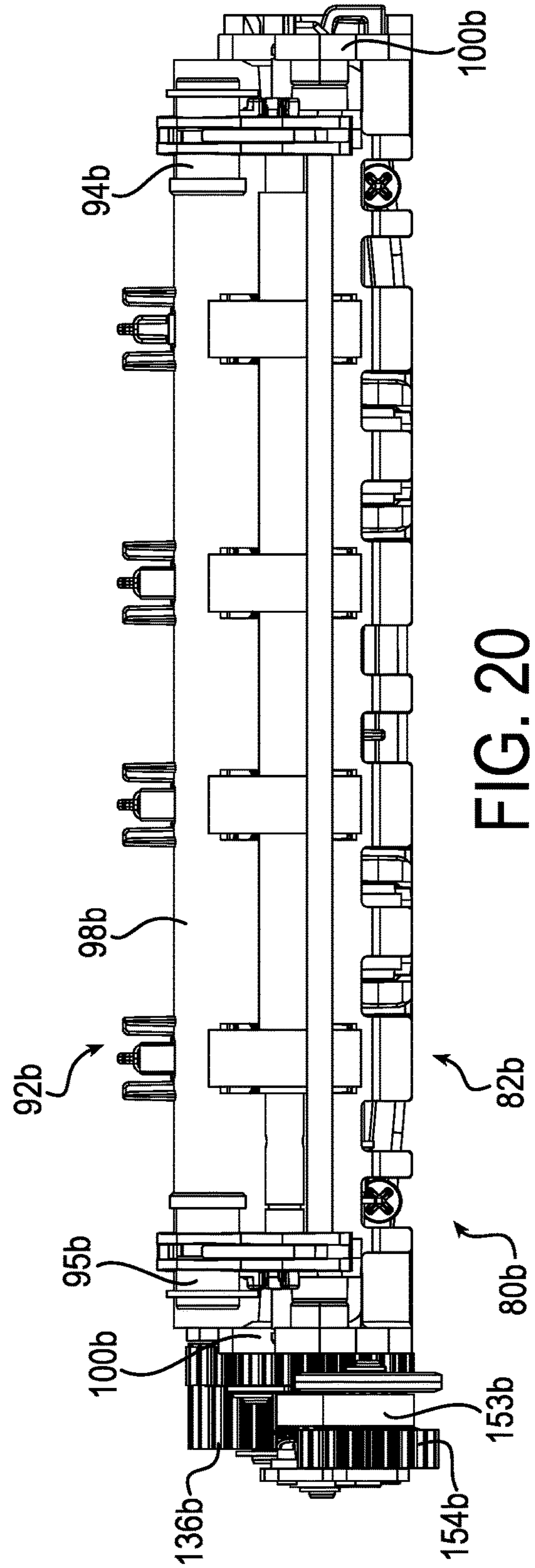
FIG. 20 is a back view of the linking transport assembly shown in FIG. 18.
Figure 21:
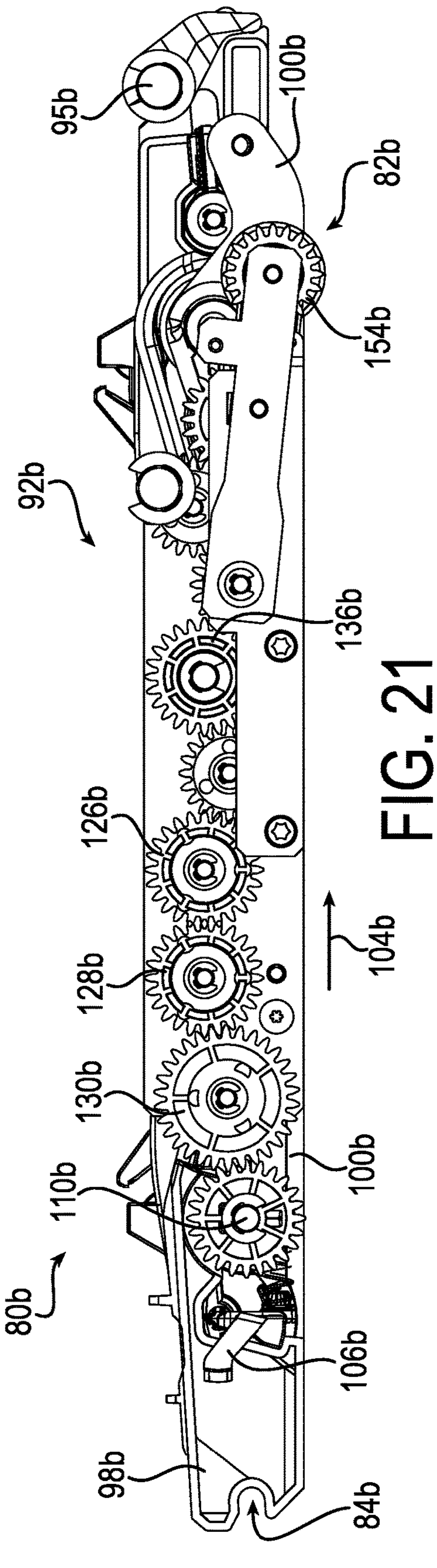
FIG. 21 is a right-side view of the linking transport assembly shown in FIG. 18.
Figure 22:
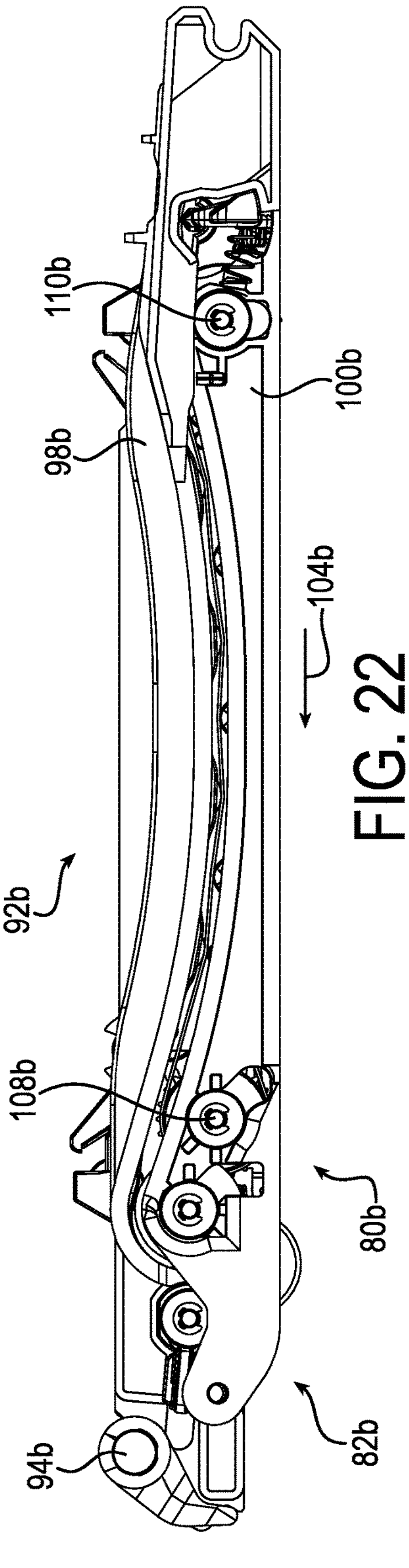
FIG. 22 is a left-side view of the linking transport assembly shown in FIG. 18.
Figure 23:
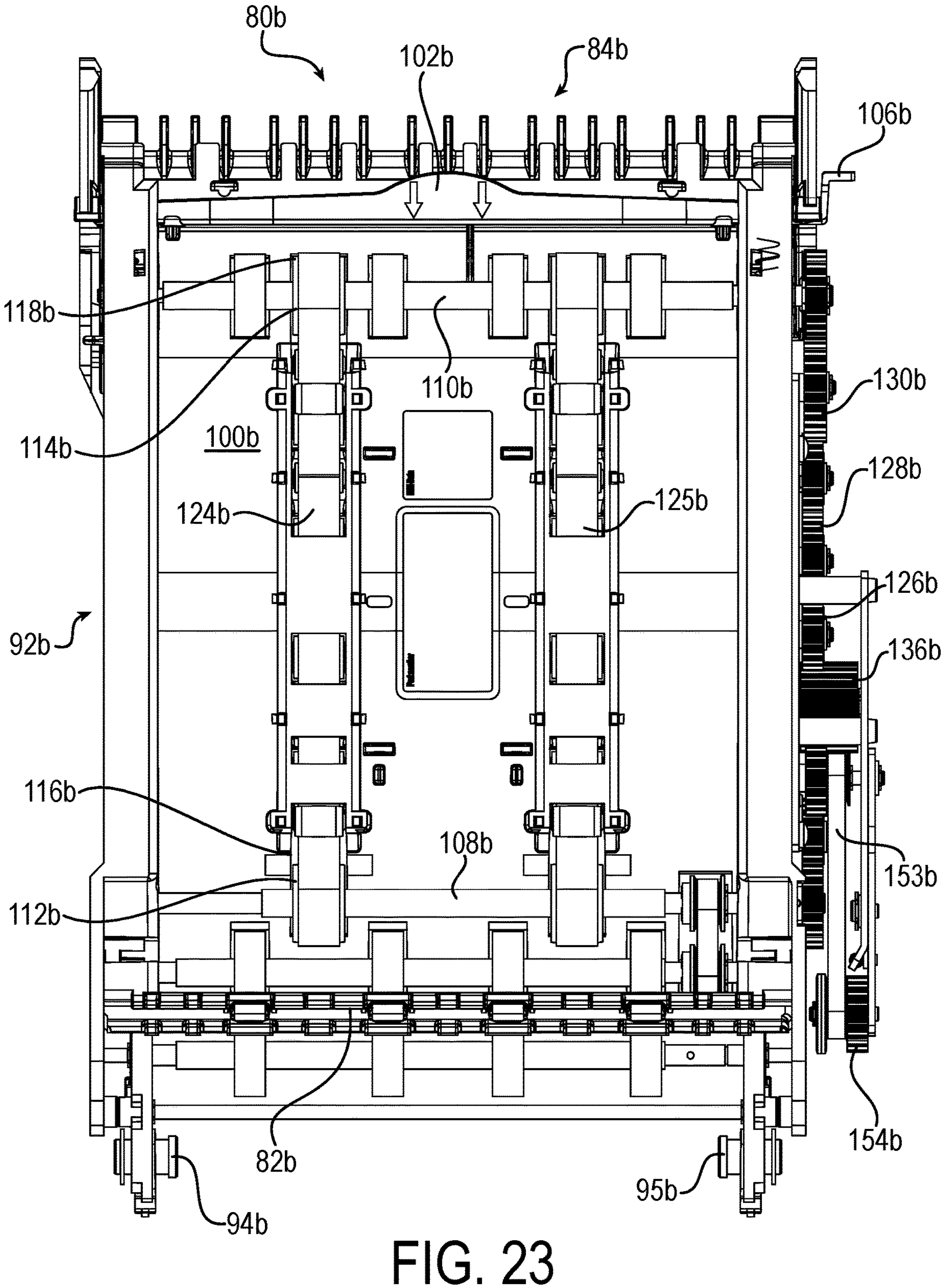
FIG. 23 is a bottom view of the linking transport assembly shown in FIG. 18.
Figure 24:
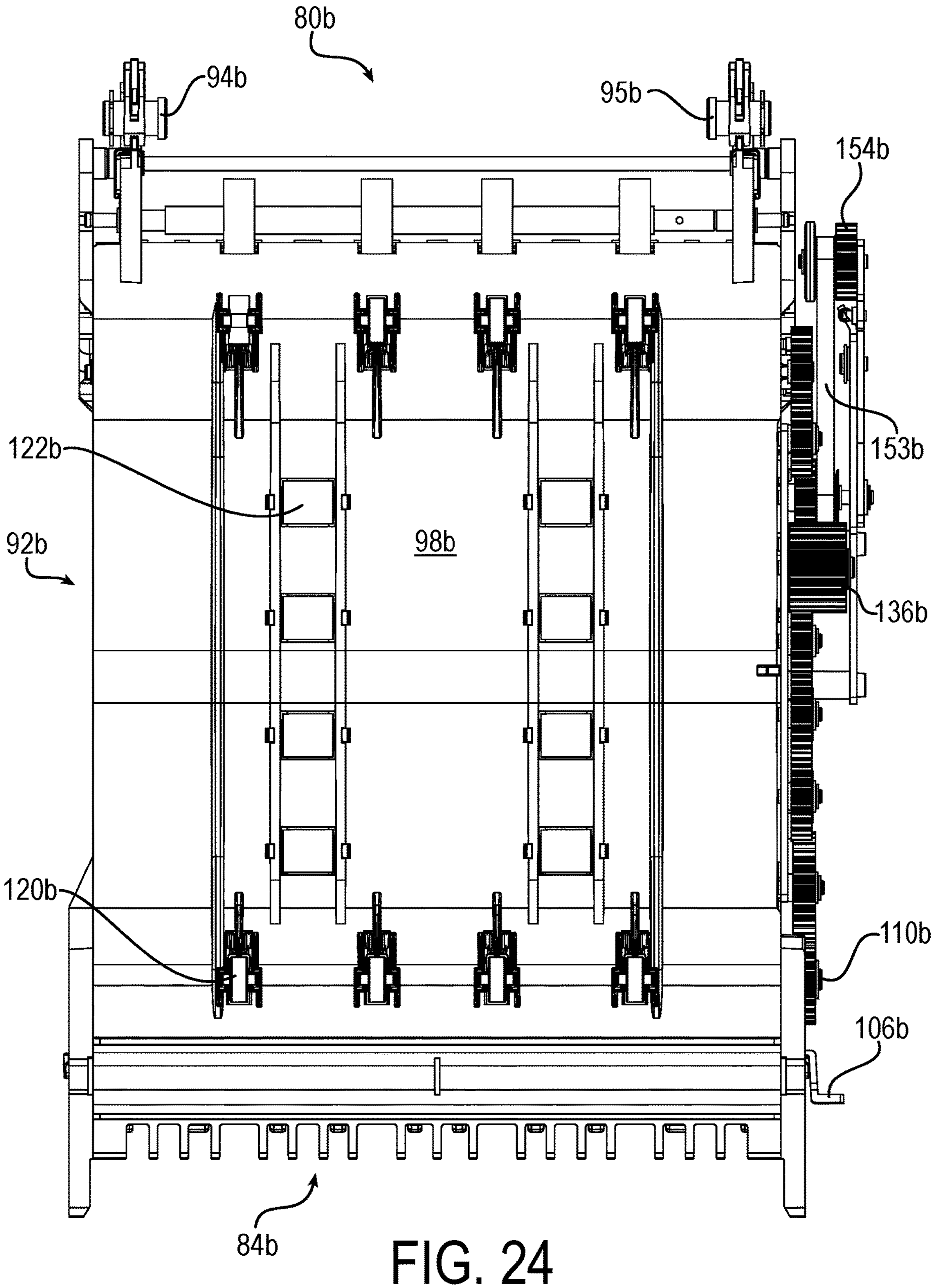
FIG. 24 is a top view of the linking transport assembly shown in FIG. 18.

The linking transport assembly 80*b* can include a body 92*b*, pivot shafts 94*b*, 95*b*, and a lock 96*b*. The body 92*b* can define the transport path 86*b* along which banknotes move between the fourth port 82*b* and the fifth port 84*b*. The body 92*b* can include first and second plate members 98*b*, 100*b* interconnected together through the pivot shafts 94*b*, 95*b*. The transport path 86*b* can extend between the first and second plate members 98*b*, 100*b*. The pivot shafts 94*b*, 95*b* can be engaged with the body 92*b* and define the axis about which the plate member 100*b* and structures mounted on the plate member 100*b* are pivotally moveable relative to the plate member 98*b* and relative to the recycler 26. The lock 96*b* can be mounted on the body 92*b* closer to the fifth port 84*b* than the fourth port 82*b*. The lock 96*b* can be configured to releasably interconnect the plate member 100*b* and the recycler 26 and prevent pivoting movement of the plate member 100*b* of the body 92*b*. As best shown in FIG. 18, the exemplary lock 96*b* can include a graspable portion 102*b* that can be pushed or pulled in a direction 104*b* to withdraw a hook portion 106*b* from a notch (not visible) in the recycler 26. The second plate member 100*b* can then be pivoted about the pivot shafts 94*b*, 95*b*, The plate member 98*b* can remain interconnected to the recycler 26 when the plate member 100*b* is pivotally moved.

The linking transport assembly 80*b* can also include a plurality of beams, such as at least first and second beams 108*b*, 110*b*. The beams 108*b*, 110*b* can be supported for rotation on the body 92*b* outside of the transport path 86*b*. Each beam 108*b*, 110*b* can support a friction roller, such as friction rollers 112*b* and 114*b*. Each of the friction rollers can extend through one of a plurality of apertures, such as apertures 116*b* and 118*b*, defined in one of the first and second plate members 98*b*, 100*b* to thereby extend into the transport path 86*b* to engage banknotes moving along the transport path 86*b* to move the banknotes along the transport path 86*b*. Free or undriven rollers, such as rollers 120*b*, 122*b*, can be positioned against the friction rollers so that banknotes are pinched between the friction rollers and the free rollers during movement along the transport path 86*b*. The linking transport assembly 80*b* can also include belts 124*b*, 125*b* interconnecting beams 108*b*, 110*b* for concurrent rotation in the same rotational direction and also include gears, such as gears 126*b*, 128*b*, 130*b*, interconnecting the beams 108*b*, 110*b* for concurrent rotation in the same rotational direction. The belts 124*b*, 125*b* can overlap the friction rollers 112*b*, 114*b* and thereby interconnect the plurality of beams 108*b*, 110*b* for concurrent rotation.

The linking transport assembly 80*b* can also include an input member 136*b* configured to rotate. The recycler 26 can also include an output member in the form of spur gear 138*b* (referenced in FIGS. 44 and 45) and the motor 140 driving the output member 138*b* in rotation. The output member 138*b* can be positioned to engage the input member 136*b* of the linking transport assembly 80*b*. The output member 138*b* can be configured to transmit rotation to the input member 136*b* of the linking transport assembly 80*b* when the plate member 100*b* is locked by the lock 96*b*, such as for rotating the beams 108*b*, 110*b*. The exemplary input member 136*b* of the linking transport assembly 80*b* can be a first gear. The exemplary output member 138*b* of the recycler 26 can be a second gear that meshes with the first gear.

The linking transport assembly 80*b* can also include an output member 154*b* operably engaged with the input member 136*b*. Rotation of the input member 136*b* results in rotation of the output member 154*b* and the members 136*b* and 154*b* rotate concurrently. The shafts upon which the members 136*b*, 154*b* are fixed for rotation are interconnected by a belt 153*b*. The input members 156, 158 of the dispenser 40 can be operably engageable with the output member 154*b* of the linking transport assembly 80*b* when the recycler 26 is in the retracted position. The output member 154*b* can engage the input member 156 of the dispenser 40 when the linking transport assembly 80*b* is engaged with the recycler 26, the recycler 26 and safe 42 are both forward-facing, and the recycler 26 is in the retracted position. The output member 154*b* can then transmit rotation to the input member 156 of the dispenser 40. The input member 156 can drive the friction roller 160 positioned at the first port 68. The output member 154*b* can engage the input member 158 of the dispenser 40 when the linking transport assembly 80*b* is engaged with the recycler 26, the recycler 26 and safe 42 are facing opposite directions, and the recycler 26 is in the retracted position. The output member 154*b* can then transmit rotation to the input member 158 of the dispenser 40. The input member 158 can drive the friction roller 160 positioned at the first port 68.

At least portions of the first port 68 and the fourth port 82*b* can releasably engage and disengage with respect to one another when the recycler 26 is moved between the retracted position and the extended position. The engagement between the fourth port 82*b* and the first port 68 is identical to the engagement between the fourth port 82*a* and the first port 68. Therefore, the description of the first linking transport assembly 80*a* regarding the engagement between the fourth port 82*a* and the first port 68 is applicable the second linking transport assembly 80*b*.

Referring now to FIGS. 26-34 and 45, the linking transport assembly 80*c* can be at least mostly disposed above the first horizontal plane 88 when individually engaged with the recycler 26 and not extend below the recycler 26. However, it is noted that this is not a requirement of all embodiments and all modular arrangements. The linking transport assembly 80*c* can have a fourth port 82*c* configured to engage the first port 68 of the safe 42 and a fifth port 84*c* configured to engage the second port 72 of the recycler 26. The fourth and fifth ports 82*c*, 84*c* can be slots for the passage of banknotes. Banknotes can move in either direction through the fourth and fifth ports 82*c*, 84*c*, based on the operation being performed by the ATM 10. The fourth and fifth ports 82*c*, 84*c* can thus be viewed as entry/exit slots. The linking transport assembly 80*c* can define a transport path along which banknotes are moved between the fourth port 82*c* the fifth port 84*c*. The transport path is referenced by arrows 86*c*. The linking transport assembly 80*c* can be individually positionable between the top 70 of the safe 42 and the bottom of the recycler 26.

Figure 28:
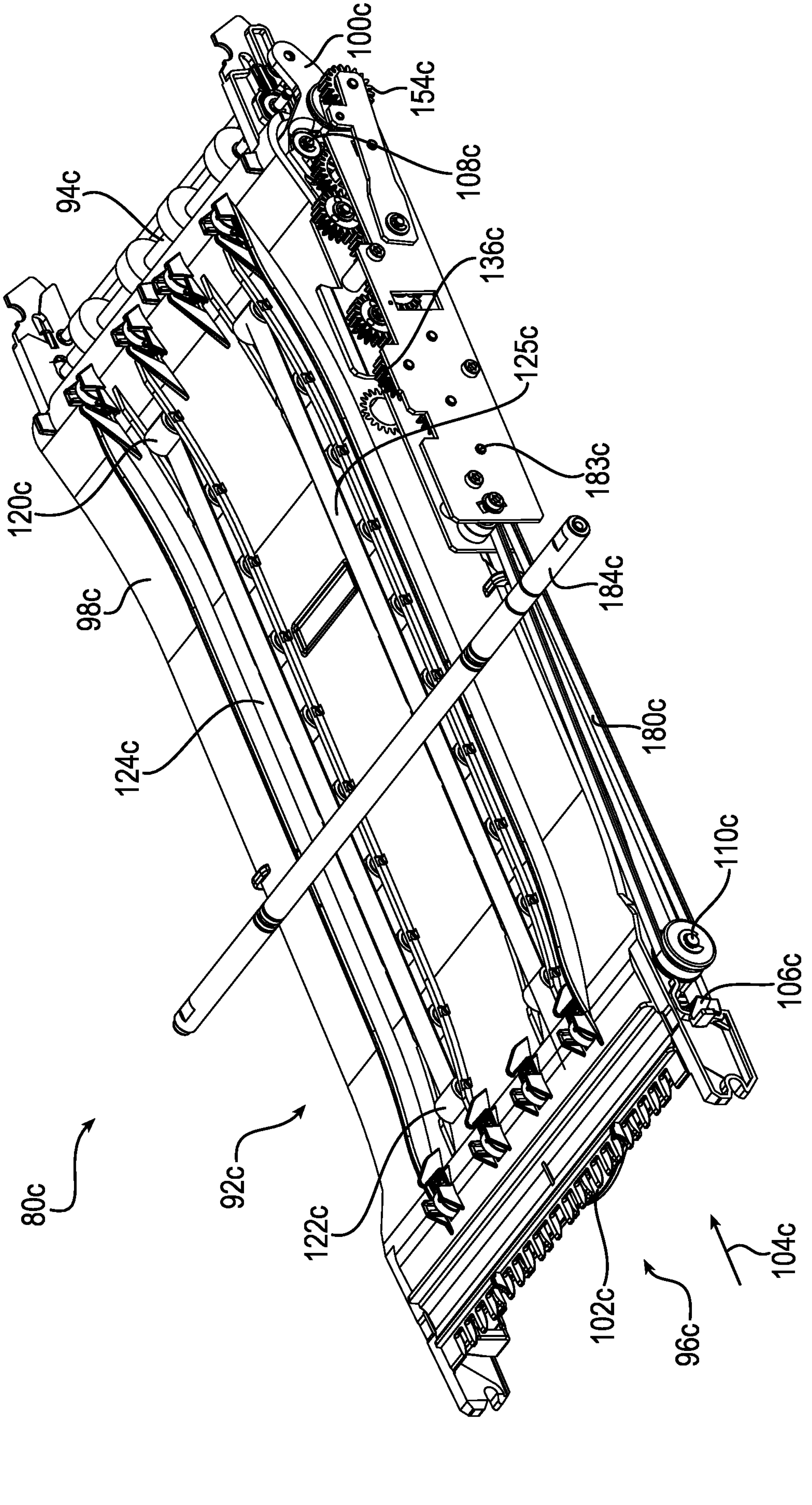
FIG. 28 is a perspective view of a linking transport assembly incorporated by the ATM in the fourth modular arrangement.
Figure 29:
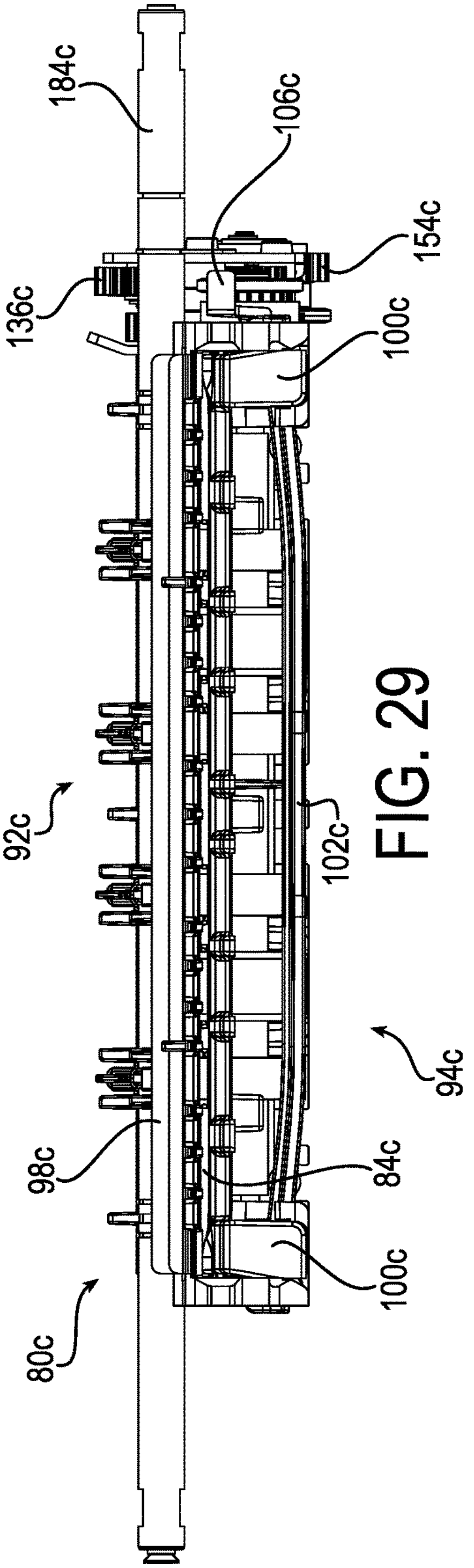
FIG. 29 is a front view of the linking transport assembly shown in FIG. 28.
Figure 30:
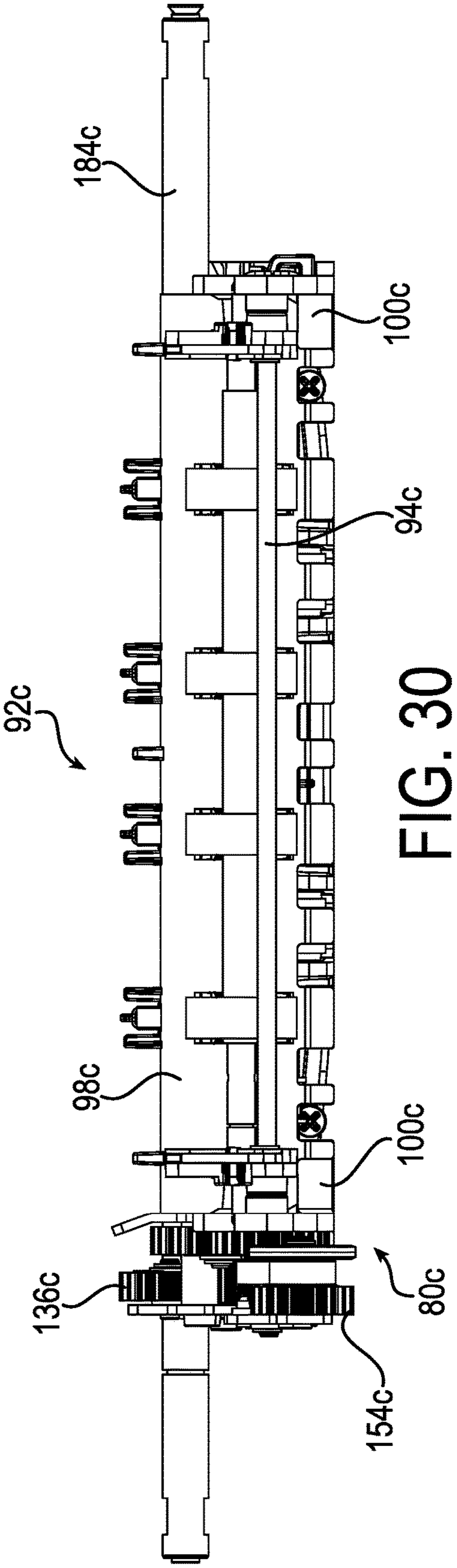
FIG. 30 is a back view of the linking transport assembly shown in FIG. 28.
Figure 31:
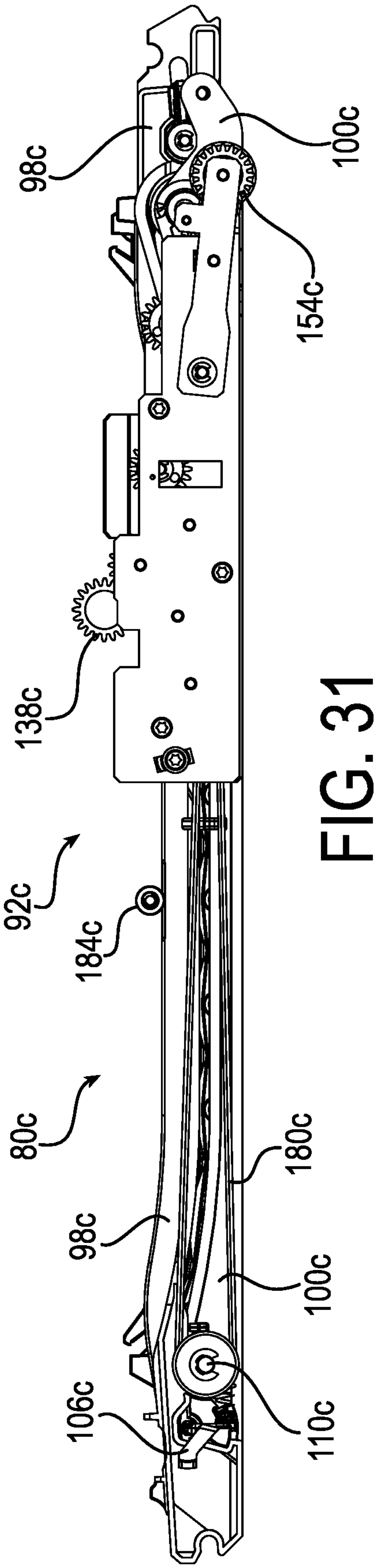
FIG. 31 is a right-side view of the linking transport assembly shown in FIG. 28.
Figure 32:
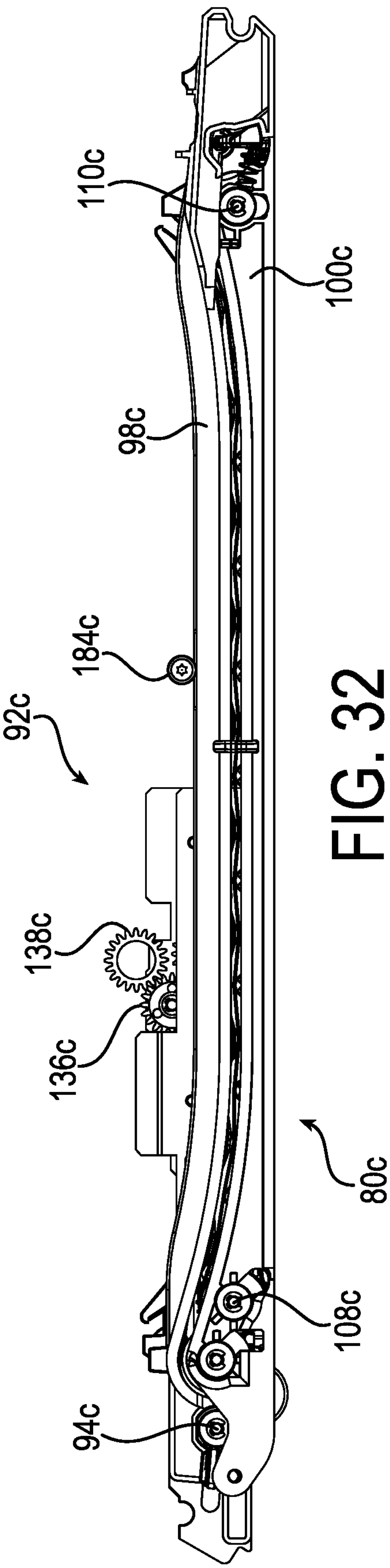
FIG. 32 is a left-side view of the linking transport assembly shown in FIG. 28.
Figure 33:
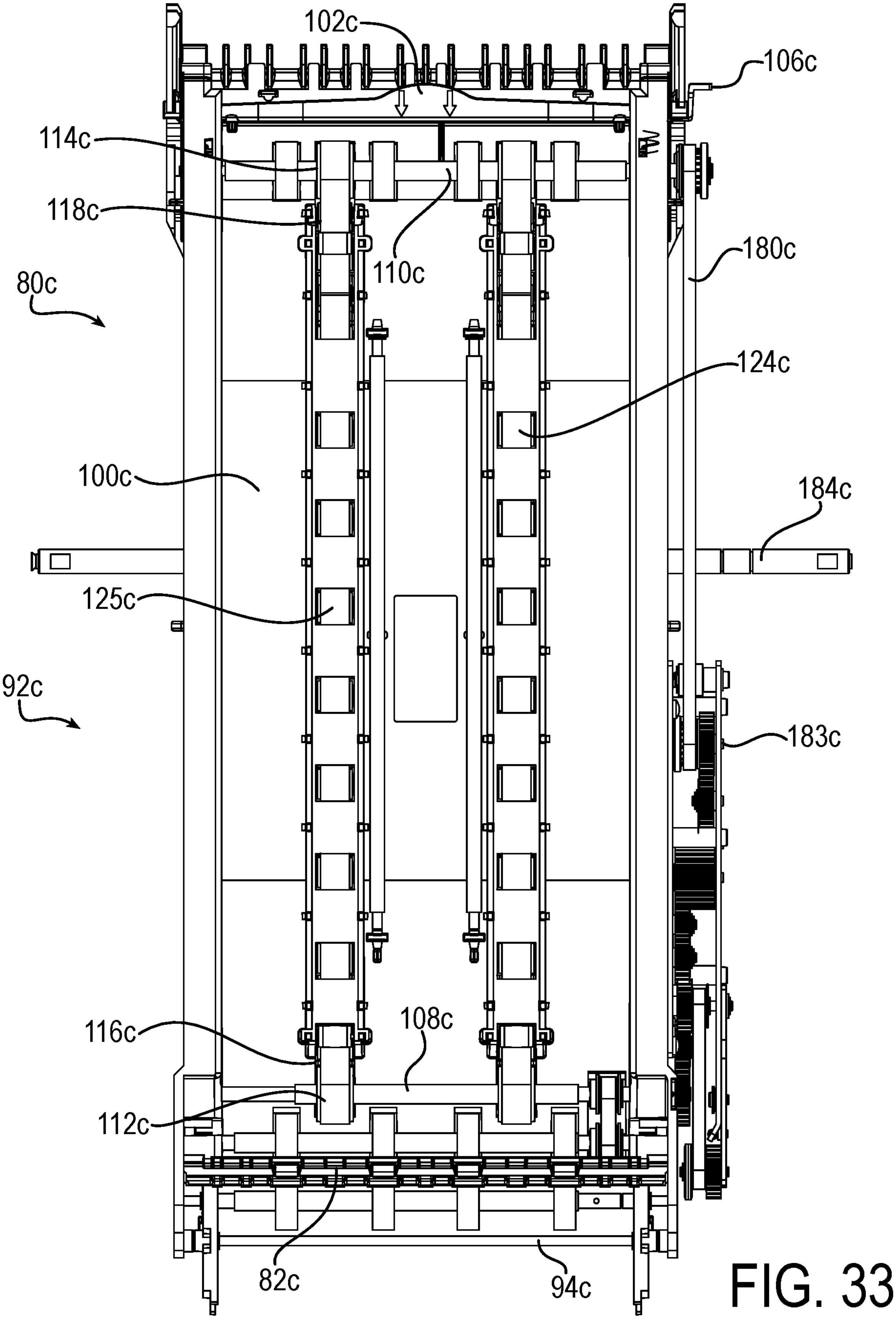
FIG. 33 is a bottom view of the linking transport assembly shown in FIG. 28.
Figure 34:
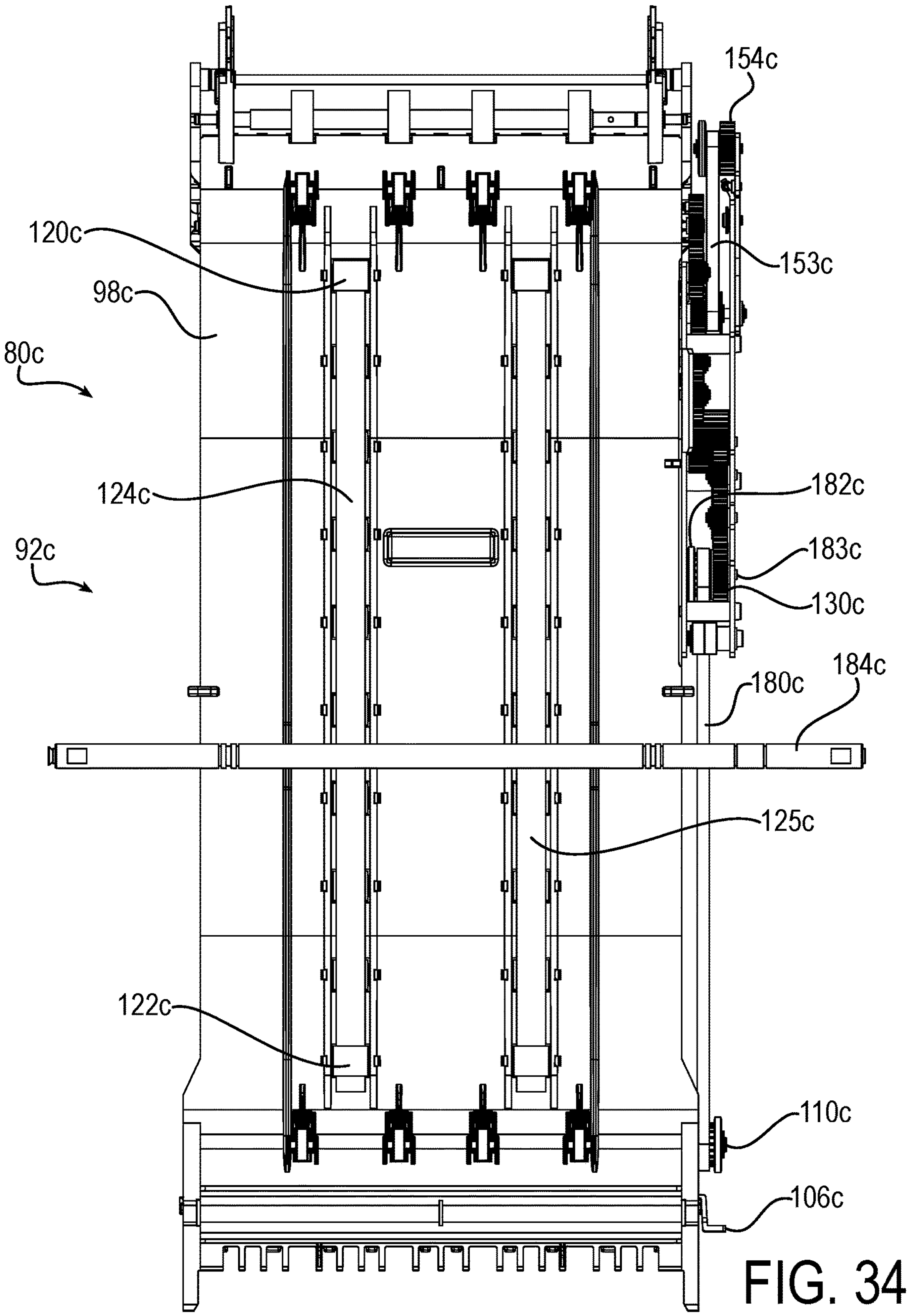
FIG. 34 is a top view of the linking transport assembly shown in FIG. 28.

The linking transport assembly 80*c* can include a body 92*c*, at least one pivot shaft 94*c*, and a lock 96*c*. The body 92*c* can define the transport path 86*c* along which banknotes move between the fourth port 82*c* and the fifth port 84*c*. The body 92*c* can include first and second plate members 98*c*, 100*c* interconnected together through the pivot shaft 94*c*. The transport path 86*c* can extend between the first and second plate members 98*c*, 100*c*. The at least one pivot shaft 94*c* can be engaged with the body 92*c* and define the axis about which the plate member 100*c* and structures mounted on the plate member 100*c* are pivotally moveable. The lock 96*c* can be mounted on the body 92*c* closer to the fifth port 84*c* than the fourth port 82*c*. The lock 96*c* can be configured to releasably interconnect the plate member 100*c* of the body 92*c* and the recycler 26 and prevent pivoting movement of the plate member 100; of the body 92*c*. As best shown in FIG. 28, the exemplary lock 96*c* can include a graspable portion 102*c* that can be pulled in a direction 104*c* to withdraw a hook portion 106*c* from a notch (not visible) in the recycler 26. The second plate member 100*c* can then be pivoted about the pivot shaft 94*c*.

The linking transport assembly 80*c* can also include a plurality of beams, such as at least first and second beams 108*c*, 110*c*. The beams 108*c*, 110*c* can be supported for rotation on the body 92*c* outside of the transport path 86*c*. Each beam 108*c*, 110*c* can support a friction roller, such as friction rollers 112*c* and 114*c*. Each of the friction rollers can extend through one of a plurality of apertures, such as apertures 116*c* and 118*c*, defined in one of the first and second plate members 98*c*, 100*c* to thereby extend into the transport path 86*c* to engage banknotes moving along the transport path 86*c* to move the banknotes along the transport path 86*c*. Free or undriven rollers, such as rollers 120*c*, 122*c*, can be positioned against the friction rollers so that banknotes are pinched between the friction rollers and the free rollers during movement along the transport path 86*c*.

The exemplary linking transport assembly 80*c* can also include belts 124*c*, 125*c* for interconnecting beams 108*c*, 110*c* for concurrent rotation in the same rotational direction. The belts 124*c*, 125*c* can extend around the friction rollers. The beam 110*c* can drive the beam 108*c* in rotation through the belts 124*c*, 125*c*. The beam 110*c* can be driven in rotation through a belt 180; that is wound around a pulley 182*c*. The exemplary pulley 182*c* is fixedly mounted on a shaft 183*c* for concurrent rotation with the shaft 183*c*. A gear 130; is also fixedly mounted on the shaft 183*c* for concurrent rotation with the shaft 183*c*.

As best shown in FIG. 45, the linking transport assembly 80*c* can also include an input member 136*c* configured to rotate. The recycler 26 can also include an output member 138*c* and the motor 140 driving the output member 138*c* in rotation. The output member 138*c* can be positioned to engage the input member 136*c* of the linking transport assembly 80*c* when the plate member 100*c* is locked to the recycler 26 by the lock 96*c*. The output member 138*c* can be configured to transmit rotation to the input member 136*c* of the linking transport assembly 80*c*, such as for rotating the beams 108*c*, 110*c*. The exemplary input gear 136*c* is meshed with a gear 126*c* to transmit rotation forward, to the gear 130*c*. The exemplary input gear 136*c* is also meshed with a gear 128*c* to transmit rotation aft, as will be addressed in greater detail below.

As shown in the various Figures of the present disclosure, the plurality of output members 138*a*, 138*b*, 138*c* can be spaced form one another along the horizontal longitudinal axis 142 of the recycler 26. The Figures also show, in the exemplary embodiment, all of the plurality of output members 138*a*, 138*b*, 138*c* can be positioned on one side of the horizontal longitudinal axis 142. In the exemplary embodiment, the output members 138*a*, 138*b*, 138*c* are all positioned on the right side 150 of the horizontal longitudinal axis 142.

The linking transport assembly 80*c* can also include an output member 154*c* operably engaged with the input member 136*c*. Rotation of the input member 136*c* results in rotation of the output member 154*c* and the members 136*c* and 154*c* rotate concurrently. FIG. 45 best shows the power transmission pathway through a plurality of gears, including gear 128*c*. The gear that is furthest aft mounted on the body 92*c* is mounted on a shaft that is interconnected with a shaft supporting the member 154*c* through a belt 153*c*. The dispenser 40 includes input members 156 and 158 positioned on opposite sides of the horizontal longitudinal axis 162 of the top 70 of the safe 42. The input members 156, 158 can be operably engageable with the output member 154*c* of the linking transport assembly 80*c* when the recycler 26 is in the retracted position. The output member 154*c* can engage the input member 156 of the dispenser 40 when the linking transport assembly 80*c* is engaged with the recycler 26, the recycler 26 and safe 42 are both forward-facing, and the recycler 26 is in the retracted position. The output member 154*c* can then transmit rotation to the input member 156 of the dispenser 40. The input member 156 can drive the friction roller 160 positioned at the first port 68. The output member 154*c* can engage the input member 158 of the dispenser 40 when the linking transport assembly 80*c* is engaged with the recycler 26, the recycler 26 and safe 42 are facing opposite directions, and the recycler 26 is in the retracted position. The output member 154*c* can then transmit rotation to the input member 158 of the dispenser 40. The input member 158 can drive the friction roller 160 positioned at the first port 68.

At least portions of the first port 68 and the fourth port 82*c* can releasably engage and disengage with respect to one another when the recycler 26 is moved between the retracted position and the extended position. The engagement between the fourth port 82*c* and the first port 68 is identical to the engagement between the fourth port 82*a* and the first port 68. Therefore, the description of the first linking transport assembly 80*a* regarding the engagement between the fourth port 82*a* and the first port 68 is applicable the third linking transport assembly 80*c*.

The linking transport assembly 80*c* can also include a cross-member 184*c*. The cross-member 184*c* can be fixedly attached to the plate member 98*c*, along a longitudinal axis of the linking transport assembly 80*c* between the pivot shaft 94*c* and the lock 96*c* to inhibit sag of the body 92*c*. The cross-member 184*c* can engage a structure defined by the recycler 26 in a releasable snap-fit arrangement. The plate member 98*c* can remain interconnected to the recycler 26 through the cross-member 184*c* when the plate member 100*c* is pivotally moved.

Referring now to FIGS. 35-43 and 46, the linking transport assembly 80*d* can be disposed above the first horizontal plane 88 when individually engaged with the recycler 26. However, it is noted that this is not a requirement of all embodiments and all modular arrangements. The linking transport assembly 80*d* can have a fourth port 82*d* configured to engage the first port 68 of the safe 42 and a fifth port 84*d* configured to engage the second port 72 of the recycler 26. The fourth and fifth ports 82*d*, 84*d* can be slots for the passage of banknotes. Banknotes can move in either direction through the fourth and fifth ports 82*d*, 84*d*, based on the operation being performed by the ATM 10. The fourth and fifth ports 82*d*, 84*d* can thus be viewed as entry/exit slots. The linking transport assembly 80*d* can define a transport path along which banknotes are moved between the fourth port 82*d* the fifth port 84*d*. The transport path is referenced by arrows 86*d*. The linking transport assembly 80*d* can be individually positionable between the top 70 of the safe 42 and the bottom of the recycler 26.

Figure 37:
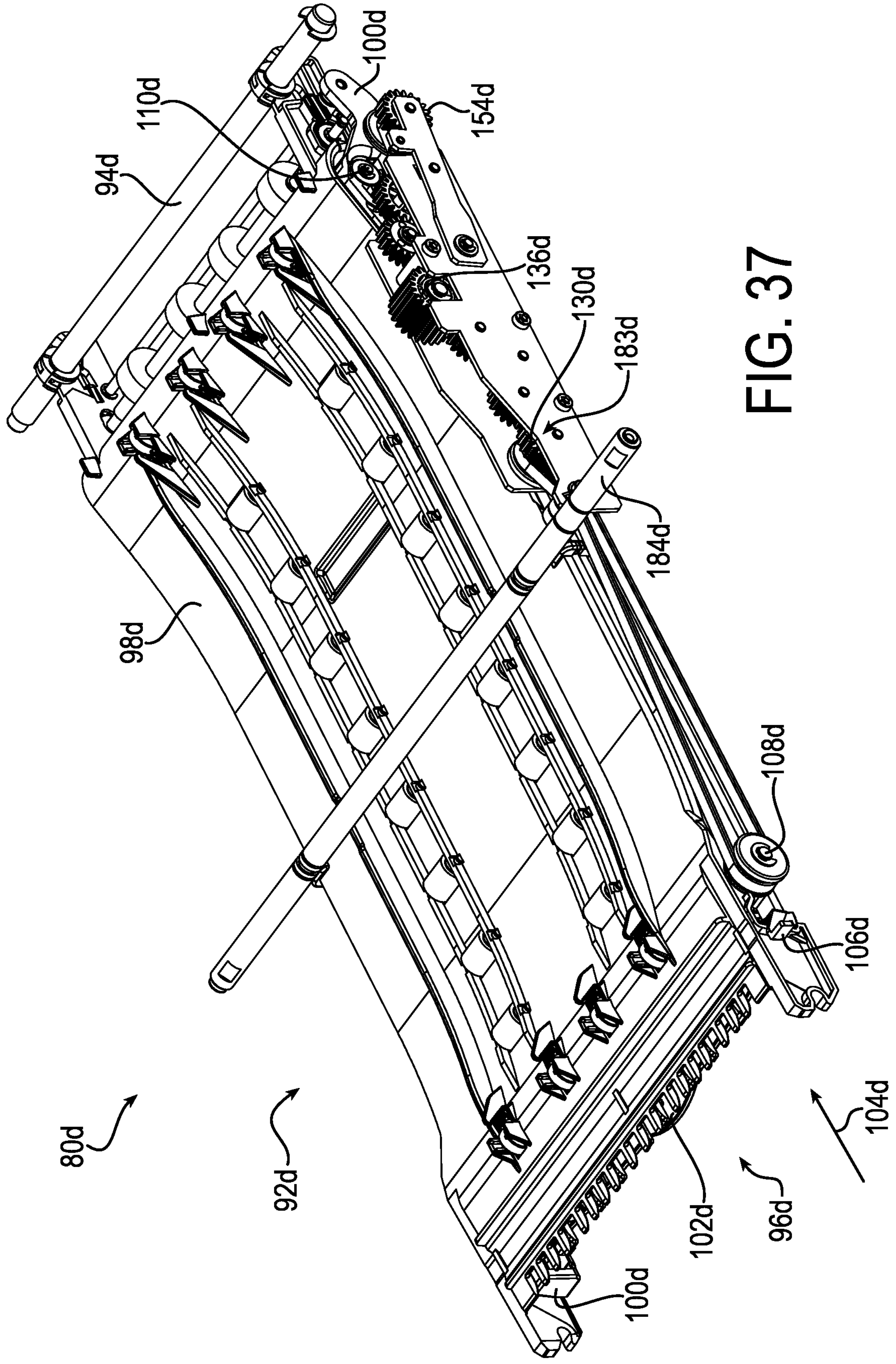
FIG. 37 is a perspective view of a linking transport assembly incorporated by the ATM in the fifth modular arrangement.
Figure 38:
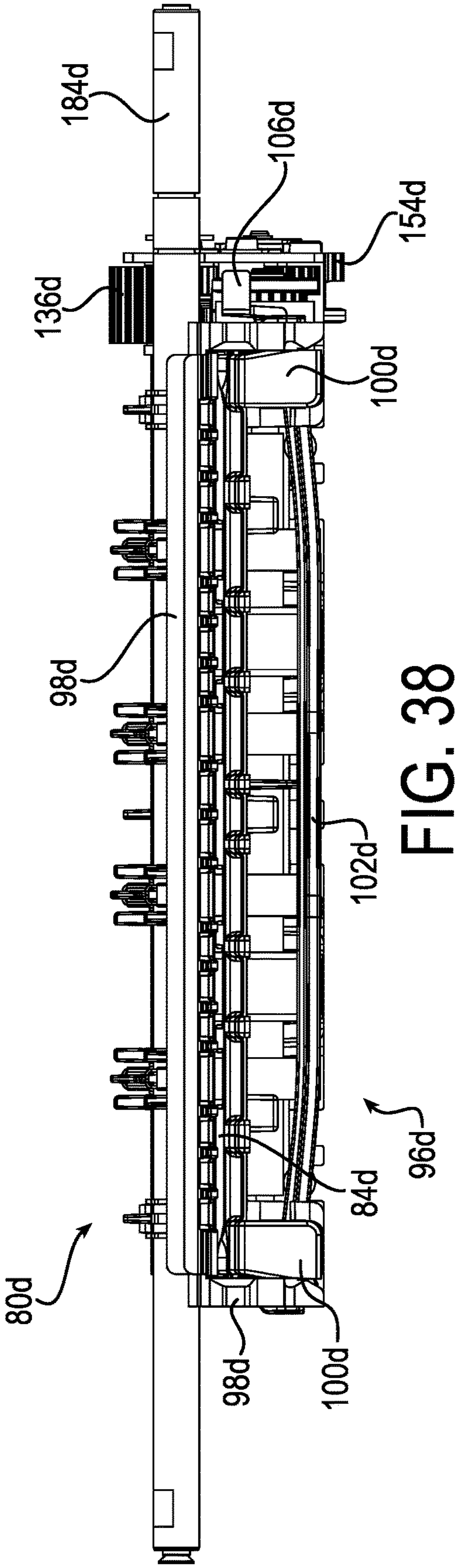
FIG. 38 is a front view of the linking transport assembly shown in FIG. 37.
Figure 39:
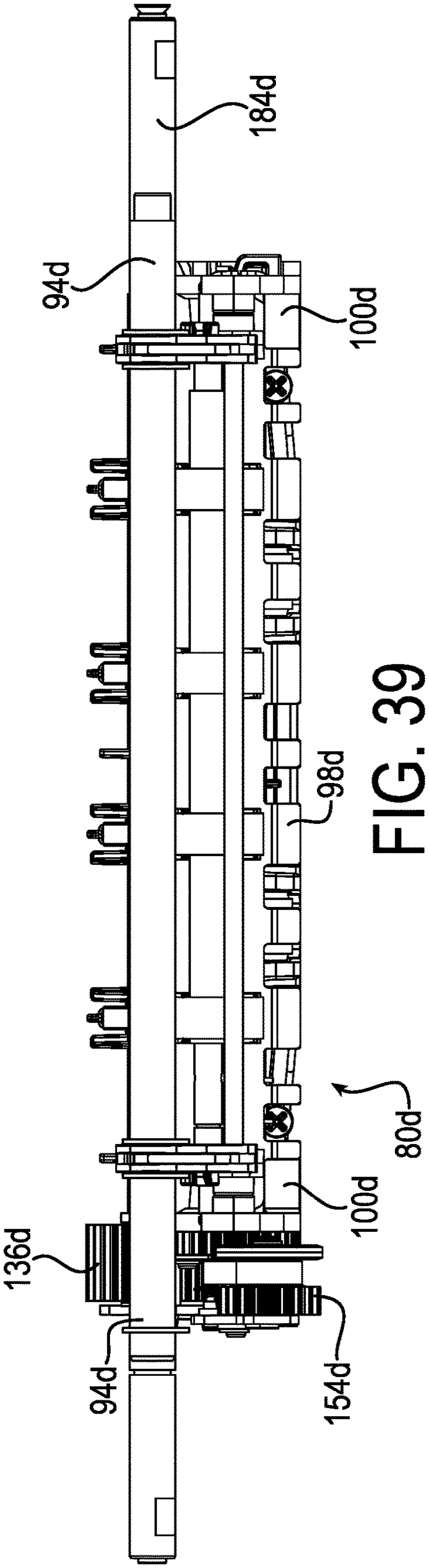
FIG. 39 is a back view of the linking transport assembly shown in FIG. 37.
Figure 40:
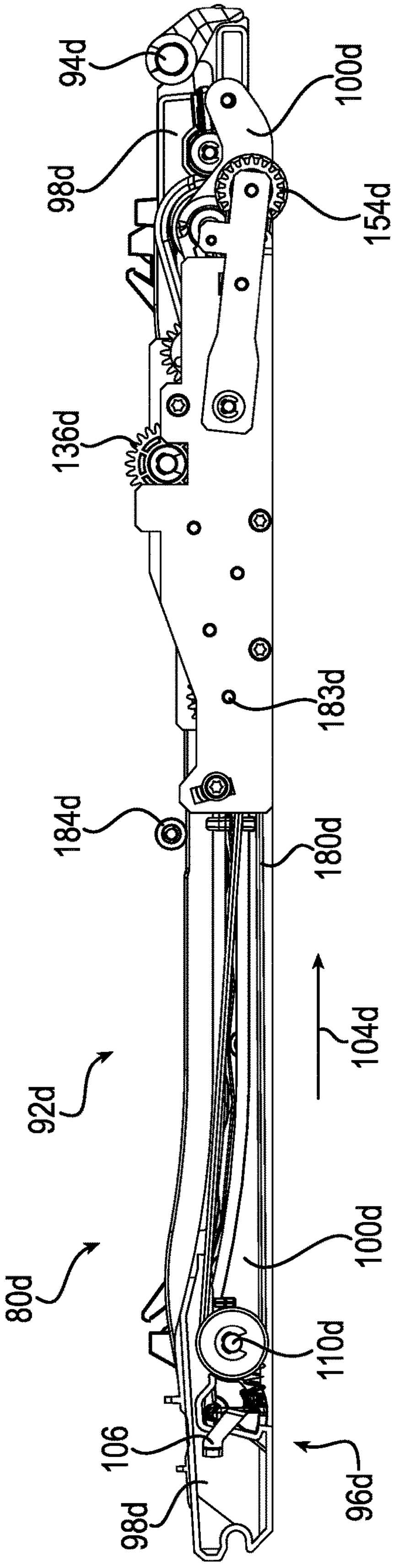
FIG. 40 is a right-side view of the linking transport assembly shown in FIG. 37.
Figure 41:
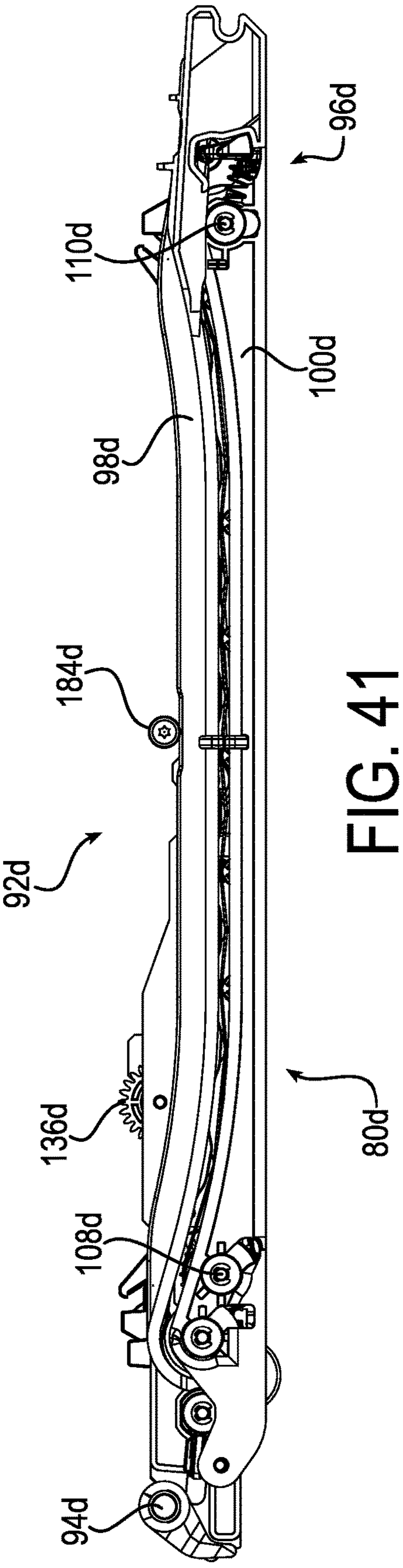
FIG. 41 is a left-side view of the linking transport assembly shown in FIG. 37.
Figure 42:
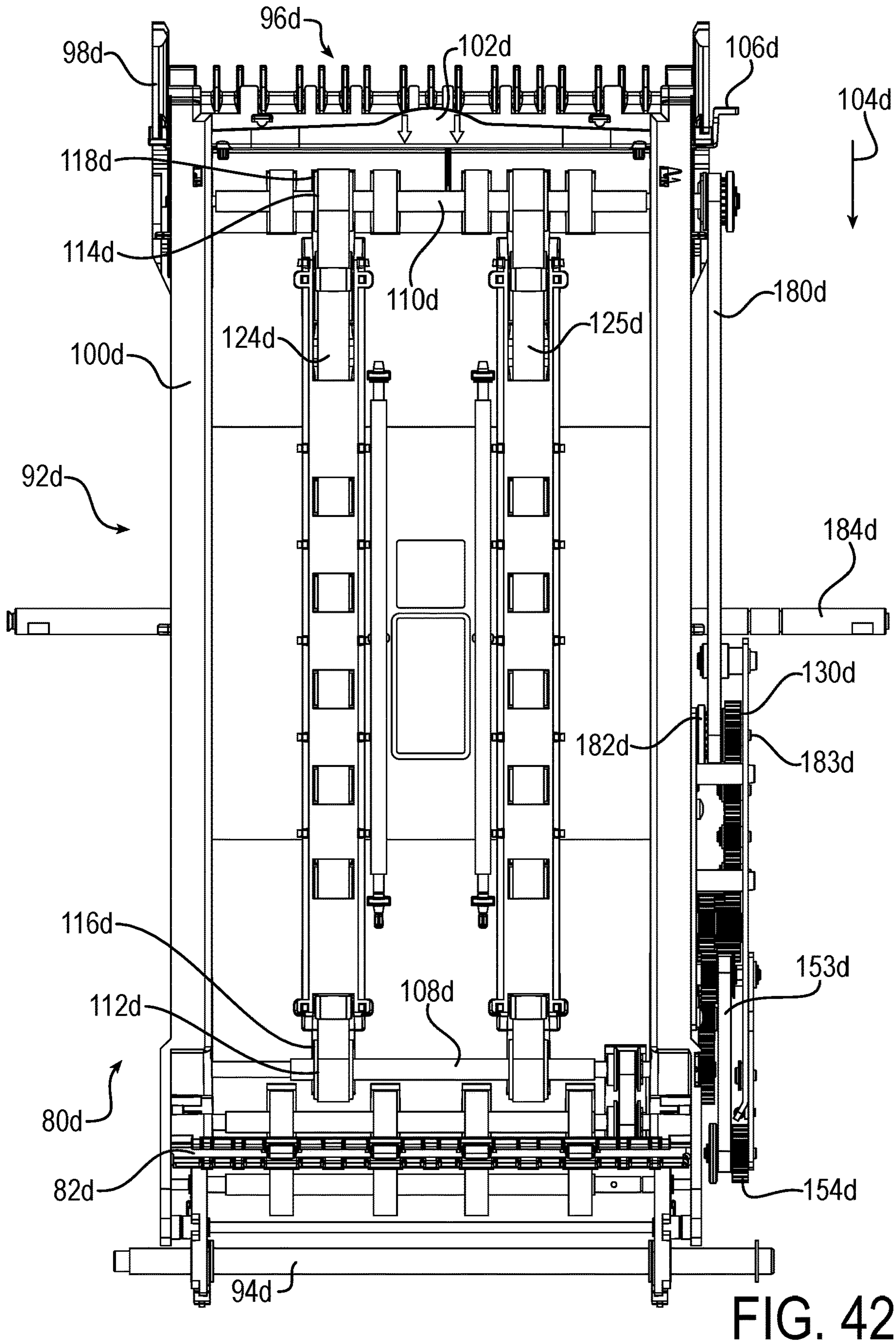
FIG. 42 is a bottom view of the linking transport assembly shown in FIG. 37.
Figure 43:
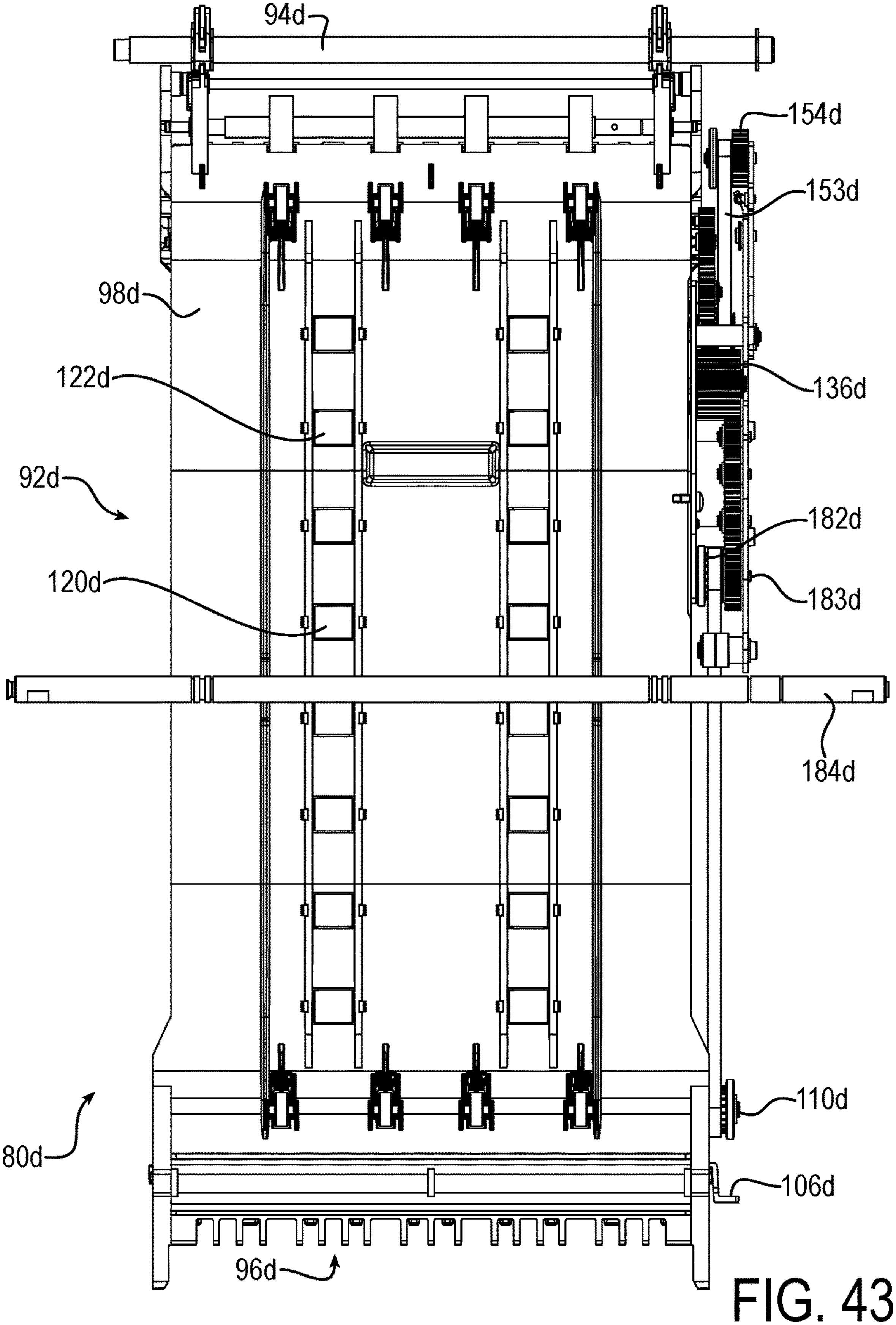
FIG. 43 is a top view of the linking transport assembly shown in FIG. 37.

The linking transport assembly 80*d* can include a body 92*d*, at least one pivot shaft 94*d*, and a lock 96*d*. The body 92*d* can define the transport path 86*d* along which banknotes move between the fourth port 82*d* and the fifth port 84*d*. The body 92*d* can include first and second plate members 98*d*, 100*d* interconnected together through the pivot shaft 94*d*. The transport path 86*d* can extend between the first and second plate members 98*d*, 100*d*. The at least one pivot shaft 94*d* can be engaged with the body 92*d* and define the axis about which the plate member 100*d* and structures mounted on the plate member 100*d* are pivotally moveable. The lock 96*d* can be mounted on the body 92*d* closer to the fifth port 84*d* than the fourth port 82*d*. The lock 96*d* can be configured to releasably interconnect the plate member 100*d* of the body 92*d* and the recycler 26 and prevent pivoting movement of the plate member 100*d*. As best shown in FIG. 37, the exemplary lock 96*d* can include a graspable portion 102*d* that can be pulled in a direction 104*d* to withdraw a hook portion 106*d* from a notch (not visible) in the recycler 26. The second plate member 100*d* can then be pivoted about the pivot shaft 94*d*.

The linking transport assembly 80*d* can also include a plurality of beams, such as at least first and second beams 108*d*, 110*d*. The beams 108*d*, 110*d* can be supported for rotation on the body 92*d* outside of the transport path 86*d*. Each beam 108*d*, 110*d* can support a friction roller, such as friction rollers 112*d* and 114*d*. Each of the friction rollers can extend through one of a plurality of apertures, such as apertures 116*d* and 118*d*, defined in one of the first and second plate members 98*d*, 100*d* to thereby extend into the transport path 86*d* to engage banknotes moving along the transport path 86*d* to move the banknotes along the transport path 86*d*. Free or undriven rollers, such as rollers 120*d*, 122*d*, can be positioned against the friction rollers so that banknotes are pinched between the friction rollers and the free rollers during movement along the transport path 86*d*.

The exemplary linking transport assembly 80*d* can also include belts 124*d*, 125*d* for interconnecting beams 108*d*, 11.0*d* for concurrent rotation in the same rotational direction. The beam 110*d* can drive the beam 108*d* with the belts 124*d*, 125*d*. The belts 124*d*, 125*d* can extend around the friction rollers 112*d*, 114*d*. The beam 110*d* can be driven in rotation through a belt 180*d* wound around a pulley 182*d*. The pulley 182*d* is fixedly mounted on a shaft 183*d* for concurrent rotation. A gear 130*d* is fixedly mounted on the same shaft 183*d* for concurrent rotation.

As best shown in FIG. 46, the linking transport assembly 80*d* can also include an input member 136*d* configured to rotate. The recycler 26 can also include the output member 138*c* and the motor 140 driving the output member 138*c* in rotation, through the gear 151 and an intermediary spur gear 163. The output member 138*c* can be positioned to engage the input member 136*d* of the linking transport assembly 80*d* when the plate member 100*d* is locked. The output member 138*c* can be configured to transmit rotation to the input member 136*d* of the linking transport assembly 80*d*, such as for rotating the beams 108*d*, 110*d*. The exemplary input gear 136*d* is meshed with various gears, including a gear 126*d*, to transmit rotation forward, to the gear 130*d*. The exemplary input gear 136*d* is also meshed with a gear 128*d* to transmit rotation aft, as will be addressed in greater detail below.

The linking transport assembly 80*c* can also include an output member 154*d* operably engaged with the input member 136*d*. Rotation of the input member 136*d* results in rotation of the output member 154*d* and the members 136*d* and 154*d* rotate concurrently. FIG. 46 best shows the power transmission pathway through a plurality of gears, including gear 128*d*. The gear mounted on the body 92*d* that is furthest aft is mounted on a shaft that is interconnected with a shaft supporting the member 154*d* through a belt 153*d*. The dispenser 40 includes the input members 156 and 158 positioned on opposite sides of the horizontal longitudinal axis 162 of the top 70 of the safe 42. The input members 156, 158 can be operably engageable with the output member 154*d* of the linking transport assembly 80*d* when the recycler 26 is in the retracted position. The output member 154*d* can engage the input member 156 of the dispenser 40 when the linking transport assembly 80*d* is engaged with the recycler 26, the recycler 26 and safe 42 are both forward-facing, and the recycler 26 is in the retracted position. The output member 154*d* can then transmit rotation to the input member 156 of the dispenser 40. The input member 156 can drive the friction roller 160 positioned at the first port 68. The output member 154*d* can engage the input member 158 of the dispenser 40 when the linking transport assembly 80*d* is engaged with the recycler 26, the recycler 26 and safe 42 are facing opposite directions, and the recycler 26 is in the retracted position. The output member 154*d* can then transmit rotation to the input member 158 of the dispenser 40. The input member 158 can drive the friction roller 160 positioned at the first port 68.

At least portions of the first port 68 and the fourth port 82*d* can releasably engage and disengage with respect to one another when the recycler 26 is moved between the retracted position and the extended position. The engagement between the fourth port 82*d* and the first port 68 is identical to the engagement between the fourth port 82*a* and the first port 68. Therefore, the description of the first linking transport assembly 80*a* regarding the engagement between the fourth port 82*a* and the first port 68 is applicable the fourth linking transport assembly 80*d*.

The linking transport assembly 80*d* can also include a cross-member 184*d*. The cross-member 184*d* can be fixedly attached to the plate member 98*d*, along a longitudinal axis of the linking transport assembly 80*d* between the pivot shaft 94*d* and the lock 96*d* to inhibit sag of the body 92*d*. The cross-member 184*d* can engage a structure defined by the recycler 26 in a releasable snap-fit arrangement. The plate member 98*d* can remain interconnected to the recycler 26 through the cross-member 184*d* when the plate member 100*d* is pivotally moved.

While the present disclosure has been described with reference to an exemplary embodiment, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the appended claims. The right to claim elements and/or subcombinations that are disclosed herein is hereby unconditionally reserved. The use of the word "can" in this document is not an assertion that the subject preceding the word is unimportant or unnecessary or "not critical" relative to anything else in this document. The word "can" is used herein in a positive and affirming sense and no other motive should be presumed. More than one "invention" may be disclosed in the present disclosure; an "invention" is defined by the content of a patent claim and not by the content of a detailed description of an embodiment of an invention.

What is claimed is:

1. A modular automated transaction machine (ATM) comprising:

a safe having a door and a first port spaced from said door;

at least one currency cassette positioned in said safe;

a dispenser positioned in said safe and operably engaged with said at least one currency cassette wherein said dispenser is configured to extract banknotes from said at least one currency cassette and direct the extracted banknotes to said first port and also configured to receive banknotes through said first port and direct the banknotes received through said first port to said at least one currency cassette;

a recycler positionable on a top of said safe and having a second port and a third port, said recycler configured to receive banknotes through said second port and direct received banknotes to said third port, said recycler positionable in a plurality of different orientations on said top of said safe and also in a plurality different offsets relative to said top of said safe; and a plurality of linking transport assemblies each individually engageable with said recycler, each one of said plurality of linking transport assemblies having a respective fourth port configured to engage said first port of said safe and a respective fifth port configured to engage said second port of said recycler, each one of said plurality of linking transport assemblies defining a transport path along which banknotes are moved between said respective fourth port said respective fifth port, and each one of said plurality of linking transport assemblies individually positionable between said top of said safe and a bottom of said recycler, wherein said recycler and said safe are engageable with one another in a plurality of different configurations and wherein one of said plurality of linking transport assemblies interconnects said recycler and said safe in each of said plurality of different configurations.

2. The modular ATM of claim 1 wherein said recycler extends downwardly to a first horizontal plane and said top of said safe is at least partially disposed in a second horizontal plane, said first horizontal plane is parallel to and spaced from said second horizontal plane, at least portions of said first port and said fourth port engage and overlap one another in a third horizontal plane for each one of said plurality of linking transport assemblies in the form of aft ends of plates defining at least part of said first port extending into a boot defining at least part of said fourth port, said third horizontal plane is parallel to and spaced from both of said first horizontal plane and said second horizontal plane, and said first horizontal plane is disposed between said second horizontal plane and said third horizontal plane.

3. The modular ATM of claim 1 wherein said recycler extends downwardly to a first horizontal plane that confronts said top of said safe, said first horizontal plane is above said top of said safe, and each one of said plurality of linking transport assemblies is fully disposed above said first horizontal plane and above said safe when individually engaged with said recycler.

4. The modular ATM of claim 1 wherein:

a first linking transport assembly of said plurality of linking transport assemblies defines a first transport path along which banknotes travel that extends vertically from said top of said safe to a first maximum height above said first port and only extends downwardly after reaching said first maximum height in a direction of movement of the banknotes along said first transport path before reaching said second port; and a second linking transport assembly of said plurality of linking transport assemblies defines a second transport path along which banknotes travel that extends to a second maximum height above said first port and extends both downwardly and upwardly after reaching said second maximum height in a direction of movement of the banknotes along said second transport path before reaching said second port, wherein said first maximum height and said second maximum height are different from one another.

5. The modular ATM of claim 4 wherein said recycler extends downwardly to a first horizontal plane that confronts said top of said safe, said first horizontal plane is above said top of said safe, and each one of said plurality of linking transport assemblies is at least mostly disposed above said first horizontal plane when individually engaged with said recycler.

6. The modular ATM of claim 1 wherein:

each one of said plurality of linking transport assemblies further comprises an input member configured to rotate; and said recycler further comprises a plurality of output members each positioned to engage at least one of said input members of said plurality of linking transport assemblies and configured to transmit rotation to at least one of said input members of said plurality of linking transport assemblies.

7. The modular ATM of claim 6 wherein:

at least one of said input members of said plurality of linking transport assemblies is a first gear; and at least one of said output members of said recycler is a second gear that meshes with said first gear.

8. The modular ATM of claim 6 wherein said recycler extends along a horizontal longitudinal axis between a forward end and an aft end and wherein said plurality of output members are spaced from one another along said horizontal longitudinal axis.

9. The modular ATM of claim 6 wherein:

each one of said plurality of linking transport assemblies further comprises an output member operably engaged with said respective input member such that rotation of said input member and said output member rotate concurrently; and said dispenser further comprises at least one input member positioned at said first port and operably engageable with said output members of each one of said plurality of linking transport assemblies whereby each of said output members of said plurality of linking transport assemblies engages with said at least one input member of said dispenser and transmits rotation to said at least one input member of said dispenser.

10. The modular ATM of claim 9 wherein said top of said safe extends along a horizontal longitudinal axis between a forward end and an aft end and also extends along a horizontal lateral axis between a right side and a left side, said at least one input member of said dispenser is further defined as first and second input members, and wherein said first and second input members of said dispenser are positioned on opposite sides of said horizontal longitudinal axis.

11. The modular ATM of claim 1 wherein each one of said plurality of linking transport assemblies further comprises:

a plurality of beams including at least first and second beams supported for rotation on said body and each supporting a friction roller, wherein each of said friction rollers extends into said transport path and engages banknotes moving along said transport path to move the banknotes along said transport path.

12. The modular ATM of claim 11 wherein at least one of said plurality of linking transport assemblies further comprises:

at least one belt interconnecting said at least first and second beams for concurrent rotation.

13. The modular ATM of claim 11 wherein at least one of said plurality of linking transport assemblies further comprises:

a plurality of gears interconnecting said at least first and second beams for concurrent rotation.

14. The modular ATM of claim 11 wherein at least one of said plurality of linking transport assemblies further comprises:

at least one belt interconnecting at least said first and second beams for concurrent rotation; and a plurality of gears interconnecting said first beam and a third beam of said plurality of beams for concurrent rotation.

15. The modular ATM of claim 1 wherein each one of said plurality of linking transport assemblies further comprises:

a body defining said respective transport path along which banknotes move between said fourth port and said fifth port;

at least one pivot shaft engaged with said body and about which at least part of said body is pivotally moveable;

a lock mounted on said body closer to said fifth port than said fourth port, said lock configured to releasably interconnect at least a portion of said body and said recycler and prevent pivoting movement of said at least a portion of said body, wherein said body further comprises first and second plate members interconnected together, wherein said transport path extends between said first and second plate members.

16. The modular ATM of claim 15 wherein each one of said plurality of linking transport assemblies further comprises:

a plurality of beams supported for rotation on said body outside of said transport path, each of said plurality of beams supporting a friction roller that extends through one of a plurality of apertures defined in one of said first and second plate members and thereby extends into said transport path.

17. The modular ATM of claim 16 wherein at least one of said plurality of linking transport assemblies further comprises:

at least one belt overlapping said friction rollers and thereby interconnecting said plurality of beams for concurrent rotation.

18. The modular ATM of claim 15 wherein said safe further comprises:

a boot mounted at said top of said safe over said first port, wherein said first and second plate members extend into said boot.

19. The modular ATM of claim 1 wherein said recycler extends downwardly to a first horizontal plane that confronts said top of said safe, said first horizontal plane is above said top of said safe, and each one of said plurality of linking transport assemblies is disposed at least partially above said first horizontal plane and at least partially within said recycler when individually engaged with said recycler.

20. The modular ATM of claim 1 wherein each one of said plurality of linking transport assemblies is further defined as pivotally engageable with said recycler.

21. The modular ATM of claim 1 wherein each one of said plurality of linking transport assemblies further comprises:

a lock configured to releasably interconnect at least a portion of said one of said plurality of linking transport assemblies and said recycler.

* * * * *